US010814893B2

(12) United States Patent
Mong et al.

(10) Patent No.: US 10,814,893 B2
(45) Date of Patent: Oct. 27, 2020

(54) VEHICLE CONTROL SYSTEM

(71) Applicant: General Electric Company, Schenectady, NY (US)

(72) Inventors: Tab Robert Mong, Erie, PA (US); Stephen Francis Bush, Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 15/958,839

(22) Filed: Apr. 20, 2018

(65) Prior Publication Data
US 2018/0237040 A1    Aug. 23, 2018

Related U.S. Application Data

(63) Continuation-in-part of application No. 15/671,204, filed on Aug. 8, 2017, and a continuation-in-part of
(Continued)

(51) Int. Cl.
*B61L 15/00* (2006.01)
*B61L 23/00* (2006.01)
(Continued)

(52) U.S. Cl.
CPC ....... *B61L 15/0072* (2013.01); *B61L 15/0036* (2013.01); *B61L 15/0081* (2013.01);
(Continued)

(58) Field of Classification Search
None
See application file for complete search history.

(56) References Cited

U.S. PATENT DOCUMENTS 5,741,898 A    4/1998  Hanley
6,225,776 B1   5/2001  Chai
(Continued)

FOREIGN PATENT DOCUMENTS

CN    103166975 A1    6/2013
CN    103731504 A1    4/2014
(Continued)

OTHER PUBLICATIONS

Philipp Meyer, Extending IEEE 802.1 AVB with Time-triggered Scheduling: A Simulation Study of the Coexistence of Synchronous and Asynchronous Traffic, Dec. 2013,IEEE, pp. 47-54 (Year: 2013).*
(Continued)

*Primary Examiner* — Kouroush Mohebbi
(74) *Attorney, Agent, or Firm* — The Small Patent Law Group LLC; Mary D. Lawlor

(57) ABSTRACT

A locomotive control system includes one or more processors configured to determine quality of service (QoS) parameters of locomotive devices communicating data with each other in an Ethernet network that is configured as a time sensitive network (TSN) and that is onboard a locomotive. The one or more processors also are configured to determine available communication pathways in the TSN through which the locomotive devices are able to communicate the data. The one or more processors also are configured to select one or more of the available communication pathways and to designate communication times at which the data is communicated between the locomotive devices to satisfy the QoS parameters of the locomotive devices.

19 Claims, 23 Drawing Sheets

Related U.S. Application Data application No. 15/292,709, filed on Oct. 13, 2016, now Pat. No. 10,205,784, and a continuation-in-part of application No. 15/199,282, filed on Jun. 30, 2016, now Pat. No. 10,298,503, and a continuation-in-part of application No. 15/583,149, filed on May 1, 2017, and a continuation-in-part of application No. 15/833,732, filed on Dec. 6, 2017.

(60) Provisional application No. 62/396,487, filed on Sep. 19, 2016, provisional application No. 62/311,124, filed on Mar. 21, 2016, provisional application No. 62/575,719, filed on Oct. 23, 2017.

(51) Int. Cl.
| | |
|---|---|
| *H04L 29/08* | (2006.01) |
| *H04L 29/06* | (2006.01) |
| *H04L 12/801* | (2013.01) |
| *H04L 12/54* | (2013.01) |
| *H04L 12/723* | (2013.01) |
| *H04L 12/725* | (2013.01) |

(52) U.S. Cl.
CPC ............ *B61L 23/005* (2013.01); *H04L 65/80* (2013.01); *H04L 67/12* (2013.01); *H04L 67/322* (2013.01); *H04L 12/56* (2013.01); *H04L 45/302* (2013.01); *H04L 45/50* (2013.01); *H04L 47/11* (2013.01)

(56) References Cited

U.S. PATENT DOCUMENTS

| | | | |
|---|---|---|---|
| 6,603,857 B1 | 8/2003 | Batten-Carew | |
| 6,658,485 B1 | 12/2003 | Baber | |
| 7,002,977 B1 | 2/2006 | Jogalekar | |
| 7,068,790 B1 | 6/2006 | Elliott | |
| 7,093,256 B2 | 8/2006 | Bloks | |
| 7,142,536 B1 | 11/2006 | Gossett | |
| 7,149,187 B1 | 12/2006 | Jacobson | |
| 7,260,102 B2 | 8/2007 | Mehrvar | |
| 7,289,514 B2 | 10/2007 | Robotham | |
| 7,339,948 B2 | 3/2008 | Balasubramanian | |
| 7,374,647 B2 | 5/2008 | Mundheim | |
| 7,460,670 B1 | 12/2008 | Elliott | |
| 7,519,076 B2 | 4/2009 | Janssen | |
| 7,533,128 B1 | 5/2009 | Sanchez | |
| 7,548,512 B2 | 6/2009 | Sexton | |
| 7,553,415 B2 | 6/2009 | Stoehr | |
| 7,572,858 B2 | 8/2009 | Wang | |
| 7,577,996 B1 | 8/2009 | Merchant | |
| 7,590,151 B2 | 9/2009 | Middleton | |
| 7,602,710 B2 | 10/2009 | Grippo | |
| 7,627,453 B2 | 12/2009 | Keefe | |
| 7,675,919 B2 | 3/2010 | Vestal | |
| 7,720,013 B1 | 5/2010 | Kelliher | |
| 7,747,735 B1 | 6/2010 | Kahn | |
| 7,773,360 B2 | 8/2010 | O'Leary | |
| 7,852,879 B2 | 12/2010 | Arnold | |
| 7,900,321 B2 | 3/2011 | Fitz | |
| 7,917,624 B2 | 3/2011 | Gidwani | |
| 7,933,228 B2 | 4/2011 | Coley | |
| 7,936,770 B1 | 5/2011 | Frattura | |
| 7,970,014 B2 | 6/2011 | Voith | |
| 8,064,482 B2 | 11/2011 | Krause | |
| 8,150,988 B2 | 4/2012 | Pardo-Castellote | |
| 8,255,791 B2 | 8/2012 | Koren | |
| 8,340,067 B2 | 12/2012 | Buga | |
| 8,345,591 B2 | 1/2013 | MacInnis | |
| 8,386,078 B1 | 2/2013 | Hickman | |
| 8,509,953 B2 | 8/2013 | Taft | |
| 8,526,621 B2 | 9/2013 | Rabin | |
| 8,650,270 B2 | 2/2014 | Gerovac | |
| 8,665,900 B2 | 3/2014 | Rabie | |
| 8,671,135 B1 | 5/2014 | Joshi | |
| 8,817,623 B2 | 8/2014 | Gupta | |
| 8,842,534 B2 | 9/2014 | Hahn | |
| 8,874,686 B2 | 10/2014 | Jun | |
| 8,929,217 B2 | 1/2015 | Torres | |
| 9,015,672 B2 | 4/2015 | Dause | |
| 9,054,994 B2 | 6/2015 | Rabie | |
| 9,246,847 B2 | 1/2016 | Mishra | |
| 9,319,332 B2 | 4/2016 | Thubert | |
| 9,331,962 B2 | 5/2016 | Lida | |
| 9,348,897 B2 | 5/2016 | Shoham | |
| 9,429,677 B2 | 8/2016 | AlShaikh | |
| 9,456,453 B2 | 9/2016 | Zellner | |
| 9,461,821 B1 | 10/2016 | Machani | |
| 9,525,617 B2 | 12/2016 | Vasseur | |
| 9,740,513 B2 | 8/2017 | Gatherer | |
| 9,763,131 B2 | 9/2017 | Han | |
| 9,815,203 B1 | 11/2017 | Yunjung | |
| 10,205,784 B2 * | 2/2019 | Bush | H04L 67/325 |
| 2001/0023445 A1 | 9/2001 | Sundqvist | |
| 2002/0095493 A1 | 7/2002 | Byrnes | |
| 2002/0097726 A1 | 7/2002 | Garcia-Luna-Aceves | |
| 2002/0110245 A1 | 8/2002 | Gruia | |
| 2003/0005130 A1 | 1/2003 | Cheng | |
| 2003/0007453 A1 | 1/2003 | Ogier | |
| 2003/0016630 A1 | 1/2003 | Vega-Garcia | |
| 2003/0045285 A1 | 3/2003 | Parkman | |
| 2003/0067653 A1 | 4/2003 | Aicklen | |
| 2003/0076838 A1 | 4/2003 | Shaio | |
| 2003/0177154 A1 | 9/2003 | Vrancic | |
| 2004/0046442 A1 | 3/2004 | Aurich et al. | |
| 2004/0130292 A1 | 7/2004 | Buchanan | |
| 2005/0036495 A1 | 2/2005 | Wishneusky | |
| 2005/0190694 A1 | 9/2005 | Ben-Nun | |
| 2005/0198207 A1 | 9/2005 | Hoblit | |
| 2005/0251806 A1 | 11/2005 | Auslander | |
| 2006/0015615 A1 | 1/2006 | Merle | |
| 2006/0104230 A1 | 5/2006 | Gidwani | |
| 2006/0104232 A1 | 5/2006 | Gidwani | |
| 2007/0041364 A1 | 2/2007 | Kakadia | |
| 2007/0042706 A1 | 2/2007 | Ledeczi | |
| 2007/0089114 A1 | 4/2007 | MacInnis | |
| 2007/0183310 A1 | 8/2007 | Nakamura | |
| 2007/0280367 A1 | 12/2007 | Nakao | |
| 2008/0077705 A1 | 3/2008 | Li | |
| 2008/0084920 A1 | 4/2008 | Okazaki | |
| 2008/0109562 A1 | 5/2008 | Ramakrishnan | |
| 2008/0112439 A1 | 5/2008 | Vestal | |
| 2008/0198814 A1 | 8/2008 | Wengerter | |
| 2008/0263647 A1 | 10/2008 | Barnett | |
| 2008/0292102 A1 | 11/2008 | Wang | |
| 2009/0031008 A1 | 1/2009 | Elliott | |
| 2009/0080885 A1 | 3/2009 | Mehrotra | |
| 2009/0198814 A1 | 8/2009 | Oono | |
| 2010/0017249 A1 | 1/2010 | Fincham | |
| 2010/0109426 A1 | 5/2010 | Fugiel et al. | |
| 2010/0134067 A1 | 6/2010 | Baxter | |
| 2010/0189120 A1 * | 7/2010 | Diab | H04L 12/40 |
| | | | 370/401 |
| 2010/0191585 A1 | 7/2010 | Smith | |
| 2010/0278177 A1 | 11/2010 | Chase | |
| 2010/0327653 A1 | 12/2010 | Wygnanski et al. | |
| 2011/0038382 A1 | 2/2011 | Peterson | |
| 2011/0046837 A1 | 2/2011 | Khosla | |
| 2011/0066854 A1 | 3/2011 | Poledna | |
| 2011/0133693 A1 | 6/2011 | Lowenthal | |
| 2011/0137684 A1 | 6/2011 | Peak | |
| 2011/0167147 A1 | 7/2011 | Anderson | |
| 2011/0213656 A1 | 9/2011 | Turner | |
| 2011/0215758 A1 | 9/2011 | Stahlin | |
| 2011/0246252 A1 | 10/2011 | Uesugi | |
| 2011/0317587 A1 | 12/2011 | Lida | |
| 2012/0018277 A1 | 1/2012 | Masuda | |
| 2012/0036569 A1 | 2/2012 | Cottrell | |
| 2012/0072380 A1 | 3/2012 | Liu | |
| 2012/0078440 A1 | 3/2012 | Oravis | |
| 2012/0105001 A1 | 5/2012 | Gallegos | |
| 2012/0109515 A1 | 5/2012 | Uyeki | |
| 2012/0109519 A1 | 5/2012 | Uyeki | |

(56) References Cited

U.S. PATENT DOCUMENTS

| | | |
|---|---|---|
| 2012/0184277 A1 | 7/2012 | Hiltunen |
| 2013/0003680 A1 | 1/2013 | Yamamoto |
| 2013/0041547 A1 | 2/2013 | Goodermuth |
| 2013/0058217 A1 | 3/2013 | Smithgall |
| 2013/0073764 A1 | 3/2013 | Deb |
| 2013/0091170 A1 | 4/2013 | Zhang |
| 2013/0163584 A1 | 6/2013 | Jayaraman |
| 2013/0201857 A1 | 8/2013 | Bharagava |
| 2013/0221919 A1 | 8/2013 | Gallegos |
| 2013/0223446 A1 | 8/2013 | Ernstrom |
| 2014/0129060 A1 | 5/2014 | Cooper |
| 2014/0160997 A1 | 6/2014 | Rhee |
| 2014/0173628 A1 | 6/2014 | Ramakrishnan Nair |
| 2014/0250017 A1 | 9/2014 | Khan |
| 2014/0341234 A1 | 11/2014 | Asterjadhi |
| 2015/0019789 A1 | 1/2015 | Subramaniyan |
| 2015/0039734 A1 | 2/2015 | King |
| 2015/0043384 A1 | 2/2015 | Hui |
| 2015/0078404 A1 | 3/2015 | Diab |
| 2015/0169369 A1 | 6/2015 | Baskaran |
| 2015/0178034 A1 | 6/2015 | Penilla |
| 2015/0188996 A1 | 7/2015 | Park |
| 2015/0195159 A1 | 7/2015 | Kim |
| 2015/0230274 A1 | 8/2015 | Sharma |
| 2016/0021014 A1 | 1/2016 | Wetterwald |
| 2016/0021017 A1 | 1/2016 | Thubert |
| 2016/0023351 A1 | 1/2016 | Kuffner |
| 2016/0059783 A1 | 3/2016 | Sisbot |
| 2016/0063332 A1 | 3/2016 | Sisbot |
| 2016/0112308 A1 | 4/2016 | Ficara |
| 2016/0127268 A1 | 5/2016 | Gotz |
| 2016/0142993 A1 | 5/2016 | Lim |
| 2016/0150459 A1 | 5/2016 | Patil |
| 2016/0191572 A1 | 6/2016 | Joy |
| 2016/0192303 A1 | 6/2016 | Tender |
| 2016/0198423 A1 | 7/2016 | Liu |
| 2016/0248586 A1 | 8/2016 | Hughes |
| 2016/0274558 A1 | 9/2016 | Strohmenger |
| 2016/0308793 A1 | 10/2016 | Levy-Abegnoli |
| 2017/0012895 A1 | 1/2017 | Zhao |
| 2017/0019479 A1 | 1/2017 | Rangarajan |
| 2017/0047775 A1 | 2/2017 | Itaya |
| 2017/0099226 A1 | 4/2017 | Vasseur |
| 2017/0102690 A1 | 4/2017 | Sait |
| 2017/0220011 A1 | 8/2017 | Hart |
| 2017/0351630 A1 | 12/2017 | Li |
| 2017/0366467 A1 | 12/2017 | Martin |
| 2018/0004953 A1 | 1/2018 | Smith, II |
| 2018/0024537 A1 | 1/2018 | Chauvet |
| 2018/0048578 A1 | 2/2018 | Rollet |
| 2018/0203959 A1 | 7/2018 | Refsnaes |
| 2018/0225135 A1 | 8/2018 | Xiao |
| 2018/0234514 A1 | 8/2018 | Rajiv |
| 2018/0237040 A1 | 8/2018 | Mong |
| 2018/0246981 A1 | 8/2018 | Wei |
| 2018/0310078 A1 | 10/2018 | Szymanski |
| 2019/0089502 A1 | 3/2019 | Yi |

FOREIGN PATENT DOCUMENTS

| | | |
|---|---|---|
| CN | 102780581 B1 | 10/2014 |
| CN | 104734957 A1 | 6/2015 |
| CN | 105262651 A1 | 1/2016 |
| EP | 0762590 A1 | 3/1997 |
| JP | 2000071964 A | 3/2000 |
| KR | 20110046837 A1 | 5/2011 |
| RU | 2378760 C2 | 1/2010 |
| RU | 2601837 C2 | 11/2016 |
| WO | 2005059503 A1 | 6/2005 |
| WO | 2013147873 A1 | 10/2013 |
| WO | 2014160997 A1 | 10/2014 |
| WO | 2015195159 A1 | 12/2015 |
| WO | 2017059550 A1 | 4/2017 |

OTHER PUBLICATIONS

Asrodia, Pallavi et al., "Network Monitoring and Analysis by Packet Sniffing Method", International Journal of Engineering Trends and Technology (IJETT), vol. 4, Issue 5, May 2013, ISSN:2231-5381 (pp. 2133-2135, 3 total pages).

Australian Office Action dated Apr. 3, 2019 which was issued in connection with Australian Patent No. 2018202791 which was filed on Apr. 22, 2018.

Thou, C. W., Hume, D. G., Rosenband, T., & Wineland, D. J. (2010). "Optical Clocks and Relativity". Science, 329 (5999), Sep. 24, 2010, 1630-1633. (5 Pages).

Christian Boiger, "Time Aware Shaper—Flush Queue Event", IEEE 802 Plenary, IEEE 802.1 TSN TG, Deggendorf University of Applied Sciences, Mar. 20, 2013.

International Search Report and Written Opinion issued in connection with corresponding PCT Application No. PCT/US2017/046839 dated Feb. 22, 2018.

International Search Report and Written Opinion issued in connection with corresponding PCT Application No. PCT/US2018/026403 dated Jul. 27, 2018.

International Search Report issued in connection with corresponding PCT Application No. PCT/US2018/027221 dated Jul. 27, 2018.

Search Report issued in connection with corresponding EA Application No. 201890745 dated Nov. 30, 2018.

"Data Centre Switching Solutions White Paper", Cisco Systems, http://www.cisco.com/c/en/us/solutions/collateral/data-center-virtualization/data-center-switching/net_implentation_white_paper0900aecd8053495a.html, Document ID 1458600822267844, Mar. 12, 2015, (pp. 1-15, 15 total pages).

Derradji et al., "The BXI Interconnect Architecture", IEEE 23rd Annual Symposium on High-Performance Interconnects, Aug. 26-28, 2015, 32pgs.

Deshpande et al., "Coordinated Sampling to Improve the Efficiency of Wireless Network Monitoring", Networks, 2007.4 ICON 2007. 15th IEEE International Conference on, Nov. 19-21, 2007, pp. 353-358. (6 pages).

Diogenes et al., "Getting started with Microsoft Azure security", Microsoft Azure, https://docs.microsoft.com/en-us/azure/security/azure-security-getting-started, May 19, 2016, 13 pages.

Donohue, J. M., Agnew, M., Lavoie, J., & Resch, K. J. (2013). Coherent ultrafast measurement of time-bin encoded photons. Physical Review Letters, 111(15), 1-10.

Dzymanski, an Ultra-Low-Latency Guaranteed-Rate Internet for Cloud Services, IEE/ACM Transactions on Networking, Feb. 2016, vol. 24, Issue 1, pp. 123-136.

Emfinger et al., "Analysis, Verification, and Management Toolsuite for Cyber-Physical Applications on Time-Varying Networks (Work in Progress)", Proceedings of the 4th ACM SIGBED International Workshop on Design, Modeling, and Evaluation of Cyber-Physical Systems, pp. 44-47, Berlin, Germany, Apr. 14-17, 2014. (4 pages).

Goetz, "IEEE 802.1 AS BT (gPTP) & IEE 1588 v3 (PTP v3)" Siemens, IEEE 802.1 TSN TG Meeting Orlando/USA, Mar. 19, 2013, (13 Pages).

Hyung-Taek Lim et al., "Performance Analysis of the IEEE 802.1 Ethernet Audio Bridging Standard", SIMUTOOLS 12 Proceedings of the 5th International ICST Conference on Simulation Tools and Techniques, pp. 27-36, Mar. 19-23, 2012.

IEEE Standards Association "IEEE Standard for Ethernet—Amendment 5: Specification and Management Parameters for Interspersing Express Traffic", (Amendment to IEEE Std 802.3-2015 as amended by IEEE Std 802.3bw-2015, IEEE Std 802.3by-2016, IEEE Std 802.3bq-2016, and IEEE Std 802.3bp-2016), Approved Jun. 30, 2016, Published Oct. 14, 2016, (58pages).

19. IEEE Standards Association, "IEEE Standard for Local and Metropolitan Area Networks—Bridges and Bridged Networks—Amendment 25: Enhancements for Scheduled Traffic", (Amendment to IEEE Std 802.1Q-2014 as amended by IEEE Std 802.1Qcd-2015, and IEEE Std 802.1Q2014/Cor 1-2015), vol., No., pp. 1-57, Mar. 18, 2016. (57 pages).

IEEE Standards Association, "IEEE Standard for Local and Metropolitan Area Networks—Corrigendum 1: Technical and Editorial

(56) References Cited

OTHER PUBLICATIONS

Corrections", IEEE Std 802.1Q-2014/Cor1-2015 (Corrigendum to IEEE Std 802.1Q-2014), Approved Dec. 5, 2015, Published Jan. 12, 2016, (122 pages).

IEEE Standards Association, "Time-Sensitive Networking (TSN) for Industry 4.0", Standards for Time-Sensitive Networking for use in Industrial Automation Networks, 2017 (2 Pages).

IEEE Standards Association, "IEEE Standard for Local and Metropolitan Area Networks—Timing and Synchronization for Time-Sensitive Applications in Bridged Local Area Networks", IEEE Std 802.1 AS-2011, Status: PAR approved, technical development in process, task group ballots., Mar. 30, 2011, (292 pages).

Itin et al., "Optimising non-real time frame handling in real time ethernet nodes", 2015 IEEE World Conference on Factory Communication Systems (WFCS), pp. 1-8, 2015, 8pp.

Jin, Guijun et al., "Control Transmission Pace At IP Layer to Avoid Packet Drop", 2004 IEEE International Workshop on IP Operations and Management, Oct. 11-13, 2004, (pp. 60-66, 7 total pages).

Jamshed, Muhammad Ali et al., "An Energy Efficient Priority Based Wireless Multimedia Sensor Node Dynamic Scheduler", 2015 12th International Conference on High-capacity Optical Networks and Enabling/Emerging Technologies (HONET), Dec. 21-23, 2015, (pp. 1-4, 4 total pages).

Kamieth, J., et al., "Design of TDMA-based In-Car Networks: Applying Multiprocessor Scheduling Strategies on Wime-triggered Switched Ethernet Communications," IEEE Emerging Technologies and Factory Automation (ETFA), pp. ?-9 (Sep. 16-19, 2014).

Kapur et al., "Secure data transfer in MANET using symmetric and asymmetric cryptography", 2015 4th International Conference on Reliability, Infocom Technologies and Optimization (ICRITO) (Trends and Future Directions), pp. 1-5, Noida, Sep. 2-4, 2015 (5 Pages).

Kehrer et al., "A Comparison of Fault-Tolerance Concepts for IEEE 802.1 Time Sensitive Networks (TSN)", Emerging Technology and Factory Automation (ETFA), IEEE, Sep. 16-19, 2014, Barcelona, pp. 1-8. (8 pages).

Ko, Jaewoong et al., "Research on optimal bandwidth allocation for the scheduled traffix in IEEE 802.1 AVB"., Vehicular Electronics and Safety (ICVES), 2015 IEEE International Conference on, Nov. 5-7, 2015, Yokohama, (pp. 31-35, 4 total pages).

Liao et al., "A novel QoS-Enable Real-Time Publish-Subscribe Service", https://www.computer.org/cds/proceedings/ispa/2008/3471a019-abs.html, IEEE Computer Society, Dec. 10, 2008 to Dec. 12, 2008.

Marcikic, I., de Riedmatten, H., Tittel, W., Scarani, V., Zbinden, H., & Gisin, N. (2002). "Femtosecond Time-Bin Entangled Qubits for Quantum Communication", Dec. 2002, vol. 66, Iss.6 (6 Pages).

Mehic, M., Maurhart, O., Rass, S., Komosny, D., & Rezac, F. (2017). Key Distribution Link, IEEE Journal of Quantum Electronics, vol. 53, No. 5, Oct. 5, 2017, (8 Pages).

Meyer et al.; "Extending IEEE 802.1 AVB with Time-triggered Scheduling: A Simulation Study of the Coexistence of Synchronous and Asynchronous Traffic", Vehicular Networking Conference (VNC), 2013, DOI: 10.1109/VNC.2013.6737589, Boston, MA, USA. (8 pages).

Mong, T.R., et al., Locomotive Control System, GE Co-Pending U.S. Appl. No. 15/958,839, filed Apr. 20, 2018.

Pardo-Castellote, G.; "OMG data distribution service: architectural overview", Real-Time Innovations, Inc., Proceedings of the 23rd International Conference on Distributed Computing Systems Workshops, Military Communications Conference, MILCOM '03, 2003 IEEE, vol. 1, pp. 242-247, Oct. 13-16, 2003. (7 pages).

Philipp Meyer, Extending IEEE 802.1 AVB with Time-triggered scheduling: A Simulation Study of the Coexistence of Synchronous and Asynchronous Traffic, IEEE, pp. 47-54, (Year 2013).

Search Report from corresponding GB Application No. GB1211287.6 dated Oct. 8, 2012.

Shoemaker; "MIT Develops WiFi with X-ray Vision, Can See a Human Through Walls", GEEK Newsletter, https://www.geek.com/NEWS/MIT-DEVELOPS-WIFI-WITH-X-RAY-VISION-CAN-SEE-A-HUMAN-THROUGH-WALLS-1638206/, pp. 1-11, Oct. 29, 2016. (11 pages).

Silviu S. Craciunas et al., "Scheduling Real-Time Communication in IEEE 802.2Qbv Time Sensitive Networks", the 24th International Conference on Real-Time Networks and Systems (RTNS), ACM, 2016.

Stocia et al., "A proportional share resource allocation algorithm for real-time, time-shared systems", 17th IEEE Real-Time Systems Symposium, pp. 288-299, 1996, 12pp.

Szymanski, "An Ultra-Low-Latency Guaranteed-Rate Internet for Cloud Services", IEEE/ACM Transactions on 5 Networking, Feb. 2016, vol. 24, Issue 1, pp. 123-136. (14 pages).

Thiele et al., "Real-time Calculus for Scheduling Hard Real-time Systems, Circuits and Systems", Int. Symposium on Circuits and Systems ISCAS, Geneva, Switzerland, Mar. 2000, vol. 4, pp. 101-104. (4 pages).

Yu, Cheng-Chi et al., "Dynamic Scheduling of Real-Time Messages Over an Optical Network", Proceedings of Sixth International Conference on Computer Communications and Networks, Sep. 22-25, 1997, (pp. 336-339, 4 total pages).

Preliminary Report dated Mar. 10, 2020 for corresponding Brazilian patent application BR112014025620-9 (4 pages).

* cited by examiner

VEHICLE CONTROL SYSTEM

CROSS-REFERENCE TO RELATED APPLICATIONS

This application is a continuation-in-part of U.S. patent application Ser. No. 15/671,204, filed 8 Aug. 2017, which claims priority to U.S. Provisional Patent Application No. 62/396,487, which was filed 19 Sep. 2016. This application also is a continuation-in-part of U.S. patent application Ser. No. 15/292,709, filed 13 Oct. 2016, which claims priority to U.S. Provisional Application No. 62/311,124, filed 21 Mar. 2016. This application also is a continuation-in-part of U.S. patent application Ser. No. 15/199,282, filed 30 Jun. 2016. This application also is a continuation-in-part of U.S. patent application Ser. No. 15/583,149, filed 1 May 2017. This application also is a continuation-in-part of U.S. patent application Ser. No. 15/833,732, filed 6 Dec. 2017, which claims priority to U.S. Provisional Patent Application No. 62/575,719, filed on 23 Oct. 2017. The entire disclosure of each of these applications is incorporated herein by reference.

FIELD

Embodiments of the present disclosure generally relate to systems and methods for controlling and communicating with rail vehicles.

BACKGROUND

Movement of vehicles is controlled by control systems that receive user input and communicate control signals to components of the vehicles to implement actions dictated by the user input. For example, a vehicle operator may depress a pedal, move a lever, or take other action to change a throttle setting of a vehicle or activate a brake of the vehicle. Responsive to this operator input, a control system of the vehicle may communicate signals (e.g., changes in voltages, currents, etc.) to engines, motors, brakes, etc., of the vehicle to implement the operator input (and change the throttle or activate the brake, as appropriate).

The control systems of some vehicles may be complex in that many components communicate with each other. Not all of these components, however, may communicate signals of the same or similar importance or criticality to operation of the vehicle. For example, components that measure operations of the vehicle (e.g., location, speed, etc.), components that record events occurring during movement of the vehicle, components that measure fuel onboard the vehicle, etc., may communicate signals that are less important to ensuring the safe operation of the vehicle compared to other communications, such as signals communicated with motors of the vehicle, signals communicated with input/output devices, etc.

The control systems may use different communication networks within a vehicle to ensure that the more important or critical communications and the less important or less critical communications are all successfully communicated. But, using many different communication networks within a vehicle can present unnecessarily complexity. For example, some components may not be able to communicate with each other without the communications being relayed and/or converted by another component. As the number of networks and components needed to communicate within a vehicle control system increases, the potential points of failure and complexity of ensuring that communications successful occur increase.

Various types of control systems communicate data between different sensors, devices, user interfaces, etc., to enable control operations of other powered systems. For example, locomotives, automobiles, surgical suites, power plants, etc., include many systems that communicate with each other to control operations of the locomotives, automobiles, surgical suites, and power plants.

The operations of these powered systems may rely on on-time and accurate delivery of data frames among various devices. Failure to deliver some data at or within designated times may result in failure of the powered system, which can have significant consequences. For example, the failure to deliver sensor data to a control system of a locomotive or rail vehicle system can result in the locomotive or rail vehicle system not applying brakes early enough to avoid a collision. Other control systems may fail to implement protective measures to avoid damage or injury to the systems or other equipment if data is not supplied at or within the designated times. Without timely information, feedback control systems cannot maintain performance and stability.

To avoid some of these problems, some known control systems use dedicated wired communication paths between devices. These control systems may include one or more dedicated wires that extend from one device to another and are not used by any other devices to communicate data. These dedicated wires may only communicate the data between devices to ensure that other data traffic within the control system does not delay or interfere with the data communicated between the devices. Other control systems can include a communication network that is dedicated to communication of data between devices. For example, instead of the control system or powered system having a larger network that interconnects many or all devices of the system, the control system or powered system may have a smaller network dedicated to communicating data only among certain devices (e.g., devices related to safe operation of the systems), while other devices of the same system communicate using another, separate network. An example is constructing separate networks for video camera traffic and engine control system traffic in a train locomotive. Constructing and maintaining separate communication networks is redundant and expensive.

Both solutions add increased cost and complexity to the control system or powered system. Dedicating wires or networks to communication of data between certain devices may require duplication of communication and network hardware, which can significantly add to the cost and time in establishing, maintaining, and repairing the networks.

Some control systems may use a Data Distribution Service (DDS) to communicate on a network between the various devices. But, the DDS is not integrated with the network, and the network may need to be manually configured to create the network connections for the devices communicating within the DDS. Some offline tools can automate the configuration changes to a network to allow for changes in communication between the devices, but this can require a system shutdown and restart, which can be unsafe and/or costly with some control systems.

Two conventional approaches to scheduling and forwarding time sensitive data are: 1. A top-down trend, where an application code forwards data to different TSN channels based on a data class; and 2. A bottom-up trend, where a TSN switch is extended by deep packet inspection capability and segregates data based on packet content. With the top-down trend, however, a networking section of an application is completely re-written, which may be undesirable, and the re-writing puts the burden of writing to the correct path on the application developer. With the bottom-up trend, the solution space may be limited to switches with deep packet inspection only.

BRIEF DESCRIPTION

In one embodiment, a control system includes a controller configured to control communication between or among plural vehicle devices that control operation of a vehicle via a network that communicatively couples the vehicle devices. The controller also is configured to control the communication using a data distribution service (DDS) and with the network operating as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a control system includes a controller configured to control communication between plural vehicle devices that control one or more operations of a vehicle. The controller also is configured to control the communication between or among the vehicle devices through an Ethernet network while the Ethernet network operates as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a control system includes a controller configured to control communications between plural vehicle devices onboard a vehicle through a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one embodiment, a control system (e.g., that controls operations of a powered system) includes one or more processors configured to determine quality of service (QoS) parameters of devices communicating data with each other in an Ethernet network configured as a time sensitive network (TSN). The one or more processors also are configured to determine available communication pathways in the TSN through which the devices are able to communicate the data, and to select one or more of the available communication pathways and to designate communication times at which the data is communicated between the devices to satisfy the QoS parameters of the devices.

In one embodiment, a method includes determining quality of service (QoS) parameters of devices communicating data with each other in an Ethernet network configured as a time sensitive network (TSN), determining available communication pathways in the TSN through which the devices are able to communicate the data, and selecting one or more of the available communication pathways and to designate communication times at which the data is communicated between the devices to satisfy the QoS parameters of the devices.

In one embodiment, a control system includes one or more processors configured to determine quality of service (QoS) parameters of devices communicating data with each other in a communication network. The one or more processors also are configured to determine available communication pathways in the network through which the devices are able to communicate the data, and to select one or more of the available communication pathways and to designate communication times at which the data is communicated between the devices to satisfy the QoS parameters of the devices.

In one embodiment, a system includes a scheduling device of a DDS configured to determine bandwidth for communication of time sensitive communications between devices of a control system using the DDS in a time sensitive network (TSN). The scheduling device also is configured to determine available bandwidth for communication of non-time sensitive communications of the control system using the DDS in the TSN, and is configured to control communication of the non-time sensitive communications in the TSN without preventing communication of the time sensitive communications in the TSN based on the available bandwidth. The system also can include a traffic shaper of the TSN configured to receive a communication change from the control system at the TSN. The scheduling device is configured to change one or more of the bandwidth for the communication of the time sensitive communications or the available bandwidth for the communication of the non-time sensitive communications in the TSN without restarting the TSN.

In one embodiment, a method includes determining bandwidth for communication of time sensitive communications between devices of a control system using a DDS in a TSN, determining available bandwidth for communication of non-time sensitive communications of the control system using the DDS in the TSN, communicating the non-time sensitive communications in the TSN without preventing communication of the time sensitive communications in the TSN based on the available bandwidth, receiving a communication change from the control system at the TSN, and changing one or more of the bandwidth for the communication of the time sensitive communications or the available bandwidth for the communication of the non-time sensitive communications in the TSN without restarting the TSN.

In one embodiment, a distributed communication device includes a controller configured to one or more of store or access routing instructions that direct where data packets are to be forwarded within a TSN for one or more writing devices and one or more reader devices of a DDS. The device also can include routing hardware configured to be remotely located from the controller and to receive instructions from the controller to change where the data packets are forwarded within the TSN.

According to some embodiments, a method includes receiving, from a network configuration module, configuration data at a network driver of a communication network; configuring the network driver based on the received configuration data; receiving one or more data packets at the network driver from an application; determining that one or more segregation features are present in the data packet based on the received configuration data; transmitting the one or more data packets based on the one or more segregation features; and controlling one or more operations of an installed product based on the transmitted one or more data packets.

According to some embodiments, a system includes an installed product, including a plurality of components; a computer programmed with a network configuration module for the installed product, the network configuration module for configuring a communication network to control operations of the installed product; the computer including a processor and a memory in communication with the processor, the memory storing the network configuration module and additional program instructions, wherein the processor is operative with the network configuration module and additional program instructions to perform functions as follows: receive, from the network configuration module, configuration data at a network driver of the communication network; configure the network driver based on the received configuration data; receive one or more data packets at the network driver from an application; determine that one or more segregation features are present in the data packet based on the received configuration data; transmit the one or more data packets based on the one or more segregation features; and control one or more operations of an installed product based on the transmitted one or more data packets.

According to some embodiments, a non-transitory, computer-readable medium storing instructions that, when executed by a computer processor, cause the computer processor to perform a method comprising: receiving, from a network configuration module, configuration data at a network driver of a communication network; configuring the network driver based on the received configuration data; receiving one or more data packets at the network driver from an application; determining that one or more segregation features are present in the one or more data packets based on the received configuration data; transmitting the one or more data packets based on the one or more segregation features; and controlling one or more operations of an installed product based on the transmitted one or more data packets.

A technical effect of some embodiments of the subject matter is an improved and/or computerized technique and system for dynamically configuring a network driver and a network switch to control a path of time-sensitive data and non-time-sensitive data through a network. Embodiments provide for the extension of network drivers with a configuration interface to enable segregation of features of the data without the need to re-write the application, or extend the switch with proprietary firmware. Embodiments provide for the configuration of the network driver by a network configuration module, such that no update to the existing application code is needed. Embodiments provide for the network configuration module to configure the switch, such that the configured network driver may be used with any off-the-shelf switch compliant with IEEE 802.1Qbv and associated standards, or any other suitable switch. For example, a real-world benefit is that complex control system code, such as that found in aircraft, locomotives, and power plants will not require expensive code changes to utilize the benefits of TSN. Other real-world benefits include changing the classification of a data flow form an application from the non-time-sensitive domain to the time-sensitive domain without changing the original application. An example of this would be an application that performed an analytic on the health of an asset. The original use of the analytic may be for asset performance or health monitoring. In the future, the system may use that same information to change how to actively control the same asset based on the results of the analytic. Without changing the original application, the network driver may be configured to include the now critical data flow into the time-sensitive domain without any software changes. The previously non-critical data flow now becomes included in the critical traffic without changing the original application.

Other embodiments are associated with systems and/or computer-readable medium storing instructions to perform any of the methods described herein.

In one embodiment, a method includes measuring quantum bit error rates in links between switches in a time-sensitive network, identifying an increase in the quantum bit error rate in a monitored link of the links between the switches, and modifying a configuration of the time-sensitive network so that secret information is not exchanged over the monitored link associated with the increase in the quantum bit error rate.

In one embodiment, a system includes one or more processors configured to measure quantum bit error rates in links between switches in a time-sensitive network. The one or more processors also are configured to identify an increase in the quantum bit error rate in a monitored link of the links between the switches, and to modify a configuration of the time-sensitive network so that secret information is not exchanged over the monitored link associated with the increase in the quantum bit error rate.

In one embodiment, a method includes instructing computing devices that communicate messages with each other via a time-sensitive network to secure communication of the messages using shared secret information, directing the computing device to exchange the secret information via a dedicated quantum channel in the time-sensitive network, and instructing the computing devices to change the secret information at a rate that is a fraction of a rate at which one or more of the messages or frames of the messages are exchanged between the computing devices.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
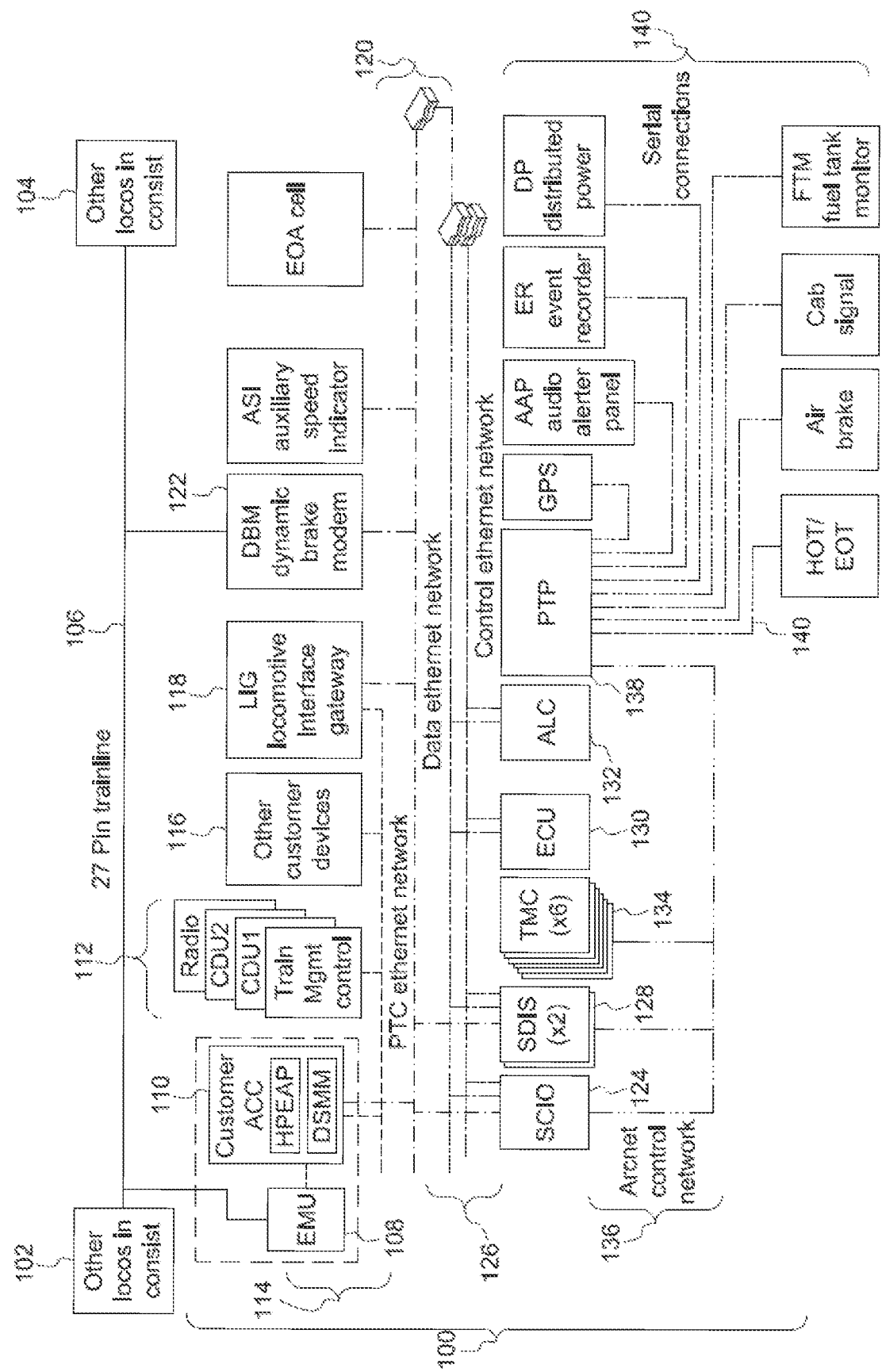
FIG. 1 illustrates one example of a vehicle control system.

FIG. 1 illustrates one example of a vehicle control system 100. The vehicle control system 100 may be disposed onboard one or more vehicles of a vehicle system. For example, the control system 100 may be disposed onboard a locomotive of a rail vehicle system formed from the locomotive and one or more other locomotives 102, 104. The locomotives in the vehicle system are communicatively coupled by a wired connection 106, such as a 27-pin trainline cable. Other control systems identical or similar to the control system 100 shown in FIG. 1 may be disposed onboard the other locomotives 102, 104, with the various control systems 100 communicatively coupled (e.g., able to communicate with each other) via the wired connection 106. While the control system 100 is shown as being disposed onboard a locomotive of a rail vehicle system, alternatively, the control system 100 may be disposed onboard another type of vehicle. For example, the control system 100 may be disposed onboard an automobile, a marine vessel, a mining vessel, or another off-highway vehicle (e.g., a vehicle that is not legally permitted or that is not designed for travel along public roadways).

The control system 100 communicates via the wired connection 106 via a vehicle system interface device 108 ("EMU" in FIG. 1), such as an Ethernet over a multiple unit (MU) cable interface. The interface device 108 represents communication circuitry, such as modems, routing circuitry, etc. A front-end controller 110 ("Customer ACC" in FIG. 1) is coupled with the interface device 108 by one or more wired connections. The controller 110 represents hardware circuitry that couples with (e.g., receives) one or more other circuits (e.g., compute cards) that control operation of the control system 100. As shown in FIG. 1, the controller 110 also may be connected with the second communication network 120.

Several control devices 112, such as a radio, display units, and/or vehicle system management controllers, are connected with the interface device 108 and the controller 110 via a first communication network 114 ("PTC Ethernet Network" in FIG. 1). The communication network 114 may be an Ethernet network that communicates data packets between components connected to the network 114. One or more other devices 116 may be connected with the network 114 to provide other functions or control over the vehicle.

The networks described herein can be formed from a structure of communication devices and hardware, such as cables interconnecting devices, wireless devices interconnecting other devices, routers interconnecting devices, switches interconnecting devices, transceivers, antennas, and the like. One or more networks described herein can be entirely off-board all vehicles. Optionally, at least part of a network can be disposed onboard one or more vehicles, such as by having one or more hardware components that form the network being onboard a vehicle and communicating in the network as the vehicle is moving. Additionally or alternatively, a network can be disposed entirely onboard a vehicle or vehicle system, such as when the components communicating with each other to form the network are all disposed onboard the same vehicle or onboard multiple vehicles that travel together along routes as a vehicle system.

An interface gateway 118 also is connected with the first communication network 114. The interface gateway 118 is referred to as a locomotive interface gateway ("LIG" shown in FIG. 1), but optionally may be referred to by another name depending on the type of vehicle that the interface gateway 118 is disposed upon. The interface gateway 118 represents hardware circuitry that communicatively couples the first network 114 with at least a second communication network 120. In the illustrated embodiment, the second communication network 120 is referred to as a data Ethernet network, and can represent an Ethernet network similar to the first network 114.

The interface gateway 118 can provide a communication bridge between the two networks 114, 120. For example, the interface gateway 118 can change protocols of communications between the two networks 114, 120, can determine which communications to allow to be communicated from a device on one network 114 or 120 to a device on the other network 120 or 114 (for example, by applying one or more rules to determine which communications may be allowed to pass between the networks 114, 120), or otherwise control communications between the two networks 114, 120.

A dynamic brake modem 122 ("DBM" in FIG. 1) also is connected with the second network 120. This brake modem 122 also can be referred to as a dynamic brake modem. The dynamic brake modem 122 also may be connected with the wired connection 106. The dynamic brake modem 122 represents hardware circuitry that receives control signals from one or more other vehicles 102, 106 via the wired connection 106 and/or via the second network 120 in order to control one or more brakes of the vehicle. For example, the dynamic brake modem 122 may receive a control signal from the vehicle 102, 104 or from an input/output device 124 ("SCIO" shown in FIG. 1 and described below) that reports the dynamic braking capability of the vehicle so that the braking capacity of the entire consist can be computed. The dynamic brakes can represent traction motors that operate in a regenerative braking mode to slow or stop movement of the vehicle. The dynamic brake modem is a FRA (Federal Rail Administration) required item for modern control systems.

The input/output device 124 represents one or more devices that receive input from an operator onboard the vehicle and/or that present information to the operator. The input/output device 124 may be referred to as a super centralized input/output device (one device), and can represent one or more touchscreens, keyboards, styluses, display screens, lights, speakers, or the like. The input/output device 124 is connected with the second communication network 120 and also is connected with a third communication network 126. The third communication network 126 also can be an Ethernet network, and may be referred to as a control Ethernet network, as shown in FIG. 1. This network can also be either single path or can be implemented in a redundant network.

Several display devices 128 may be connected with the input/output device 124 via the third network 126 and optionally may be connected with the input/output devices 124 and other components via the second communication network 120. An engine control unit 130 ("ECU" in FIG. 1) represents hardware circuitry that includes and/or is connected with one or more processors (for example, one or more microprocessors, field programmable gate arrays, and/or integrated circuits) that generate control signals communicated to an engine of the vehicle (for example, based on input provided by the input/output device 124) to control operation of the engine of the vehicle.

An auxiliary load controller 132 ("ALC" in FIG. 1) represents hardware circuitry that includes and/or is connected with one or more processors (for example, one or more microprocessors, field programmable gate arrays, and/or integrated circuits) that control operation of one or more auxiliary loads of the vehicle. The auxiliary loads may be loads that consume electric current without propelling movement of the vehicle. These auxiliary loads can include, for example, fans or blowers, battery chargers, or the like.

One or more traction motor controllers 134 ("TMC" in FIG. 1) control operation of traction motors of the vehicle. The traction motor controllers 134 represent hardware circuitry that includes and/or is connected with one or more processors (for example, one or more microprocessors, field programmable gate arrays, and/or integrated circuits) that generate control signals to control operation of the traction motors. For example, based on or responsive to a throttle setting selected by an operator input via the input/output devices 124 and communicated to the traction motor controllers 134 via a fourth communication network 136, the traction motor controllers 134 may change a speed at which one or more of the traction motors operate to implement the selected throttle setting.

In the illustrated example, the communication network 136 differs from the communication networks 114, 120, 126 in that the fourth communication network 136 may be a deterministic communication network. The fourth communication network 136 is an ARCnet control network, which is a deterministic communication network. A deterministic communication network may be a communication network that ensures successful communication between devices communicating with each other through the network by only allowing certain devices to communicate with each other at different times. In one example, a deterministic communication network 136 may only allow a device to communicate with another device during a time period that the device sending the communication has or is associated with a communication token. For example, if the input/output device 124 has the token during a first time period, then the input/output device 124 can send control signals or other signals to the display devices 128, the traction motor controllers 134, and/or a protocol translator 138 during the first time period, but none of the display devices 128, traction motor controllers 134, or protocol translator 138 may be allowed to send communications to any other device on the fourth location network 136 during this first time period.

During a subsequent, non-overlapping second time period, the protocol translator 138 may have the token and is allowed to communicate with other devices. No other components connected with the fourth communication network 136 other than the protocol translator 138 may be allowed to send communications during the second time period. In contrast, the Ethernet communication networks 114, 120, 126 may allow multiple, or all, devices connected to the respective network 114, 120, 126 to communicate with each other at the same time. For example, two or more of the components connected to the network 114, 120, and/or 126 can communicate with each other at the same time by concurrently or simultaneously sending data packets in the network 114, 120, and/or 126.

The protocol translator 138 ("PTP" shown in FIG. 1) represents hardware circuitry that converts a protocol of signals communicated by one or more additional devices 140 of the vehicle. These devices 140 may communicate using signals having a different protocol (e.g., a different syntax, a different format, or the like) than signals communicated by the devices communicating on the deterministic communication network 136. For example, the devices 140 may communicate with the protocol translator 138 over serial connections 142. The devices 140 may include sensors that monitor operation of the vehicle. Examples of these devices 140 include a location determining device (for example, a global positioning system receiver), an audio alarm panel ("AAP" in FIG. 1), an event recorder or log ("ER" in FIG. 1), a distributed power device ("DP" in FIG. 1, such as a device that coordinates operations of the vehicle with the operations of other vehicles 102, 104 in the same vehicle system), a head of train/end of train communication device ("HOT/EOT" in FIG. 1), an airbrake controller ("Air brake" in FIG. 1), a signaling controller ("Cab signal" in FIG. 1), a fuel gauge or fuel tank sensor ("FTM" in FIG. 1), or the like.

As shown in FIG. 1, the control system 100 includes many communication networks 114, 120, 126, 136, and the serial connections of the devices. These many communication networks add increased cost and complexity to control system 100, and may provide for additional points of failure in a control system 100. Simply reducing the number of networks in the control system 100, however, may present additional problems. For example, merely connecting the devices that control movement of the vehicle (e.g., the input/output device 124, the display devices 128, the engine control unit 130, the auxiliary load controller 132, and/or the traction motor controllers 134) with an Ethernet network (that may or may not be connected with one or more of the devices 140) could result in so much information or data being communicated in the network that communications with the devices that control movement of the vehicle may be prevented, interrupted, or otherwise interfered with.

Figure 2:
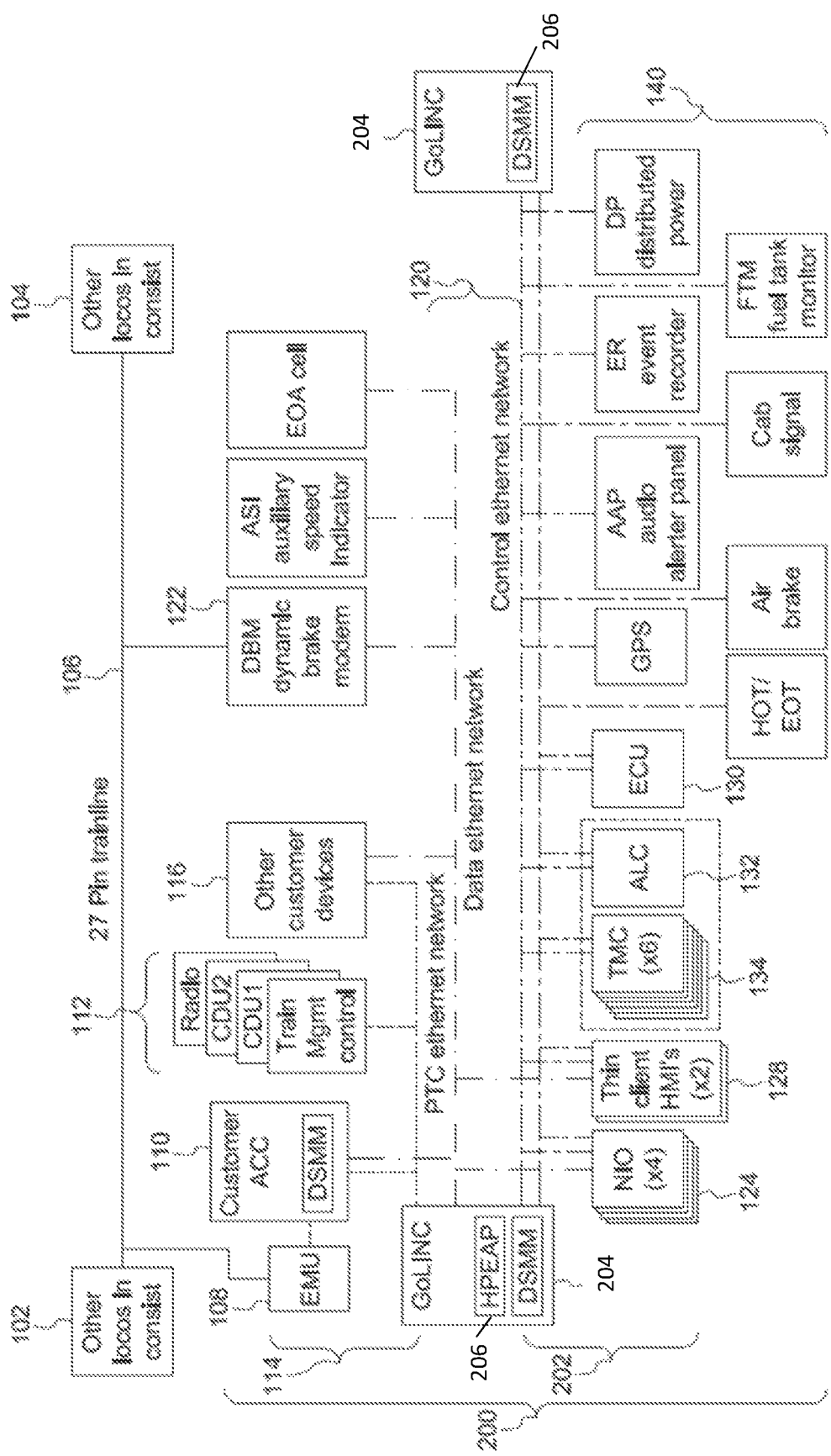
FIG. 2 illustrates a vehicle control system according to one embodiment of the subject matter described herein.

FIG. 2 illustrates a vehicle control system 200 according to one embodiment of the subject matter described herein. Similar to the control system 100 shown in FIG. 1, the control system 200 is described in connection with a rail vehicle system, but optionally may be used in connection with another type of vehicle, such as automobile, marine vessel, a mining vehicle, or the like. The control system 200 may be disposed onboard a vehicle in a vehicle system that includes the one or more other vehicles 102, 104. The wired connection 106 may communicatively coupled with the vehicle on which the control system 200 is disposed, as well as the vehicles 102, 104, as described above. The control system 200 includes many of the same components described above in connection with the control system 100.

One difference between the control system 100 and the control system 200 shown in FIG. 2 is that the devices 140 that do not control movement of the vehicle and the devices that control movement of the vehicle (e.g., the engine control unit 130, the auxiliary load controller 132, the traction motor controllers 134, the display devices 128, and input/output devices 124) are all connected with a common (e.g., the same) communication network 202. This communication network 202 may be an Ethernet network, such as a control Ethernet network. The network 120 described above in connection with FIG. 1 may also be present in the control system 200 and also may be connected with the display devices 128 and the input/output devices 124, as described above and shown in FIG. 2.

Another difference between the control systems 100, 200 is that the devices 140 are directly connected with the network 202 without having to be connected with the other devices 124, 128, 130, 132, 134 by the protocol translator 138 shown in FIG. 1. This allows for the devices 140 to directly communicate with each other and/or with the devices 124, 128, 130, 132, 134 without having to communicate via the translator 138.

One additional difference between the control systems 100, 200 is that the interface gateway 118 is not present between the communication networks 114, 120. Instead, one or more linking gateways 204 are connected with the communication network 202 and or the networks 114, 120, as shown in FIG. 2. The linking gateways 204 represent hardware circuitry that can control which signals are communicated between the different networks 114, 120, 202. For example, the linking gateways 204 can determine whether a communication is permitted to pass from one device connected with the network 120 to one or more devices connected to the network 202. The linking gateways 204 may receive one or more computing cards 206 that provide customizable functionality, such as one or more operations or functions desired by a customer or user of the control system 200. In contrast, the interface gateway 118 shown in FIG. 1, may not be customizable by an end-user, but instead the operations of the interface gateway 118 may be dictated by the manufacturer of the control system 100.

The devices 140 can provide data or other information that is useful for the monitoring and control of the vehicle system, but this information and data may be less important to the safe operation of the vehicle and vehicle system relative to communications and information communicated between other devices connected to the same network 202 (e.g., the input/output devices 124, the display devices 128, the traction motor controllers 134, auxiliary load controllers 132, and/or the engine control unit 130). For example, while determining the location of the vehicle may be useful from one of the devices 140, it may be more important to the safe operation of the vehicle to be able to ensure communication between the traction motor controller and the input/output devices 124.

Connecting these more critical devices with less critical devices 140 on the same Ethernet network 202 could present problems with increased risk of communications to and/or from the more critical components not being received or sent to or from these components due to the increased traffic on the network caused by data indicated by the less critical devices 140. While communications to or from the devices 124, 128, 130, 132, 134 may be assigned with higher priorities than communications with the devices 140, the amount of data being communicated on the Ethernet network 202 may, at times, be too large to ensure the communications to or from the devices 124, 128, 130, 132, 134 are received.

To ensure these communications with the devices 124, 128, 130, 132, 134, 140 are sent and/or received in time (for example, that a change to a throttle setting received by the input/output devices 124 is received by the traction motor controllers 134 within a designated period of time, such as within a few milliseconds), the communication network 202 may operate as a data distribution service (DDS) running on a time sensitive network (TSN).

In one embodiment, the data distribution service is an object management group middleware communication standard for communication between and/or among the devices 124, 128, 130, 132, 134, 140 using the network 202. The devices 124, 128, 130, 132, 134, 140 that communicate using the data distribution service may be referred to as publishers and/or subscribers. A publisher is a device 124, 128, 130, 132, 134, 140 that provides data or information for one or more other devices 124, 128, 130, 132, 134, 140 to obtain. A subscriber is a device 124, 128, 130, 132, 134, 140 that receives or obtains this data or information (and performs some function using that data or information). The same device 124, 128, 130, 132, 134, 140 may be both a publisher of some data and a subscriber to other data. For example, the input/output device 124 may be a publisher of some data (e.g., instructions received from an operator to change a throttle setting) and a subscriber of other data (e.g., sensor data provided by one or more of the devices 140 for display to the operator).

In one embodiment, the data distribution service is used by the devices 124, 128, 130, 132, 134, 140 to communicate data through the network 202 that is established according to at least some of the standards developed by the Time-Sensitive Networking Task Group, which may include or otherwise comply with one or more of the IEEE 802.1 standards. In contrast to an Ethernet network operating without TSN that communicates data frames or packets in a random manner, the TSN network 202 may communicate data frames or packets according to a type or category of the data or information being communicated. This can ensure that the data is communicated within designated time periods or at designated times. In other Ethernet networks, some data may not reach devices in sufficient time for the devices to operate using the data. With respect to some vehicle control systems, the late arrival of data can have significantly negative consequences, such as an inability to slow or stop movement of a vehicle in time to avoid a collision.

The TSN-based Ethernet network 202, however, can dictate when certain data communications occur to ensure that certain data frames or packets are communicated within designated time periods or at designated times. Data transmissions within the TSN-based Ethernet network 202 can be based on times or time slots in which the devices 124, 128, 130, 132, 134, 140 communicate being scheduled for at least some of the devices 124, 128, 130, 132, 134, 140. The communications between or among some of the devices 124, 128, 130, 132, 134, 140 may be time sensitive communications or include time sensitive data. Time sensitive communications involve the communication of time sensitive data within designated periods of time. For example, data indicative of a change in a brake setting may need to be communicated from the input/output device 124 to the traction motor controllers 134 within several milliseconds of being sent by the input/output device 124 into the network 202. The failure to complete this communication within the designated time limit or period of time may prevent the vehicle from braking in time. Other non-time sensitive communications may be communications that do not necessarily need to be communicated within a designated period of time, such as communication of a location of the vehicle from the GPS receiver, a measurement of the amount of fuel from the fuel sensor, etc. These non-time sensitive communications may be best effort communications or rate constrained communications.

Best effort communications may be communicated within the network 202 when there is sufficient bandwidth in the network 202 to allow for the communications to be successfully completed without decreasing the available bandwidth in the network 202 below a bandwidth threshold needed for the communication of time sensitive communications between publishers and subscribers. For example, if 70% of the available bandwidth in the network 202 is needed at a particular time to ensure that communications with the engine control unit 130 and traction motor controllers 134 successfully occur, then the remaining 30% of the available bandwidth in the network 202 may be used for other communications, such as best effort communications with the auxiliary load controller 132. The bandwidth threshold may be a user-selected or default amount of bandwidth. The communication of these best effort communications may be delayed to ensure that the time sensitive communications are not delayed.

Rate constrained communications are communications that are communicated using the remaining amount of bandwidth, if any, in the network 202. For example, a rate constrained communication may be sent between devices using the bandwidth in the network 202 that is not used by the time sensitive communications and the best effort communications. If no bandwidth is available (e.g., the time sensitive and best effort communications consume all the available bandwidth), then the rate constrained communication may not occur until more bandwidth is available.

The type of communication with a device may be set by the controller 110 and/or the operator of the system 200. For example, the controller 110 may designate that all communications to and/or from the engine control unit 132, the traction motor controllers 134, and the input/output devices 124 are time sensitive communications, communications to and/or from the display devices 128 and auxiliary load controller 132 are best effort communications, and the communications to and/or from the devices 140 are rate constrained communications. Optionally, the type of information being communicated by these devices may determine the type of communications. For example, the controller 110 may establish that control signals (e.g., signals that change operation of a device, such as by increasing or decreasing a throttle of a vehicle, applying brakes of a vehicle, etc.) communicated to the engine control unit 132 and/or traction motor controllers 134 may be time sensitive communications while status signals (e.g., signals that indicate a current state of a device, such as a location of the vehicle) communicated from the engine control unit 132 and/or traction motor controllers 134 are best effort or rate constrained communications. In one embodiment, different types of communication can be used to send command signals that control movement or other operation of a vehicle. For example, a command signal can be communicated to a vehicle to change a throttle of the vehicle, apply brakes of the vehicle, release brakes of the vehicle, or the like, as a time sensitive communication, a rate constrained communication, and/or a best effort communication.

Figure 3:
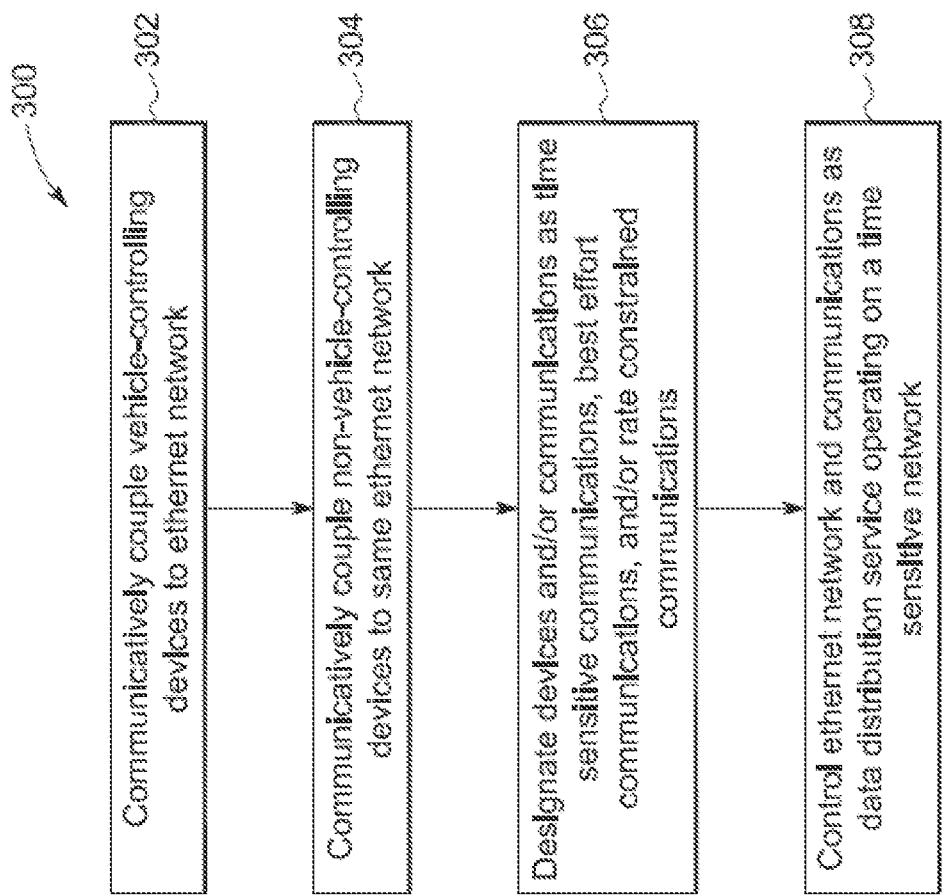
FIG. 3 illustrates one embodiment of a method for establishing a communication network between devices of a vehicle control system.

FIG. 3 illustrates one embodiment of a method 300 for establishing a communication network between devices of a vehicle control system. The method 300 may be used to create the network 202 shown in FIG. 2. At 302, several different vehicle-controlling devices 124, 130, 134 are communicatively coupled with each other by an Ethernet network. These devices 124, 130, 134 are components that operate to control a vehicle, such as by changing throttle settings, applying or disengaging brakes, or the like, to control movement of the vehicle.

At 304, several non-vehicle-controlling devices 128, 132, 140 are communicatively coupled with each other and with the vehicle-controlling devices 124, 130, 134 by the same Ethernet network as the vehicle-controlling devices 124, 130, 134. For example, the devices 128, 132, 140 may send and/or receive data that is used to monitor and/or diagnose operation of the vehicle, but that is not used to control movement of the vehicle during movement of the vehicle. These devices 128, 132, 140 may be connected with the same network as the vehicle-controlling devices 124, 130, 134 without a protocol translator being used to change protocols or other aspects of the communications from and/or to the non-vehicle-controlling devices 128, 132, 140.

At 306, the devices and/or communications connected to the same Ethernet network are designated as time sensitive communications, best effort communications, or rate constrained communications. As described above, the time sensitive communications may be communications with devices that need to be completed in a short period of time (e.g., within a designated period of time, such as thirty milliseconds) to ensure that the vehicle is safely controlled, while best effort and/or rate constrained communications may not need to be completed within such short periods of time.

At 308, the network is controlled as a data distribution service operating on a time sensitive network. The controller 110 can control communications within the network in this manner to provide a flexible Ethernet network that can have additional devices added to and/or devices removed from the network, without sacrificing or risking the time sensitive communications of some devices on the network. For example, the addition of a device 140 to the network 202 can be completed without the network 202 changing the communications to and/or from the devices 124, 130, 134 from time sensitive communications to another type of communication. The devices 124, 130, 134 may continue communicating with each other and/or other devices using the time sensitive communications of the network 202, while the new and/or other devices can continue communicating as best effort and/or rate constrained communications.

In one embodiment, a data distribution service as described herein can operate on a network that is operating as a time sensitive network implementation of the IEEE 802.1 Ethernet standards.

In one embodiment, a control system includes a controller configured to control communication between or among plural vehicle devices that control operation of a vehicle via a network that communicatively couples the vehicle devices. The controller also is configured to control the communication using a data distribution service (DDS) and with the network operating as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the network is an Ethernet network at least partially disposed onboard the vehicle.

In one example, the vehicle devices include two or more of an input/output device, an engine control unit, a traction motor controller, a display device, an auxiliary load controller, and/or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the network while the second and third set of the vehicle devices communicate the best effort communications and the rate constrained communications using a remaining amount of bandwidth of the network that is not used by the time sensitive communications.

In one example, the vehicle is a rail vehicle.

In one example, the vehicle is an automobile.

In one embodiment, a control system includes a controller configured to control communication between plural vehicle devices that control one or more operations of a vehicle. The controller also is configured to control the communication between or among the vehicle devices through an Ethernet network while the Ethernet network operates as a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the Ethernet network is at least partially disposed onboard the vehicle.

In one example, the vehicle devices include two or more of an input/output device, an engine control unit, a traction motor controller, a display device, an auxiliary load controller, or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the Ethernet network while the second and third set of the vehicle devices communicate the best effort communications and the rate constrained communications using a remaining amount of bandwidth of the Ethernet network that is not used by the time sensitive communications.

In one example, the vehicle is a rail vehicle.

In one example, the vehicle is an automobile.

In one embodiment, a control system includes a controller configured to control communications between plural vehicle devices onboard a vehicle through a time sensitive network (TSN). The controller is configured to direct a first set of the vehicle devices to communicate using time sensitive communications, a different, second set of the vehicle devices to communicate using best effort communications, and a different, third set of the vehicle devices to communicate using rate constrained communications.

In one example, the TSN network is an Ethernet network that is at least partially disposed onboard the vehicle.

In one example, the vehicle devices include two or more of an input/output device, an engine control unit, a traction motor controller, a display device, an auxiliary load controller, or one or more sensors.

In one example, one or more of the engine control unit or the traction motor controller is included in the first set of vehicle devices using the time sensitive communications.

In one example, the controller is configured to direct the first set of the vehicle devices to communicate using the time sensitive communications such that the time sensitive communications are completed using bandwidth of the TSN network while the second and third set of the vehicle devices communicate the best effort communications and the rate constrained communications using a remaining amount of bandwidth of the TSN network that is not used by the time sensitive communications.

In one example, the vehicle is a rail vehicle.

One or more embodiments of the subject matter described herein provide systems and methods that distribute the scheduling tasks for time sensitive networks (TSN). The TSN may be formed from several node devices that communicate with each other. In contrast to a network having a single scheduler or scheduling device that determines when different communications occur through these node devices, one or more embodiments of the subject matter described herein divide or place these scheduling tasks on many, or all, of the node devices that participate in the TSN.

Certain embodiments of the present disclosure provide systems and methods that apply quality of service (QoS) requirements of a data distribution service to a time sensitive network (TSN) or time-triggered Ethernet (TTE) network in control systems of powered systems. The systems and methods map a configuration of QoS requirements of the data distribution service to TSN/TTE in order to ensure communication of certain types of data among devices within a control system while allowing other devices to communicate within the same network of the same control system. A mapping between TSN/TTE network parameters and parameters of the data distribution service allows the TSN/TTE network to provide the QoS required by the data distribution service. While the description herein focuses on TSN, one or more embodiments also are applicable to TTE networks and various data distribution systems.

The systems and methods described herein address how TSN should interpret and react to the QoS requirements of the data distribution service. By mapping configuration parameters of the data distribution service to the configuration parameters of TSN, a scheduler of TSN can create schedules that support QoS requirements of the data distribution service for time-critical control applications.

A time-critical control application includes an operation of one or more devices in a control system that relies on receipt of data in sufficient time to allow the one or more devices to react based on the data and provide an effective responsive action. As one example of a time-critical control application, a sensor onboard a vehicle (e.g., an automobile, locomotive, etc.) detects the presence of objects outside the vehicle that pose a risk of collision with the vehicle. This sensor communicates data representative of one or more potential collisions to a control system of the vehicle. In response to receipt of this data, the control system may automatically apply brakes and/or reduce a throttle of the vehicle. If the data indicative of the collision is not received by the control system early enough to allow the control system to examine the data, determine that the brakes should be applied and/or the throttle should be reduced, and communicate appropriate signals to the brake and/or throttle, then the control system may not be able to safely apply the brakes and/or reduce the throttle.

The systems and methods described herein enable devices communicating using a variety of data distribution services (referred to herein as publishers and subscribers) to communicate in real-time to the corresponding talkers and listeners within the TSN standard to allow communication links to be dynamically allocated between or among the devices when needed.

Figure 4:
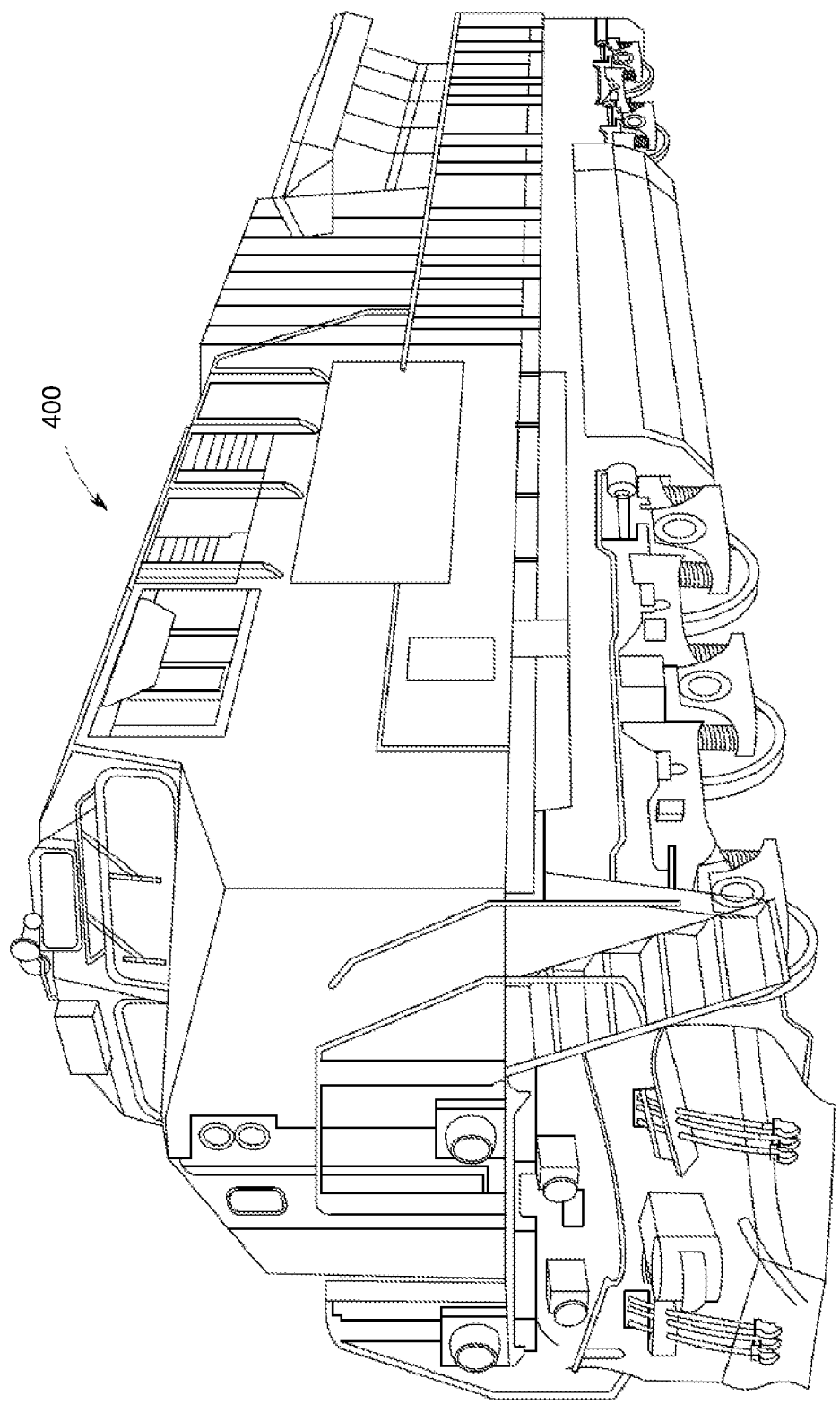
FIG. 4 illustrates one example of a powered system having a control system that uses one or more embodiments of subject matter described herein.
Figure 5:
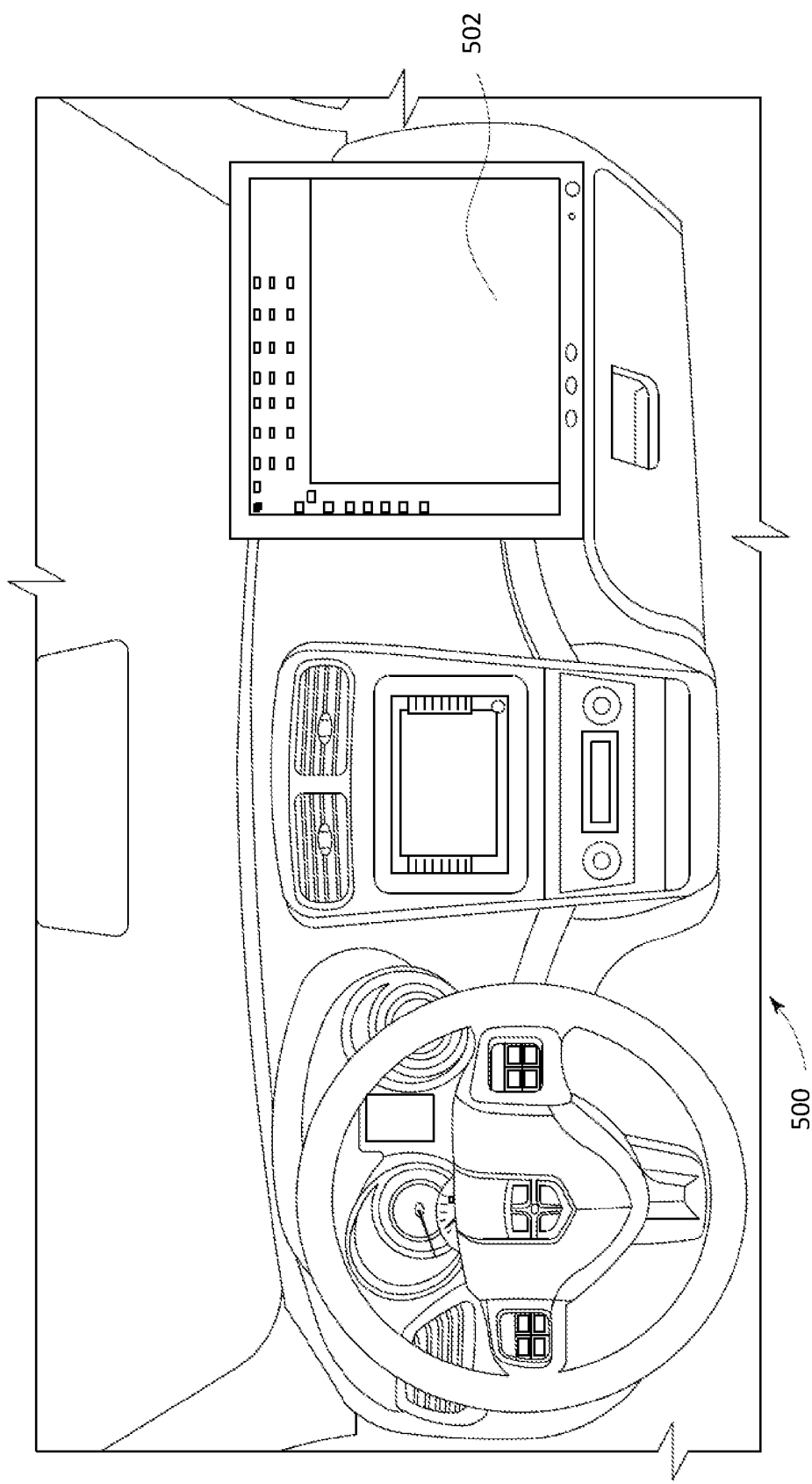
FIG. 5 illustrates another example of a powered system having a control system that uses one or more embodiments of subject matter described herein.
Figure 6:
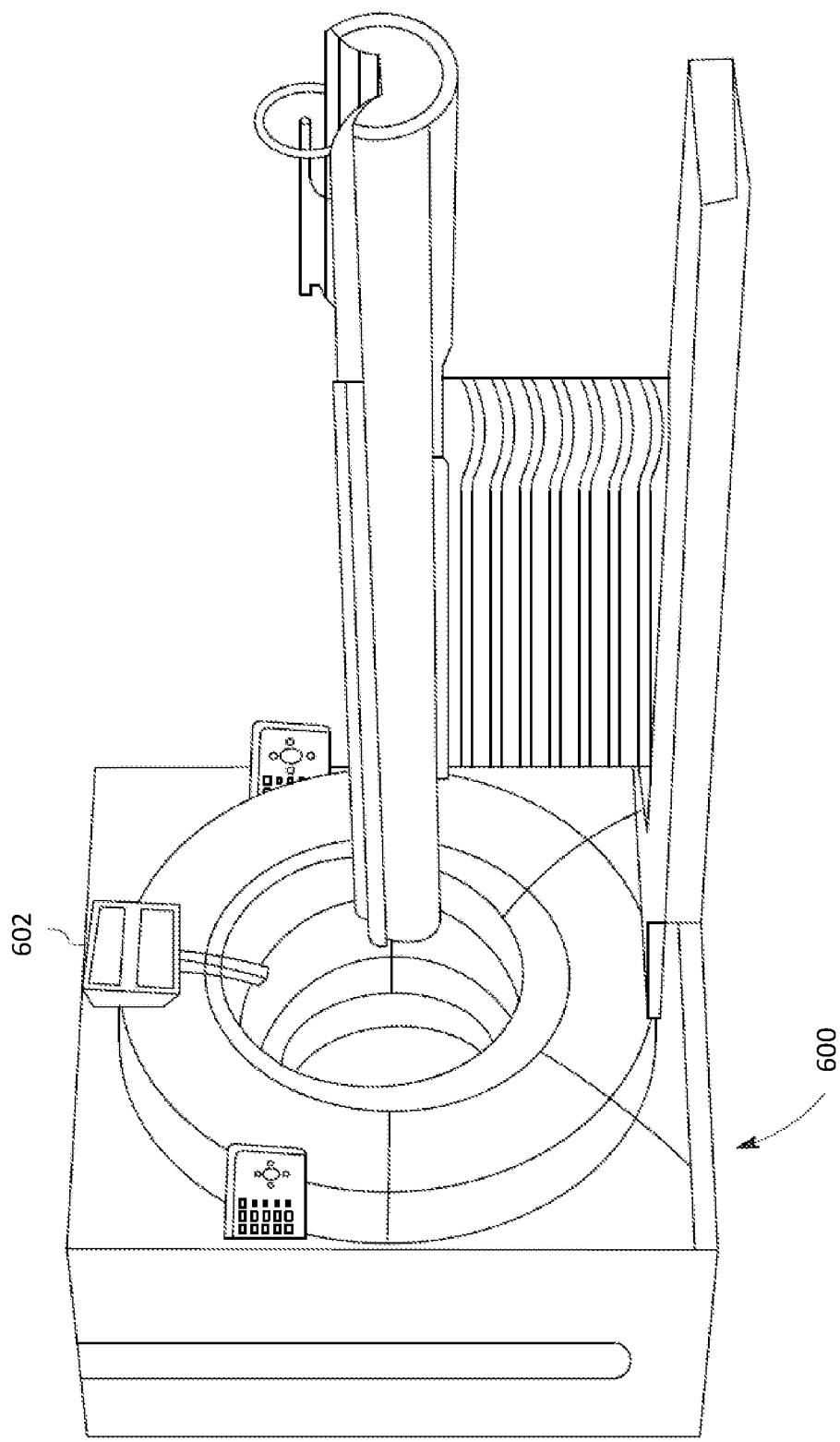
FIG. 6 illustrates another example of a powered system having a control system that uses one or more embodiments of subject matter described herein.
Figure 7:
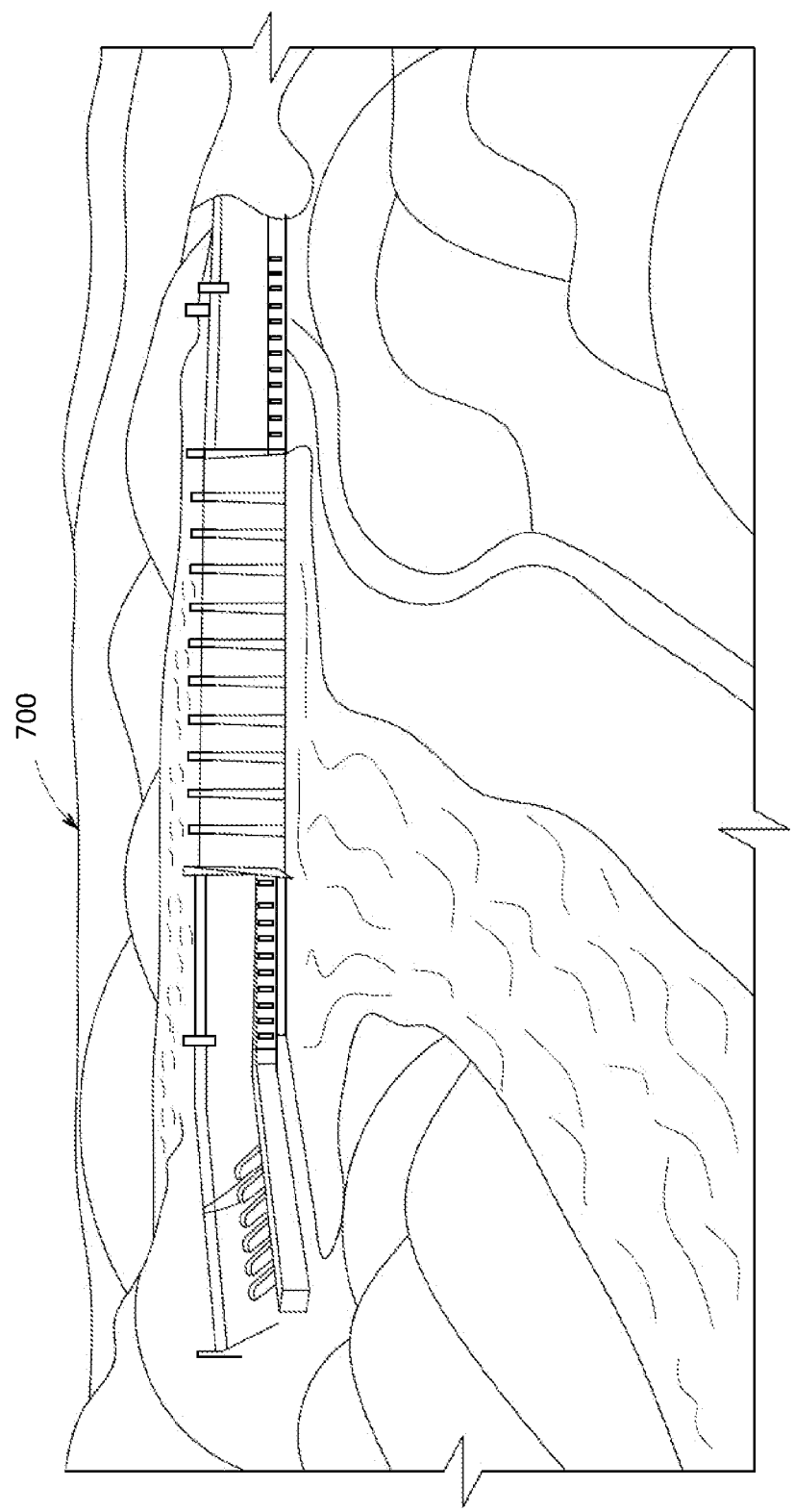
FIG. 7 illustrates another example of a powered system having a control system that uses one or more embodiments of subject matter described herein.

FIGS. 4 through 7 illustrate several examples of powered systems 400, 500, 600, 700 having control systems that use one or more embodiments of subject matter described herein. The powered system 400 shown in FIG. 4 is a locomotive, which has a control system that controls operations (e.g., movement and other actions) of the locomotive based on data obtained by, generated by, and/or communicated among devices of the locomotive and/or off-board the locomotive. The powered system 500 shown in FIG. 5 is an automobile, which has a control system 502 that controls operations (e.g., driver warnings, automated movement, or other actions) of the automobile based on data obtained by, generated by, and/or communicated among devices of the automobile and/or off-board the automobile. The powered system 600 shown in FIG. 6 is a medical device, such as a magnetic resonance imaging (MRI) device. Alternatively, the powered system 600 may represent several medical devices, such as medical equipment within a surgical suite, emergency room, hospital, or the like. The powered system 600 may include a control system 602 that controls operations of the medical equipment or devices, communicates information between or among the medical equipment or devices, etc., to allow for automated control of the equipment or devices, to provide information to operators of the equipment or devices, etc. The powered system 700 shown in FIG. 7 is a hydraulic power plant, which has a control system that controls operations of the plant based on data obtained by, generated by, and/or communicated among devices of the plant.

Figure 8:
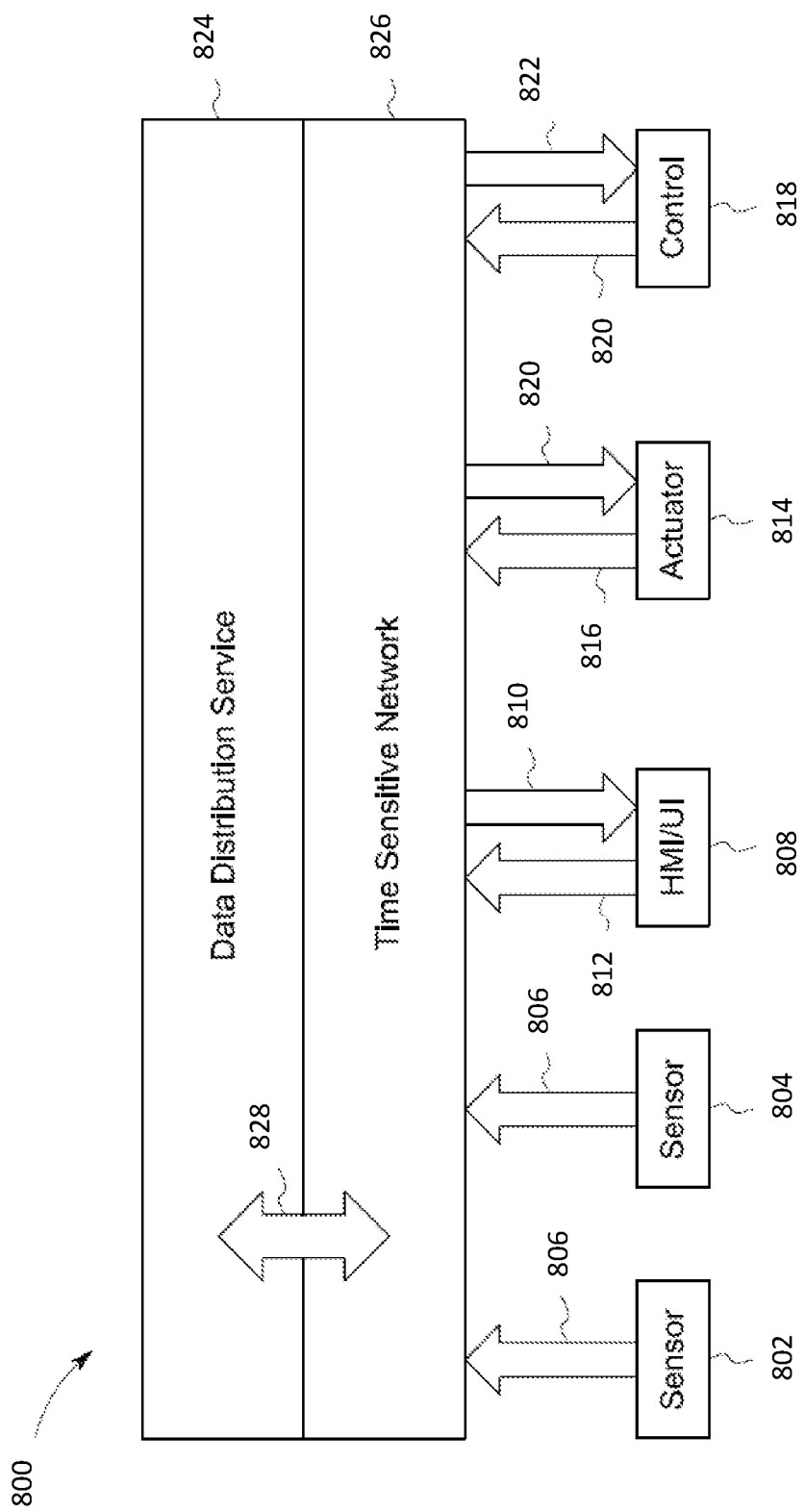
FIG. 8 illustrates one embodiment of a communication system.

FIG. 8 illustrates one embodiment of a communication system 800. The communication system 800 may be used by a control system 818 ("Control" in FIG. 8) to communicate data between or among devices of the control system 818 and/or the powered system that is controlled by the control system 818. The control system 818 may represent one or more of the control systems 400, 500, 600, 700 shown in FIGS. 4 through 7. The control system 818 shown in FIG. 8 represents hardware circuitry that includes and/or is connected with one or more processors (e.g., microprocessors, integrated circuits, field programmable gate arrays, etc.) that perform operations to control the powered system(s).

The communication system 800 communicates data between several devices, such as sensors 802, 804 that monitor, measure, record, etc. information and communicate this information as sensor data 806. Another device that can communicate via the communication system 800 can include a human machine interface (HMI) or user interface (UI) 808 (shown as "HMI/UI" in FIG. 8) that receives output or status data 810 that is to be presented to a user or operator of the communication system 800 or control system 818 and that can communicate input data 812 received from the user or operator to one or more other devices of the control system. The HMI/UI 808 can represent a display device, touchscreen, laptop, tablet computer, mobile phone, speaker, haptic device, or other device that communicates or conveys information to a user or operator.

In one embodiment, at least one of the sensors 802, 804 may be a camera that generates video or image data, an x-ray detector, an acoustic pick-up device, a tachometer, a global positioning system receiver, a wireless device that transmits a wireless signal and detects reflections of the wireless signal to generate image data representative of bodies or objects behind walls, sides of cars, or other opaque bodies, or another device.

Another device that can communicate using the communication system 800 includes one or more actuators 814, which represent devices, equipment, or machinery that move to perform one or more operations of the powered system that is controlled by the control system 818. Examples of actuators 814 include brakes, throttles, robotic devices, medical imaging devices, lights, turbines, etc. The actuators 814 can communicate status data 816 of the actuators 814 to one or more other devices in the powered system via the communication system 800. The status data 816 represent a position, state, health, or the like, of the actuator 814 sending the status data 816. The actuators 814 can receive command data 820 from one or more other devices of the powered system or control system via the communication system 800. The command data 820 represents instructions that direct the actuators 814 how and/or when to move, operate, etc.

The control system 818 can communicate (e.g., receive, transmit, and/or broadcast) a variety of data between or among the devices via the communication system 800. For example, the control system 818 can communicate the command data 820 to one or more of the devices and/or receive data 822, such as status data 816 and/or sensor data 806, from one or more of the devices. While devices are shown in FIG. 8 as sending certain data or receiving certain data, optionally, the devices may send and/or receive other types of data. For example, the sensors 802, 804 may receive data and/or send other types of data.

The communication system 800 communicates data between or among the devices and/or control system 818 using a communication network 826 that communicates data using a data distribution service 824. The network 826 is shown in FIG. 8 as a time sensitive network, but alternatively may be another type of network. The data distribution service 824 represents an object management group (OMG) device-to-device middleware communication standard between the devices and the network. The data distribution service 824 allows for communication between publishers and subscribers. The term publisher refers to devices 802, 804, 808, 814, 818 that send data to other devices 802, 804, 808, 814, 818 and the term subscriber refers to devices 802, 804, 808, 814, 818 that receive data from other devices 802, 804, 808, 814, 818. The data distribution service 824 is network agnostic in that the data distribution service 824 can operate on a variety of networks, such as Ethernet networks as one example. The data distribution service 824 operates between the network through which data is communicated and the applications communicating the data (e.g., the devices 802, 804, 808, 814, 818). The devices 802, 804, 808, 814, 818 can publish and subscribe to data over a distributed area to permit a wide variety of information to be shared among the devices 802, 804, 808, 814, 818.

In one embodiment, the data distribution service 824 is used by the devices 802, 804, 808, 814, 818 to communicate data 806, 810, 812, 816, 820, 822 through the network 826, which may operate on an Ethernet network of the powered system. The network 826 may be at least partially defined by a set of standards developed by the Time-Sensitive Networking Task Group, and includes one or more of the IEEE 802.1 standards. While an Ethernet network may operate without TSN, such a network may communicate data frames or packets in a random or pseudo-random manner that does not ensure that the data is communicated within designated time periods or at designated times. As a result, some data may not reach devices connected via the non-TSN Ethernet network in sufficient time for the devices to operate using the data. With respect to some control systems, the late arrival of data can have significant consequences, as described above. A TSN-based Ethernet network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

The communication system 800 may use the network 826 to communicate data between or among the devices 802, 804, 808, 814, 818 using the data distribution service 824 to maintain QoS parameters 828 of certain devices 802, 804, 808, 814, 818. The QoS parameters 828 of the devices 802, 804, 808, 814, 818 represent requirements for data communication between or among the devices 802, 804, 808, 814, 818, such as upper limits on the amount of time or delay for communicating data between or among the devices 802, 804, 808, 814, 818. The QoS parameters 828 are determined for the data distribution service 824 and mapped (e.g., applied, or used to dictate how and/or when data is communicated, as described herein) to the network 826 in one embodiment.

A QoS parameter 828 can dictate a lower limit or minimum on data throughput in communication between or among two or more devices 802, 804, 808, 814, 818. A QoS parameter 828 can be used to ensure that data communicated with one or more devices 802, 804, 808, 814, 818, to one or more devices 802, 804, 808, 814, 818, and/or between two or more devices 802, 804, 808, 814, 818 is received in a timely manner (e.g., at designated times or within designated time periods). A QoS parameter 828 can be defined by one or more other parameters. Examples of these other parameters can include a deadline parameter, a latency parameter, and/or a transport priority parameter.

The deadline parameter dictates an upper limit or maximum on the amount of time available to send and/or receive data associated with a particular topic. Data can be associated with a particular topic when the data is published by one or more designated devices (e.g., sensors measuring a particular characteristic of the powered system, such as speed, power output, etc.), then the data represents the particular characteristic (even if the data comes from different devices at different times), and/or is directed to the same device (e.g., the same actuator 814).

The latency parameter dictates an upper limit or maximum on a temporal delay in delivering data to a subscribing device 802, 804, 808, 814, 818 of the data. For example, the sensors 802, 804 may publish data 806 representative of operations of the powered system, and the HMI/UI 808, actuator 814, and/or control system 818 may require receipt of the sensor data 806 within a designated period of time after the data 806 is published by the sensors 802, 804. With respect to a sensor 802 that communicates a temperature of a motor or engine reaching or exceeding a designated threshold indicative of a dangerous condition, the control system 818 and/or actuator 814 may need to receive this temperature within a designated period of time to allow the control system 818 and/or actuator 814 to implement a responsive action, such as decreasing a speed of the engine or motor, shutting down the engine or motor, etc.

The transport priority parameter indicates relative priorities between two or more of the devices 802, 804, 808, 814, 818 to the network. Some devices 802, 804, 808, 814, 818 may have higher priority than other devices 802, 804, 808, 814, 818 to receive (or subscribe to) certain identified types or sources of data. Similarly, some devices 802, 804, 808, 814, 818 may have higher priority than other devices 802, 804, 808, 814, 818 to send (or publish) certain identified types or sources of data. Subscribing devices 802, 804, 808, 814, 818 having higher priorities than other devices 802, 804, 808, 814, 818 may receive the same data via the network from a source of the data prior to the lower-priority devices 802, 804, 808, 814, 818. Publishing devices 802, 804, 808, 814, 818 having higher priorities than other devices 802, 804, 808, 814, 818 may send the data that is obtained or generated by the higher-priority devices 802, 804, 808, 814, 818 into the network than lower-priority devices 802, 804, 808, 814, 818.

The QoS parameters 828 of the devices 802, 804, 808, 814, 818 may be defined by one or more, or a combination, of the deadline parameter, latency parameter, and/or transport priority parameter. The QoS parameters 828 are then used to determine data traffic schedules within the TSN using the data distribution service 824. Data traffic schedules can dictate communication paths and times at which data is communicated within the network.

Figure 9:
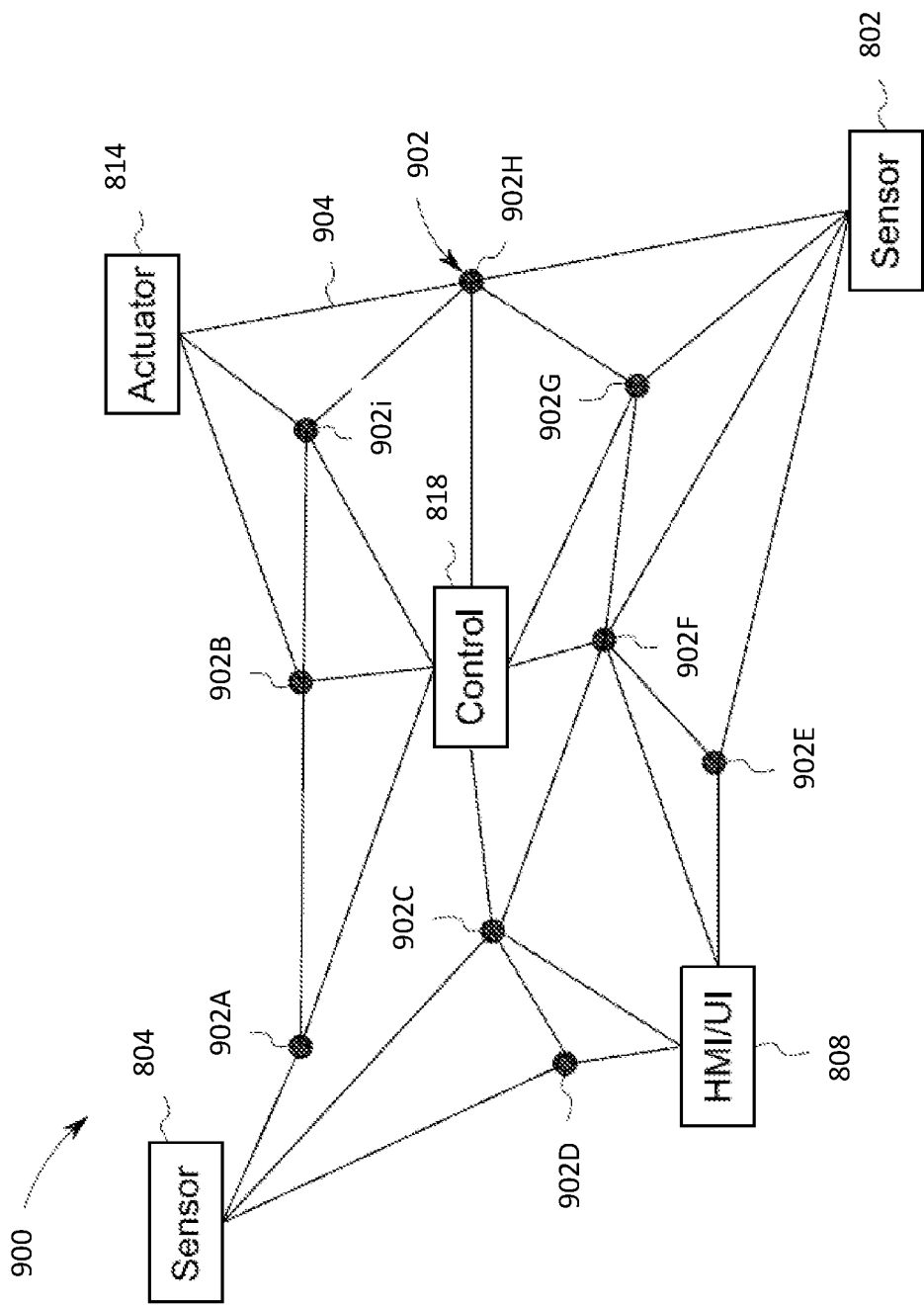
FIG. 9 schematically illustrates a communication network through which devices of the communication system may communicate data using a data distribution service shown in FIG. 8.

FIG. 9 schematically illustrates a communication network 900 through which the devices 802, 804, 808, 814, 818 may communicate the data 806, 810, 812, 816, 820, 822 using the data distribution service 824. The network 900 may be configured to operate as a TSN. The network 900 includes the devices 802, 804, 808, 814, 818 communicatively coupled with each other by communication links 904 and communication nodes 902 (e.g., nodes 902A-I). The nodes 902 can represent routers, switches, repeaters, or other devices capable of receiving data frames or packets and sending the data frames or packets to another node 902. In one embodiment, the devices 802, 804, 808, 814, 818 also can be nodes 902 in the network 900. The communication links 904 represent wired connections between the nodes 902, such as wires, buses, cables, or other conductive pathways between the nodes 902. Optionally, one or more of the communication links 904 includes a wireless connection or network between nodes 902.

The data 806, 810, 812, 816, 820, 822 can be communicated in the network 900 as data frames or data packets. The data frames or packets can be published by a device 802, 804, 808, 814, 818 and received by another device 802, 804, 808, 814, 818 by the frames or packets hopping, or moving from node 902 to node 902 along the links 904 within the network 900. For example, one or more of the data frames or packets of the data 806 published by the sensor 804 can be published to the network 900 and subscribed to by the control system 818. The data frames or packets may hop from the sensor 804 to the control system 818 by being communicated from the sensor 804 to the node 902A, then the node 902B, and then the control system 818, to the node 902C then the control system 818, to the node 902D, then the node 902C, and then the control system 818, etc. Different frames or packets may be communicated along different nodes 902 and paths 904 from the publishing device to the subscribing device.

The control system 818 can determine the QoS parameters 828 for the various devices 802, 804, 808, 814, 818, determine which devices 802, 804, 808, 814, 818 and nodes 902 can communicate with each other in the network 900, determine feasible schedules for communication of data from and/or to the devices 802, 804, 808, 814, 818 within the network 900, and determines frame communication schedules for the data frames to be communicated within the network 900 in order to satisfy, achieve, or avoid violating the QoS parameters 828 of the various devices 802, 804, 808, 814, 818.

The devices 802, 804, 808, 814, 818 can communicate the data (e.g., publish and/or subscribe to the data) according to the schedules dictated by the control system 818 to achieve or maintain the QoS parameters 828 of the devices 802, 804, 808, 814, 818. Other data and/or other devices may communicate with or among each other using the same network, but without a designated schedule and/or without being subject to QoS parameters 828. For example, the sensor 802, actuator 814, and control system 818 may have QoS parameters 828 and the control system 818 can dictate schedules for when the sensor 802, actuator 814, and control system 818 publish and/or receive data via the network 824. The network 826 can be an Ethernet based network that communicates different categories or groups or types of data according to different priorities. For example, the network 826 can communicate time sensitive data according to the schedule or schedules determined by the control system 818 to achieve or maintain the QoS parameters 828 of certain devices 802, 804, 808, 814, 818. The network 826 can communicate other data between or among the same or other devices 802, 804, 808, 814, 818 as "best effort" traffic or rate constrained traffic. Best effort traffic includes the communication of data between or among at least some of the devices 802, 804, 808, 814, 818 that is not subject to or required to meet the QoS parameters 828 of the devices 802, 804, 808, 814, 818. This data may be communicated at a higher priority than the data communicated in rate constrained traffic, but at a lower priority than the data communicated according to the schedules dictated by the control system 818 to meet or achieve the QoS parameters 828 (also referred to herein as time sensitive traffic). The rate constrained traffic can include data that is communicated between or among the devices 802, 804, 808, 814, 818, but that is communicated at a lower priority than the time sensitive data and the best effort traffic. The time sensitive data, the best effort traffic, and the rate constrained traffic are communicated within or through the same network 826, but with different priorities. The time sensitive data is communicated at designated times or within designated time periods, while the best effort traffic and rate constrained traffic is attempted to be communicated in a timely manner, but that may be delayed to ensure that the time sensitive data is communicated to achieve or maintain the QoS parameters 828.

Figure 10:
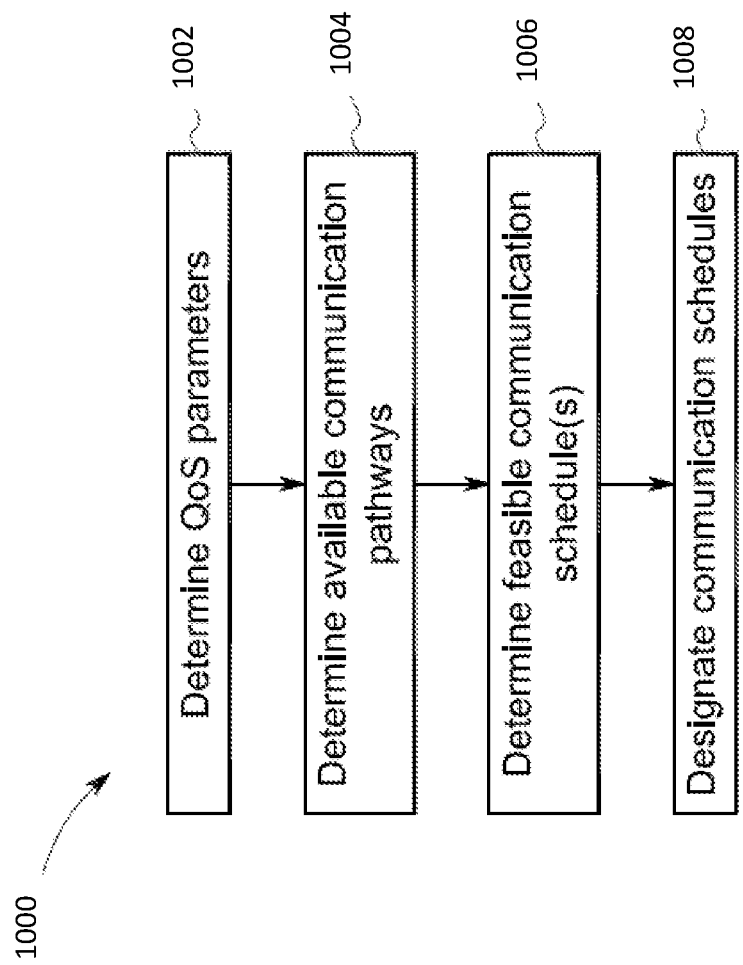
FIG. 10 illustrates a flowchart of one embodiment of a method for controlling a Quality of Service (QoS) of a data distribution service in a time sensitive network (TSN)

FIG. 10 illustrates a flowchart of one embodiment of a method 1000 for controlling the QoS of the data distribution service in a TSN. The method 1000 may be used by the control system 818 to determine schedules for communicating data within the network 900 to satisfy the QoS parameters 828 of various devices 802, 804, 808, 814, 818. In one embodiment, the method 1000 can represent the algorithm used to direct the operations of the control system 818 in communicating data in the network 900 and/or can be used to construct a software application for directing the operations of the control system 818 in communicating data in the network 900.

At 1002, QoS parameters 828 for the devices 802, 804, 808, 814, 818 are determined. These parameters may be input by an operator or user of the powered system or control system 818, or may be communicated to the control system 818 by the devices 802, 804, 808, 814, 818. At 1004, available communication pathways in the network 900 are determined. These communication pathways include permutations of potential links 904 and nodes 902 that may be used to communicate data between the devices 802, 804, 808, 814, 818, to publish data from the devices 802, 804, 808, 814, 818, and/or for the devices 802, 804, 808, 814, 818 to receive data. For example, one potential communication pathway for the sensor 802 to publish data 806 to the control system 818 may include the node 902H (and associated links 904 connecting the sensor 802 to the control system 818 via the node 902H), another potential communication pathway for the sensor 802 to publish data 806 to the control system 818 may include the node 902G (and associated links 904 connecting the sensor 802 to the control system 818 via the node 902G), another potential communication pathway for the sensor 802 to publish data 806 to the control system 818 may include the node 902F (and associated links 904 connecting the sensor 802 to the control system 818 via the node 902F), another potential communication pathway for the sensor 802 to publish data 806 to the control system 818 may include the node 902H (and associated links 904 connecting the sensor 802 to the control system 818 via the node 902H), another potential communication pathway for the sensor 802 to publish data 806 to the control system 818 may include a combination of two or more of the nodes 902 (and associated links 904 connecting the sensor 802 to the control system 818 via the nodes 902), etc.

At 1006, feasible communication schedules are determined. A feasible communication schedule dictates communication times and communication pathways used to communicate data between devices. For example, not all communication pathways may be used to communicate data between devices. Some nodes 902 may be limited with respect to how many data frames or packets can be communicated through the node 902 at the same time. This can limit how many devices can communicate data through the same node 902 at a time. Additionally, some of the communication links 904 may be limited with respect to how many data frames or packets can be communicated along the link 904 at the same time. This can limit how many devices can communicate data along or in the same link 904 at a time.

In one embodiment, the control system 818 can identify all permutations of potential combinations of nodes 902 and pathways 904 that allow various combinations of publishing and subscribing devices to communicate data with each other. These permutations may be referred to as a corpus of communication pathways. From this corpus, the control system 818 can eliminate one or more pathways that are not available or feasible. Pathways may not be feasible or available when the pathways prevent or interfere with the communication of data through the same node 902 or link 904 at the same time. The unavailable or infeasible pathways may be eliminated from the corpus to identify a set of available communication pathways.

At 1006, feasible communication schedules for the devices are determined. The feasible communication schedules represent the times or time periods in which data is communicated between devices and the communication pathways over which the data is communicated. A communication schedule may be feasible when the communication pathway between the devices (e.g., the publishing and subscribing pathways) is available and when the time or time period of the communication satisfies or avoids violating the QoS parameter(s) 828 of the publishing and/or subscribing devices. For example, if a communication schedule directs control data 820 to be communicated from the control system 818 to the actuator 814 along a communication pathway that is available and at a time or times that occur frequently enough to ensure that the QoS parameter 828 of the actuator 814 is satisfied or not violated, then the schedule is feasible. If, however, the communication schedule directs the control data 820 to be communicated from the control system 818 to the actuator 814 along a pathway that is not available or at a time or times that are too late or infrequent to satisfy the QoS parameter 828 of the actuator 814, then the communication schedule may not be feasible.

At 1008, communication schedules are designated as selected schedules. As set of the feasible communication schedules determined at 1006 may be selected for inclusion in the selected schedules. The selected schedules are those that are used to communicate data in the network 900. For example, several feasible communication schedules may be identified, but a subset of these schedules may be selected for use in the network 900. The control system 818 can select those feasible communication schedules that satisfy the QoS parameters 828 of the devices. In one embodiment, the control system 818 selects the feasible communication schedules that both satisfy the QoS parameters 828 of the devices while also allowing for devices that are not subject to QoS parameters 828 to communicate data in the network 900. For example, one of the sensors 802 may be a camera that provides surveillance video to the HMI/UI 808, which may not be a critical operation of the powered system, while another sensor 804 may measure air pressure in air brakes of the powered system and communicate this to the control system 818, which may be a critical operation of the powered system to ensure that the powered system can apply the air brakes when needed. The control system 818 may select the feasible communication schedules for use by the devices that cause the QoS parameters 828 of the sensor 804 and the control system 818 to be satisfied, while also allowing the sensor 802 to communicate the video to the HMI/UI 808. The schedule for the sensor 804 and control system 818 may have a higher priority to ensure that this data is communicated to the control system 818, while leaving enough bandwidth to permit the sensor 802 to communicate the video data to the HMI/UI 808 when possible.

In one embodiment, the selected schedules used for communicating data in the network 900 are communicated to the devices and the devices send and/or receive data (as appropriate) within the network 900 according to the selected schedules. This ensures that the QoS parameters 828 of the devices are satisfied, while permitting other data to be communicated in the same network 900 and avoiding the added cost and complexity of dedicated wires or networks for the devices. The selected schedules may be updated as needed. For example, if one or more devices are added to the powered system, the control system 818 may evaluate feasible schedules for the added devices in light of the currently used selected schedules and select feasible schedules for the added devices. This can ensure that the QoS parameters 828 of the added devices are met while avoiding having to take down the entire powered system and re-evaluating the schedules of all devices.

Certain embodiments of the present disclosure provide systems and methods that integrate a DDS with Time-Sensitive Networking (TSN) such that changes to the DDS configuration are reflected within the TSN in real-time. DDS components, such as writer devices and reader devices (e.g., Writers and Readers) are able to directly communicate directly with TSN virtual link registration devices (e.g., Talkers and Listeners) to enable TSN stream reservation that dynamically changes to reflect the Quality-of-Service (QoS) requirements of DDS.

In one embodiment, the systems and methods described herein implement the DDS with software-defined networking (SDN) devices using TSN. The SDN devices separate the network control plane from the data plane in the network communication devices. This can allow for the network communication devices to be more efficient, compact, and programmable.

Figure 11:
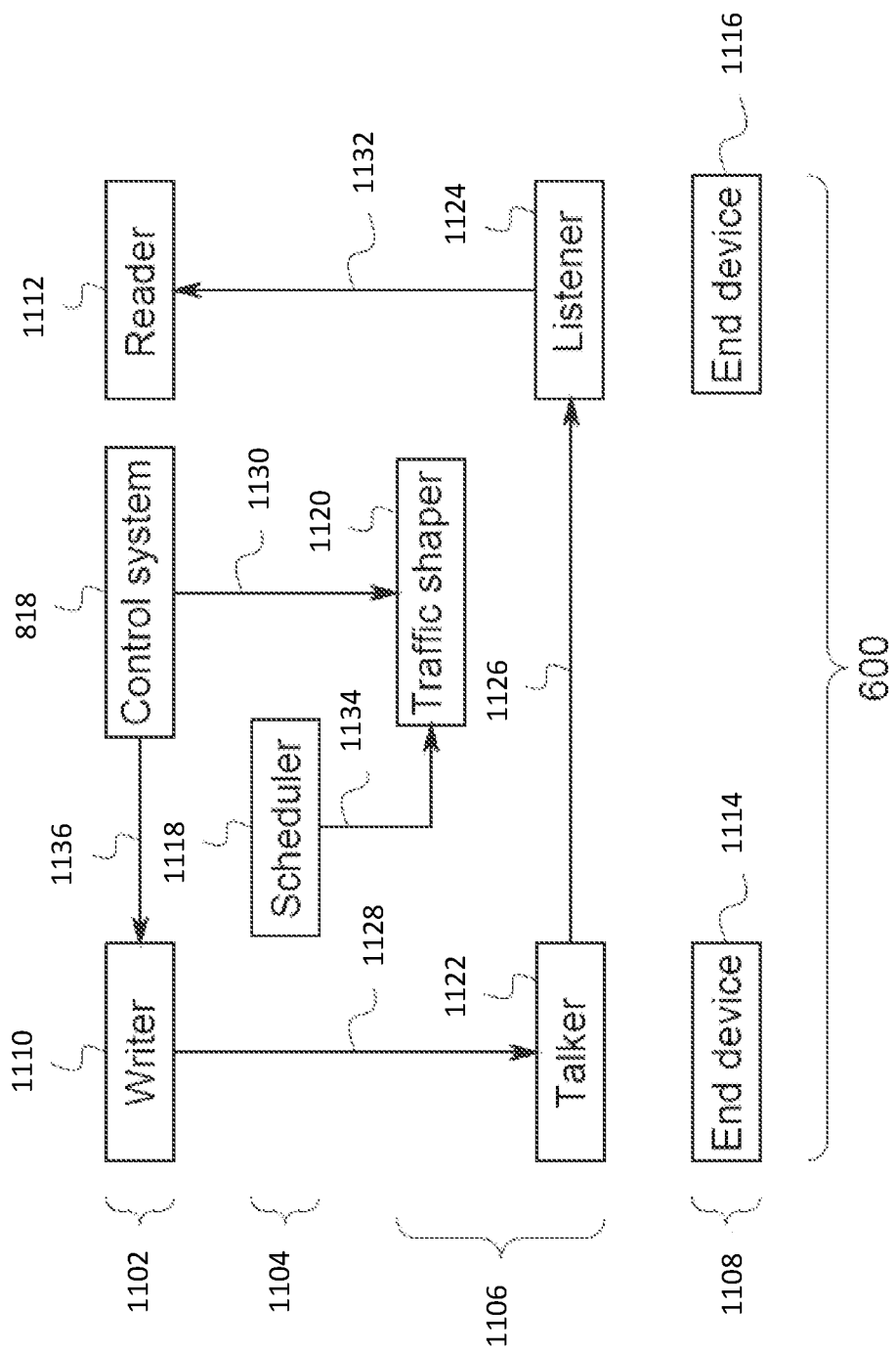
FIG. 11 illustrates another embodiment of a communication system.

FIG. 11 illustrates another embodiment of a communication system 1100. The communication system 1100 can represent one embodiment of the communication system 800 shown in FIG. 8. The components of the communication system 1100 represent different or separate hardware circuitry that include and/or are connected with one or more processors (e.g., microprocessors, integrated circuits, field programmable gate arrays, etc.) that perform the operations described herein in connection with the various components.

The communication system 1100 may be composed of several operational or functional layers 1102, 1104, 1106, 1108. The layers 1102, 1104 represent the data distribution service 824 and the layers 1106, 1108 represent the time sensitive network 826 shown in FIG. 8. The layer 1102 is an application layer that dictates the protocols and methods of communication used by hosts in the communication system 1100. A writer or writing device 1110 and a reader or reading device 1112 are within the application layer 1102 of the data distribution service 824 shown in FIG. 8. The writer 1110 is a communication device that publishes information or data for communication to or among end devices 1114, 1116 of the control system 818. The end devices 1108, 1110 can represent one or more actuators, user interfaces, sensors, or other devices, such as one or more of the sensors 802, 804, HMI/UI 808, and/or actuator 814 shown in FIG. 8. The reader 1106 receives or obtains this information or data provided by the writer 1104 and provides the information or data to the end devices 1108, 1110. While only a single writer 1104, a single reader 1106, and two end devices 1108, 1110 are shown in FIG. 11, the communication system 1100 may include many more writers 1104, readers 1106, and/or end devices 1108, 1110.

The layer 1104 is a transport layer within the time sensitive network 824 shown in FIG. 8 that provides communication services between devices in the communication system 1100, such as data stream support, control over the flow of data in the communication system 1100, etc. The transport layer 1104 includes a scheduling device or scheduler 1118 that determines when various communications between devices within the system 1100 occur, as described in more detail herein.

The layer 1106 is a network layer that routes data and information through networked devices, such as routers, switches (e.g., Ethernet switches), or other devices that communicate data packets between different devices in the communication system 1100. A traffic shaping device or traffic shaper 1120 controls the traffic profile of data being communicated within the communication system 1100. This can include controlling the amount or volume of data being communicated within the time sensitive network 826 within a designated time period, such as by delaying the communication of some data packets while communicating other data packets at various times.

Also disposed in the network layer 1106 are a talker device 1122 and a listening device or listener 1124. The talker 1122 and listener 1124 are the devices within the time sensitive network 826 that establish a communication link (also referred to as a virtual link) through which data or information is communicated between the writer 1110 and the reader 1112.

For example, the talker 1122 can send an advertise signal 1126 to the listener 1124 that requests that a communication link be established between the talker 1122 and the listener 1124. If there are sufficient resources for communicating data from the talker 1122 to the listener 1124 (e.g., sufficient bandwidth, available routers and/or switches, etc.), then the communication link between the talker 1122 and the listener 1124 is created. Otherwise, the communication link may not be established.

Data or information that is published by the writer 1110 is provided to the talker 1122, which communicates the data or information through the time sensitive network 824 to the listener 1124. The listener 1124 then communicates this data or information to the reader 1112. The end devices 1114, 1116 may be communicatively coupled with the writer 1110 and reader 1112. For example, the device 1114 may provide data (e.g., sensor data) to the writer 1110, which publishes or otherwise communicates the data to the talker 1122 as published data 1128. The talker 1122 communicates this published data 1128 to the listener 1124. The talker 1122 communicates the data through one or more networked devices in the time sensitive network 824, such as routers and/or Ethernet switches. The listener 1124 receives the data and communicates the data to the reader 1112 as received data 1132. The reader 1112 can then communicate the received data to the device 1116, such as the HMI/UI 808, the control system 818, and/or the actuator 814.

In one embodiment of the subject matter described herein, components within the data distribution service 824 and/or otherwise outside of the time sensitive network 826 communicate with components in the time sensitive network 826 to direct changes in how data is communicated within the time sensitive network 826, while ensuring that the time sensitive data communications arrive in time or within designated times and/or that rate constrained traffic and best effort traffic does not interfere with or prevent the timely delivery of the time sensitive data.

The control system 818 communicates a communication change 1130 to the traffic shaper 1120 in the time sensitive network 824. This change 1130 can include a new or different QoS parameter 828. As described above, the QoS parameter 828 can dictate a lower limit or minimum on data throughput in communication between or among two or more devices 1114, 1116. The control system 818 may change the QoS parameter 828 for communications to and/or from one or more devices 1114, 1116 based on changing circumstances. For example, the control system 818 may require that data from a sensor 802 is obtained and/or communicated to an HMI/UI 808 more often after a fault condition with one or more components of a powered system is identified. The QoS parameter 828 can be used to ensure that data communicated with one or more devices 1114, 1116, to one or more devices 1114, 1116, and/or between two or more devices 1114, 1116 are received in a timely manner (e.g., at designated times or within designated time periods). As another example, the control system 818 may change a type of communication, such as by changing a rate constrained or best effort communication to a time sensitive communication, or another such change.

Optionally, responsive to user input received by the control system 818 via the HMI/UI 808 directing a change in operational modes or states of the powered system being controlled by the control system 818, the control system 818 may change the QoS parameter 828 for communication with or between different devices 1114, 1116. Alternatively, the control system 818 may direct other changes 1130 to communications. For example, a new device 1114, 1116, new talker 1122, and/or new listener 1124 may be added to the time sensitive network 826. As another example, the control system 818 may direct that new or different information is communicated to and/or from one or more devices 1114, 1116, and/or may change when information is communicated with and/or between the devices 1114, 1116.

Responsive to receiving the change 1130 from the control system 818, the traffic shaper 1120 and the scheduler 1118 communicate with each other to determine how to shape and schedule the communications within or through the time sensitive network 826, including those communications involving or impacted by the change 1130. The scheduler 1118 may be responsible to dictating when time sensitive communications occur in order to ensure that there is sufficient bandwidth to successfully communicate the data in the time sensitive communications at or within the time limits associated with the time sensitive communications. The total bandwidth available for communicating data within the time sensitive network 826 may be known based on the currently available network devices such as routers and switches in the time sensitive network 826. Based on the available bandwidth, the amount of bandwidth consumed by the time sensitive communications (which may be reported to the scheduler 1118 from the control system 818, the writers 1110, and/or other devices), and the times or time limits in which the time sensitive communications occur, the scheduler 1118 may determine what bandwidth is available, and when the bandwidth is available.

For example, during a first time period, 20% of the total bandwidth of the time sensitive network 826 may be available for rate constrained data traffic and/or best effort traffic because the other 80% is used by time sensitive communications. During a different, second time period, 95% of the total bandwidth of the time sensitive network 826 may be available for rate constrained data traffic and/or best effort traffic because the other 5% is used by time sensitive communications. Other time periods may have other, different amounts of bandwidth available for communicating non-time sensitive traffic.

The scheduler 1118 and the traffic shaper 1120 communicate with each other to determine what communication schedules are feasible to achieve the changes 1130 in communications requested or directed by the control system 818. As one example, the scheduler 1118 and the traffic shaper 1120 communicate with each other to determine what communication schedules are feasible to achieve the QoS parameter(s) 828 received from the control system 818. The scheduler 1118 can determine feasible schedules for the non-time sensitive communications to occur within the time sensitive network 826. Based on the amount of available bandwidth and the times at which the different amounts of bandwidth are available, the scheduler 1118 can notify the traffic shaper 1120 how much data can be communicated within the time sensitive network 826 and when the data can be communicated. The scheduler 1118 may reserve sufficient bandwidth at designated times so that there is sufficient bandwidth to ensure that the time sensitive communications successfully occur or reach the intended recipients (e.g., the readers 1112) no later than the designated times or within the designated time limits of the time sensitive communications. At least some of the remaining bandwidth may be usable by the non-time sensitive communications. The scheduler 1118 may communicate a needed network availability 1134 to the traffic shaper 1120. The network availability 1134 indicates how much bandwidth is available for non-time sensitive communications at different times.

Based on receipt of the network availability 1134, the traffic shaper 1120 can determine when different data packets or frames of the non-time sensitive communications can occur. This can involve the traffic shaper 1120 delaying communication of one or more groups of packets, frames, or datagrams to bring the communication of the groups into a traffic profile. The writers 1110 and the readers 1112 communicating non-time sensitive communications may then be restricted to communicating the data packets, frames, or datagrams at the times restricted by the traffic profile. This ensures that the time sensitive communications have sufficient bandwidth to be communicated in a timely manner within the time sensitive network 826, while also allowing for the rate constrained and/or best effort traffic to be communicated within the network 826, without interfering with the time sensitive communications. This communication can be ensured even in light of changes 1130 created by the control system 818 while the writers 1110 and readers 1112 continue to communicate within the time sensitive network 826. For example, changes to the QoS parameters, time sensitive communications, etc., may occur without having to shut down or otherwise restart the devices or components in the time sensitive network 826.

Figure 12:
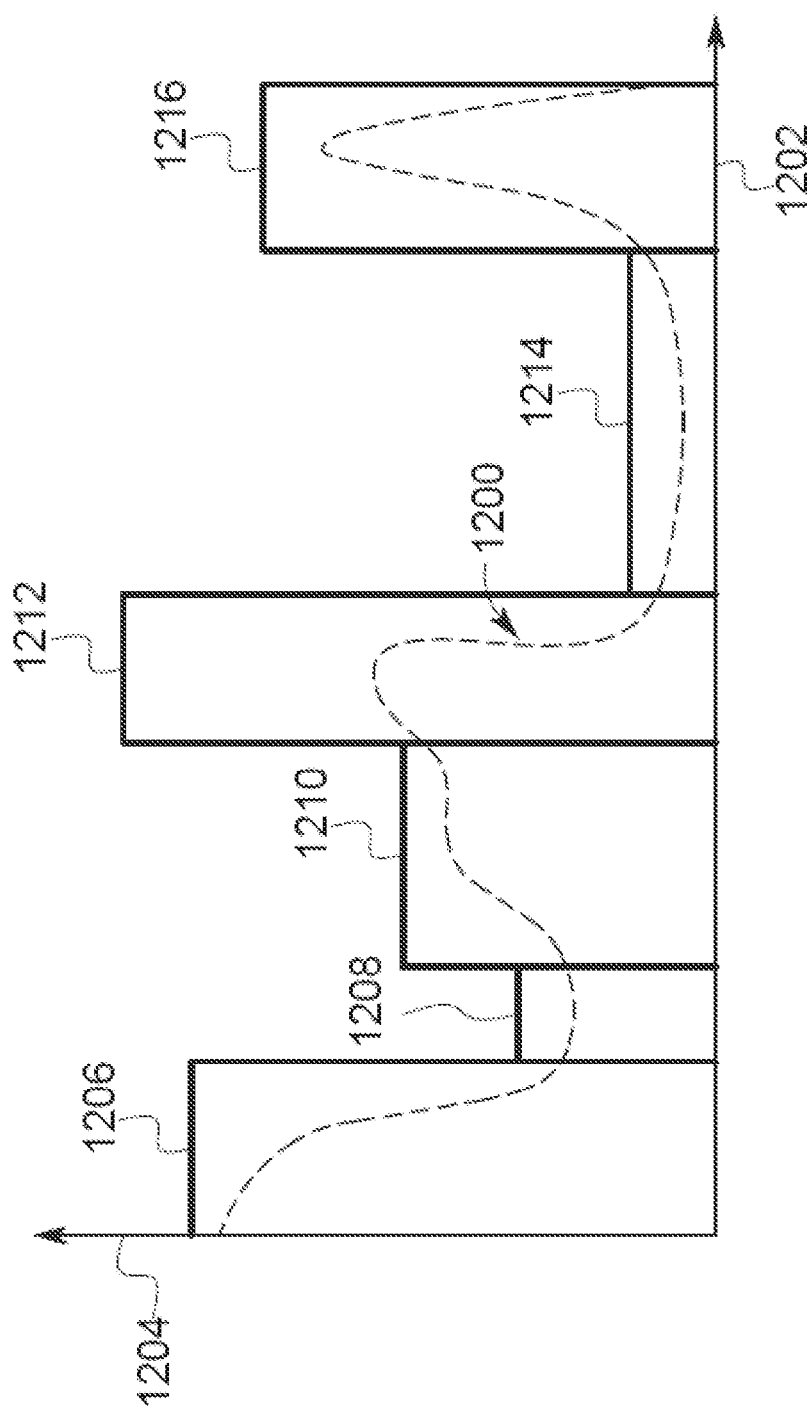
FIG. 12 schematically illustrates one example of a traffic profile determined by a traffic shaper shown in FIG. 11 for communication within a time sensitive network shown in FIG. 8.

FIG. 12 schematically illustrates one example of a traffic profile 1200 that is determined by the traffic shaper 1120 shown in FIG. 11 for the communication of non-time sensitive communications within the time sensitive network 826 shown in FIG. 8. The traffic profile 1200 is shown alongside a horizontal axis 1202 representative of time and a vertical axis 1204 representative of amounts of bandwidth available for communication in the time sensitive network 826. Several bandwidth limits 1206, 1208, 1210, 1212, 1214, 1216 are shown as rectangles in FIG. 12. These limits 1206, 1208, 1210, 1212, 1214, 1216 represent the upper restrictions on the amount of bandwidth, or the net bit rate, channel capacity, or throughput, of data communications in the time sensitive network 826. The vertical height of the bandwidth limits 1206, 1208, 1210, 1212, 1214, 1216 indicate the upper limits on the rates at which data can be communicated, while the horizontal widths of the bandwidth limits 1206, 1208, 1210, 1212, 1214, 1216 indicate the time period over which the respective bandwidth limits 1206, 1208, 1210, 1212, 1214, 1216 are applicable.

The bandwidth limits 1206, 1208, 1210, 1212, 1214, 1216 for a specific route or path through the network change over time. These limits for each, or at least one or more, route or path change to ensure that there is sufficient bandwidth for communicating the time sensitive communications. The limits 1208, 1214 may be lower (e.g., represent reduced bandwidths available for communication of non-time sensitive communications) than the limits 1206, 1210, 1212, 1216 because more bandwidth is needed during time periods over which the limits 1208, 1214 extend for the communication of time sensitive communications than during the time periods over which the limits 1206, 1210, 1212, 1216 extend. The traffic profile 1200 can represent the amount of bandwidth used by the communication of non-time sensitive communications. For example, the traffic shaper 1120 can restrict (or only permit) the communication of rate constrained traffic and best effort traffic within the bandwidths represented by the traffic profile 1200 at the associated times. The traffic profile 1200 is provided merely as one example.

As the control system 818 (shown in FIG. 8) issues changes 1130 (shown in FIG. 11) to the traffic shaper 1120, the traffic shaper 1120 may refer to the network availabilities 1134 provided by the scheduler 1118 to determine new or different traffic profiles 1200 that may be used to continue communicating the non-time sensitive communications without interfering with or restricting the communication of the time sensitive communications. The traffic profile 1200 may be adjusted without shutting down or restarting the time sensitive network 826, thereby providing a dynamically adjustable time sensitive network 826. Restarting a network can involve stopping all communications through or within the network for a non-instantaneous time while the devices in the network adjust to new or different settings.

Figure 13:
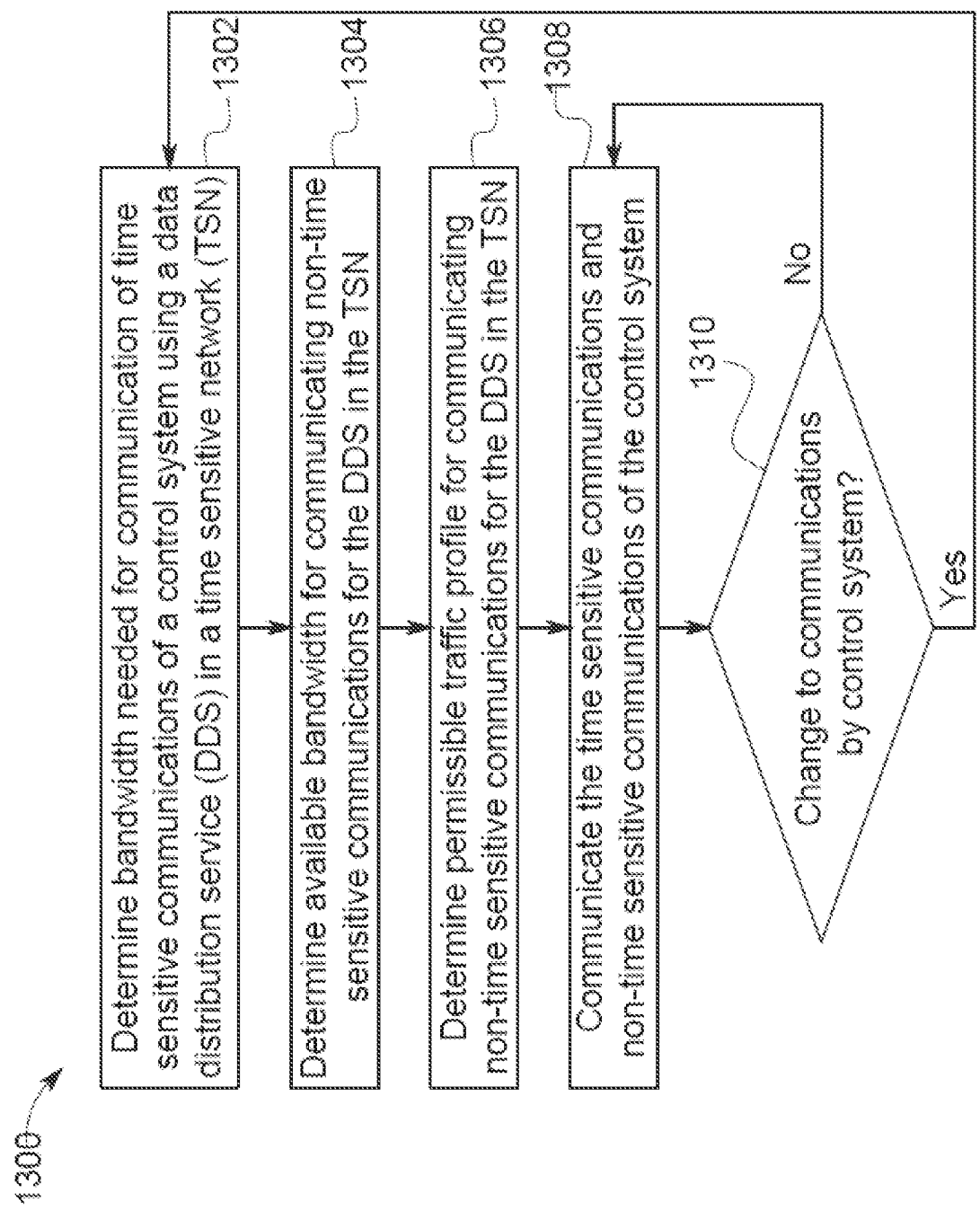
FIG. 13 illustrates a flowchart of one embodiment of a method for dynamically integrating a data distribution service into a time sensitive network.

FIG. 13 illustrates a flowchart of one embodiment of a method 1300 for dynamically integrating a data distribution service into a time sensitive network. The method 1300 may be performed by one or more embodiments of the communication systems described herein. In one embodiment, the method 1300 represents software operating on and/or directing operations of the communication systems described herein. For example, the control systems, schedulers, traffic shapers, writers, readers, talkers, listeners, and/or devices described herein may perform the operations of the method 1300. Optionally, the method 1300 may be used to create such software.

At 1302, a bandwidth needed for communication of time sensitive communications of a control system using a data distribution system in a time sensitive network may be determined. The control system may inform the scheduler of the data distribution system of the time sensitive communications that are needed or requested, and the scheduler can determine how much bandwidth is needed for the time sensitive communications at different times to ensure that the communications successfully occur between the writers and the readers. For example, the control system may inform the scheduler of the data sizes of the time sensitive communications and the times or time periods in which these communications are to occur.

At 1304, an available bandwidth for communication of non-time sensitive communications of the data distribution service in the time sensitive network is determined. The traffic shaper can examine the bandwidth that is not reserved or scheduled to be used by the time sensitive communications by the scheduler. This remaining amount of bandwidth may be used for the communication of rate constrained communications and/or best effort communications between the writers and the readers of the data distribution service.

At 1306, a permissible traffic profile for the communication of the non-time sensitive communications is determined. The traffic shaper can determine this profile as representative of how much non-time sensitive data can be communicated at different times, based on the available bandwidth for non-time sensitive communications that are available at different times. At 1308, the time sensitive communications and non-time sensitive communications of the data distribution service are communicated in the time sensitive network. The time sensitive communications may be communicated along or via communication or virtual links between some writers and readers using sufficient bandwidth to ensure that the time sensitive communications occur no later than designated times or within designated time periods. The non-time sensitive communications may be communicated along or via communication or virtual links between the same and/or different writers and readers, but according to the traffic profile determined by the traffic shaper.

At 1310, a determination is made as to whether any changes to the communication of data of the data distribution service in the time sensitive network is requested or directed (e.g., by the control system). The change may be a new or different QoS parameter of communications, a new or different reader or writer in the data distribution service, a change in a communication between a writer and one or more readers from a time sensitive communication to a non-time sensitive communication, a change in a communication between a writer and one or more readers from a non-time sensitive communication to a time sensitive communication, a change in what information is communicated between writers and readers, or another change. As described above, the change(s) may be requested or directed by the control system.

If a change in communication is requested or directed by the control system, then flow of the method 1300 can return toward 1302. For example, the method 1300 can again determine what bandwidth is needed for the communication of time sensitive communications, what bandwidth is available for the communication of non-time sensitive communications, and the traffic profile for use in communicating the non-time sensitive communications subject to the communication changes. If a change is not requested or directed, then flow of the method 1300 can return to 1308 so that the time sensitive communications and non-time sensitive communications occur without changes to the time sensitive network.

Figure 14:
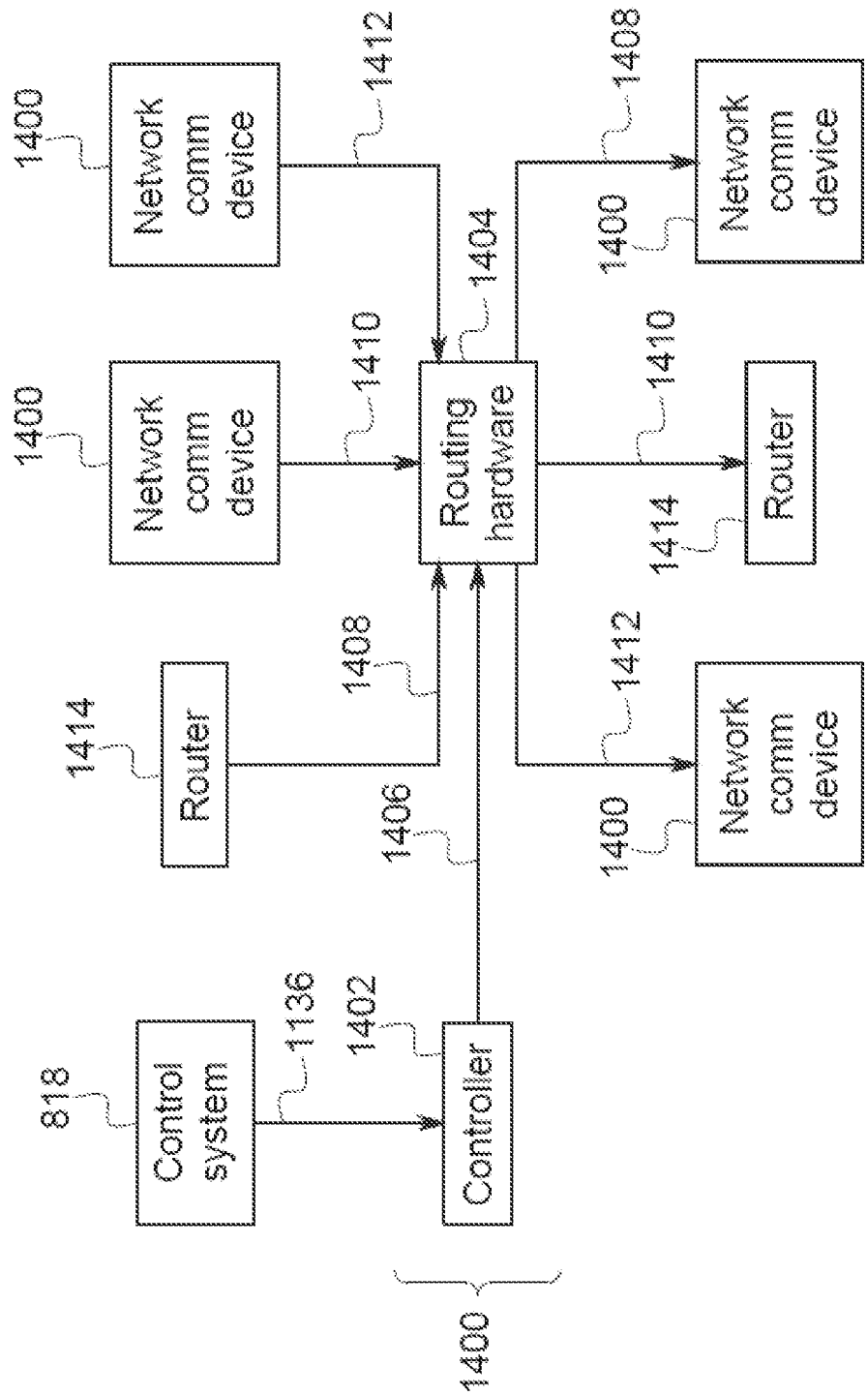
FIG. 14 illustrates a distributed network communication device according to one embodiment.

FIG. 14 illustrates a distributed network communication device 1400 according to one embodiment. The device 1400 can represent one or more of the devices that communicate data within the time sensitive network 826. For example, the device 1400 can operate similar to a router by receiving data packets addressed to different locations and then forwarding the packets to other devices 1400 or the addressed locations so that the data packets arrive at the addressed locations.

In contrast to known routers, however, the device 1400 includes a controller 1402 and routing hardware 1404 that are separate from each other. The controller 1402 and hardware 1404 may be in separate, remote locations. For example, the hardware 1404 may be disposed in one housing in a server room or rack, while the controller 1402 is disposed in a separate, different housing in another room, building, city, county, or state. The controller 1402 represents hardware circuitry that includes and/or is connected with one or more processors (e.g., microprocessors, integrated circuits, or field programmable gate arrays) that control how the routing hardware 1404 communicates data in the time sensitive network 826 (or another network). The hardware circuitry of the controller 1402 can include transceiving circuitry or transmitting circuitry, such as one or more modems, antennas, or the like, to permit the controller 1402 to communicate with the routing hardware 1404 from far away.

The controller 1402 may include the control plane of the device 1400, which determines where different data packets are to be forwarded toward. For example, the controller 1402 include or access a memory device (e.g., a computer hard drive, random access memory, flash drive, etc.) that stores one or more routing tables. These tables can indicate where incoming data packets are to be forwarded. For example, the tables can indicate the paths or routes in the time sensitive network 826 that different data packets should be forwarded between the routing hardware 1404 of the devices 1400 in order to move the data packets from the writers 1110 to the appropriate readers 1112.

As described above, the control system 818 can control and/or change 1130 communications within the time sensitive network 826. The controllers 1402 of the devices 1400 in the network 826 can respond to the changes 1130 by changing the routing tables or other information used by the controllers 1402 to determine where the different devices 1400 are to route the different data packets toward in order to ensure that the time sensitive communications and non-time sensitive communications are completed, as described herein. As shown in FIG. 11, the control system 818 may communicate routing information 1136 to the writers 1110 that indicates where the published data 1128 of the writers 1110 are to be routed toward. This routing information 1136 may be used by the controllers 1402 of the devices 1400 to determine how to route the data packets accordingly.

The routing hardware 1404 represents a forwarding plane of the device 1400. The hardware 1404 includes circuitry that has network interfaces to allow for the communication of data packets through the routing hardware 1404. The hardware 1404 also includes transceiving and/or receiving circuitry, such as one or more modems, antennas, or the like, to permit the hardware 1404 to communicate with the controller 1402.

In operation, the control system 818 communicates the routing information 1136 to the controllers 1402 of the devices 1400 to inform the controllers 1402 where various data packets are to be communicated toward or to within the time sensitive network 826 for the time sensitive and non-time sensitive communications described herein. Responsive to receiving the routing information 1136, the controllers 1402 send instructions 1406 to the routing hardware 1404 of the corresponding devices 1400 to instruct the routing hardware 1404 how to forward the data packets to achieve the routing information 1136 received from the control system 818. The routing hardware 1404 receives a variety of different data packets 1408, 1410, 1412 from other devices 1400, routers 1414, and the like.

The routing hardware 1404 forwards these packets 1408, 1410, 1412 to other devices 1400, routers 1414, and the like, according to the instructions 1406 to cause the data packets 1408, 1410, 1412 to travel along the paths dictated by the routing information 1136. The packets 1408, 1410, 1412 eventually reach the addressed destinations (e.g., readers 1112) in order to complete the time sensitive and/or non-time sensitive communications described herein. The control system 818 may dynamically change the routing information 1136 in order to vary where different data packets are forwarded by the hardware 1404 without shutting down or restarting the devices 1400.

In one embodiment, a network calculus engine may work with the scheduler 1118 (or the scheduler 1118 may use network calculus) to determine how to set network traffic latency requirements for each, or at least one or more, path or route through the network. If the scheduler 1118 cannot determine a feasible schedule, network calculus can be used to provide feedback to an operator of the network about why a schedule could not be found. For example, the network calculus engine could suggest to the operator which virtual links would benefit most or more than others from easing traffic load or increasing maximum (or another upper limit on) latency. The network calculus engine can provide a filter before scheduling is run to suggest whether a result would even be feasible. This could be beneficial for large complex networks for which scheduling without the filter would be a significant time-consuming process. The network calculus engine can provide results about queuing throughout the network in case buffer storage becomes an issue. In one embodiment, a method includes determining bandwidth for communication of time sensitive communications between devices of a control system using a DDS in a TSN, determining available bandwidth for communication of non-time sensitive communications of the control system using the DDS in the TSN, communicating the non-time sensitive communications in the TSN without preventing communication of the time sensitive communications in the TSN based on the available bandwidth, receiving a communication change from the control system at the TSN, and changing one or more of the bandwidth for the communication of the time sensitive communications or the available bandwidth for the communication of the non-time sensitive communications in the TSN without restarting the TSN.

In one example, the time sensitive communications include communications required to be completed before designated times or within designated time periods by the control system.

In one example, the communication change from the control system directs a change in a quality of service (QoS) of communications in the TSN.

In one example, the communication change from the control system directs a change in one or more of the non-time sensitive communications to one of the time sensitive communications.

In one example, the communication change from the control system directs a change in one or more of the time sensitive communications to one of the non-time sensitive communications.

In one example, the communication change from the control system directs an addition of a network device to the TSN.

In one example, the communication change from the control system directs removal of a network device from the TSN.

In one example, the communication change from the control system instructs a distributed communication device having a controller and routing hardware that are separate and remotely located from each other to change where one or more data packets are forwarded in the TSN.

In one example, the method also includes communicating routing information from the control system to the controller of the distributed communication device that directs a change in where the one or more data packets are forwarded in the TSN responsive to receiving the communication change from the control system. The method also can include sending one or more instructions from the controller to the routing hardware to instruct the routing hardware where to forward the one or more data packets according to the routing information.

In one embodiment, a system includes a scheduling device of a DDS configured to determine bandwidth for communication of time sensitive communications between devices of a control system using the DDS in a TSN. The scheduling device also is configured to determine available bandwidth for communication of non-time sensitive communications of the control system using the DDS in the TSN, and is configured to control communication of the non-time sensitive communications in the TSN without preventing communication of the time sensitive communications in the TSN based on the available bandwidth. The system also can include a traffic shaper of the TSN configured to receive a communication change from the control system at the TSN. The scheduling device is configured to change one or more of the bandwidth for the communication of the time sensitive communications or the available bandwidth for the communication of the non-time sensitive communications in the TSN without restarting the TSN.

In one example, the time sensitive communications include communications required to be completed before designated times or within designated time periods by the control system.

In one example, the communication change from the control system directs a change in a quality of service (QoS) of communications in the TSN.

In one example, the communication change from the control system directs a change in one or more of the non-time sensitive communications to one of the time sensitive communications.

In one example, the communication change from the control system directs a change in one or more of the time sensitive communications to one of the non-time sensitive communications.

In one example, the communication change from the control system directs an addition of a network device to the TSN.

In one example, the communication change from the control system directs removal of a network device from the TSN.

In one example, the system also includes one or more distributed communication devices each having a controller and routing hardware that are separate and remotely located from each other. The controllers can be configured to instruct the routing hardware of the respective distributed communication devices where to forward data packets within in the TSN.

In one example, the communication change from the control system directs a change in where one or more of the data packets are forwarded by the routing hardware in the TSN.

In one embodiment, a distributed communication device includes a controller configured to one or more of store or access routing instructions that direct where data packets are to be forwarded within a TSN for one or more writing devices and one or more reader devices of a DDS. The device also can include routing hardware configured to be remotely located from the controller and to receive instructions from the controller to change where the data packets are forwarded within the TSN.

In one example, the routing hardware is configured to receive the instructions from the controller to change where the data packets are forwarded within the TSN and to change how the data packets are forwarded with in the TSN without restarting either the controller or the routing hardware.

Various types of control systems communicate data between different sensors, devices, user interfaces, etc. as instructed by an application to enable control operations of powered systems. The operations of these powered systems may rely on on-time and accurate delivery of data frames among various devices. Failure to deliver some data at or within designated times may result in failure of the powered system, which may have significant consequences. Without timely information, feedback control systems cannot maintain performance and stability. As used herein a feedback control system may continuously receive feedback on a state of a dynamic system and may apply commands to an actuator or other device to maintain a desired outcome in the presence of "noise" (e.g., any random event that perturbs the system). The feedback control system may continuously or repeatedly receive feedback and make adjustments to maintain a desired state. In one or more embodiments, the performance of the system may depend upon the timely receipt of the state information. If state feedback information is delayed, the entire control system may become unstable and may go out of control.

Some systems may use a time sensitive network (TSN) to communicate data associated with a particular application used in the control system. The TSN may be at least partially defined by a set of standards developed by the Time- Sensitive Networking Task Group, and includes one or more of the IEEE 802.1 standards. Time-sensitive communications within a TSN may be scheduled, while non-time sensitive communications, such as rate constrained communications and "best effort" communications may be unscheduled (e.g., transmitted without deterministic latency from end-to-end).

Conventionally, extending a TSN to network applications requires (1) modification to the application code, or (2) modification to the network switch firmware. However, it may be undesirable to update the application code because (a) the application code is not available, (b) the application code may have been validated to some degree, and it may be undesirable to have to re-verify control loops executed per the application, and/or (c) it may expose networking scheduling issues to software developers and non-domain experts. Further, it may be undesirable to modify the network switch firmware because (a) it may eliminate the use of off-the-shelf switches, thereby limiting the choice of switches, and (b) of the added effort and support needed to implement proprietary changes to the network switch firmware.

In one or more embodiments, a network driver may be configured by an external network configuration module, so that no update to the application code is needed. Configuration of the network driver may instruct the network driver how to classify data based on different rules. The network driver may then package the data based on the classification, and then send the packaged data to a switch. In one or more embodiments, the switch may also be configured by the network configuration module. The switch configuration may instruct the switch how/when to send the data to a final destination, per a schedule and based, at least in part, on the classification of the data. In one or more embodiments, the schedule may include instructions about when to open and close one or more gates of one or more network queues to allow the transmission of the data.

The term "installed product" should be understood to include any sort of mechanically operational asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations such as the use of engines in an aircraft fleet whose operations are dynamically controlled, a locomotive in connection with railroad operations, or apparatus construction in, or as part of, an operating plant building, machines in a factory or supply chain, etc. As used herein, the terms "installed product," "asset," and "powered system" may be used interchangeably.

As used herein, the term "automatically" may refer to, for example, actions that may be performed with little or no human interaction.

Figure 15:
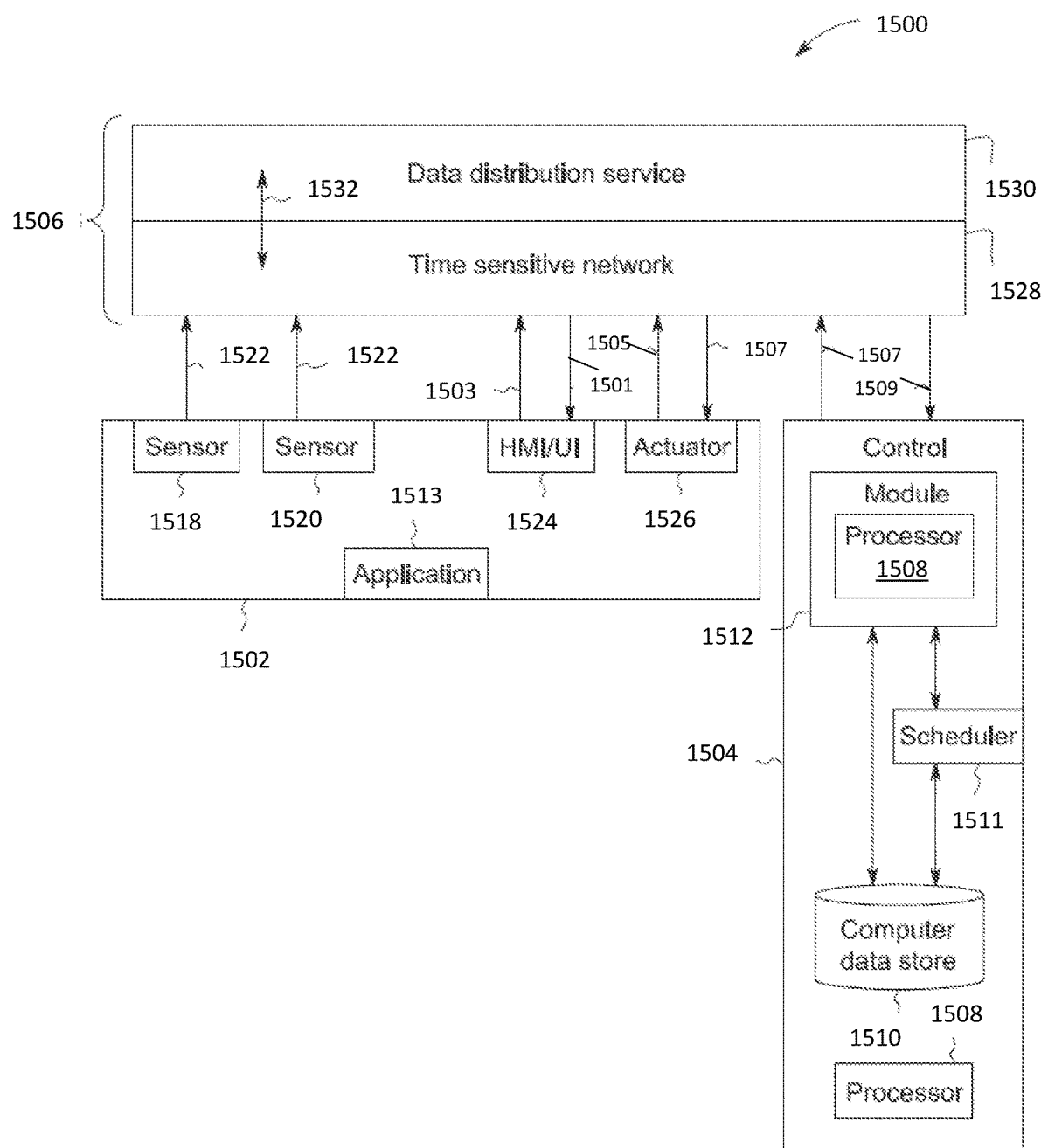
FIG. 15 illustrates a system according to some embodiments.

Turning to FIG. 15, a block diagram of a system 1500 architecture is provided according to some embodiments. The system 1500 may include at least one installed product 1502. The installed product 1502 may be, in various embodiments, a complex mechanical entity such as the production line of a factory, a gas-fired electrical generating plant, a jet engine on an aircraft amongst a fleet (e.g., two or more aircrafts or other assets), a wind farm, a locomotive, etc. The installed product 1502 may include a control system 1504 that controls operations of the installed product based on data obtained by, or generated by, and/or communicated among, devices of the installed product, and communicates information between or among installed products, etc. to allow for automated control of the installed product, to provide information to operators of the installed product.

In one or more embodiments, the system 1500 may include a communication system 1506. The communications system 1506 may be used by the control system 1504 ("Control") to communicate data between or among devices of the control system 1504 and/or the installed product 1502 that is controlled by the control system 1504. The control system 1504 may represent hardware circuitry that includes and/or is connected with one or more processors 1508 (e.g., microprocessors, integrated circuits, field programmable gate arrays, etc.) that perform operations to control the installed product 1502. In one or more embodiments, the processor 1508 may be programmed with a continuous or logistical model of industrial processes that use the one or more installed products 1502.

In one or more embodiments, the control system 1504 may include a computer data store 1510 that may provide information to a scheduler 1511 and a network configuration module 1512, and may store results from the scheduler 1511 and the network configuration module 1512. The communication system 1506 may supply data from at least one of the installed product 1502 and the data store 1510 to the scheduler 1511 and the network configuration module 1512. The network configuration module 1512 may include one or more processing elements 1508. The processor 1508 may, for example, be a conventional microprocessor, and may operate to control the overall functioning of the network configuration module 1512.

Figure 17:
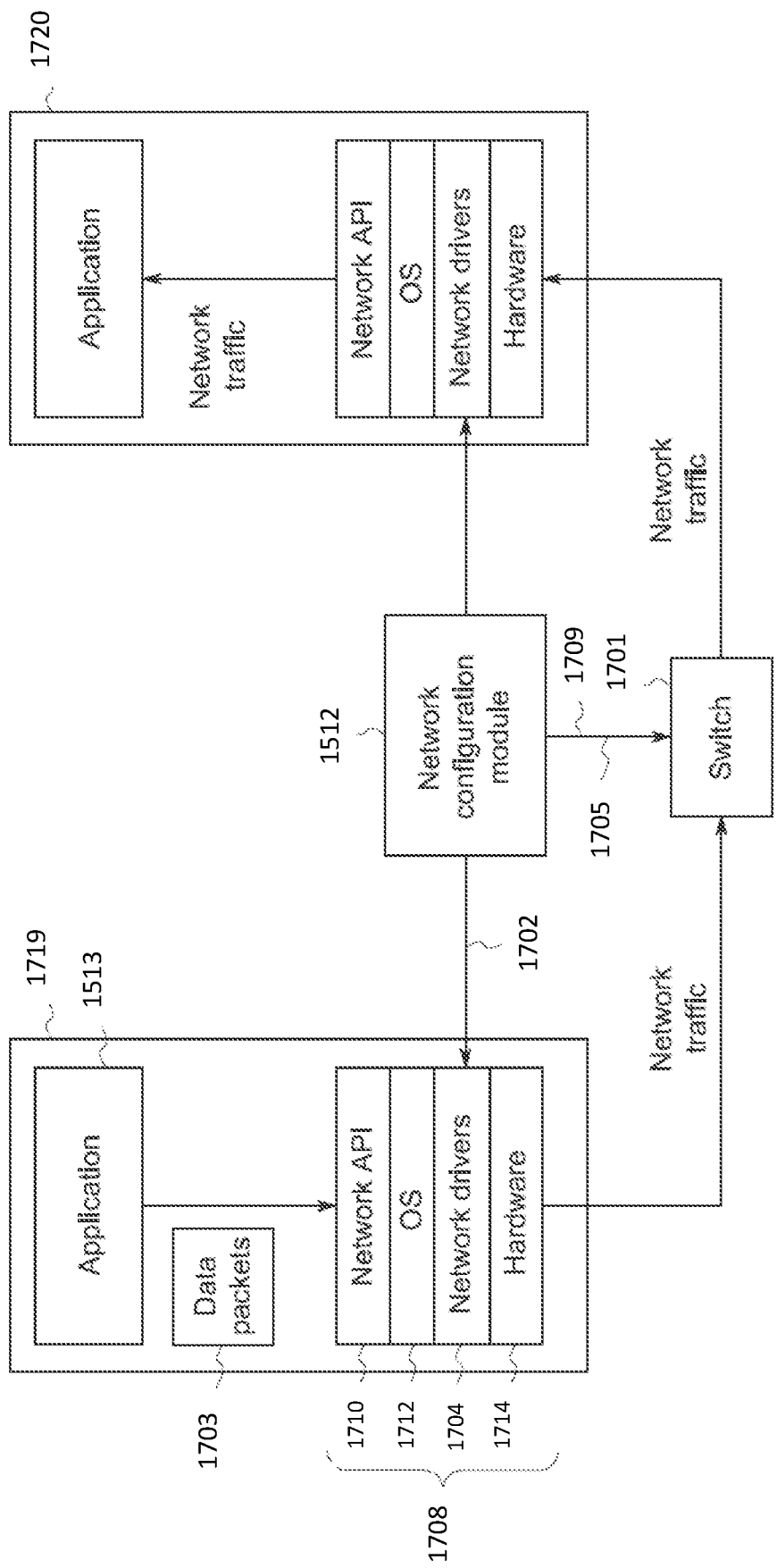
FIG. 17 illustrates a block diagram according to some embodiments.

In one or more embodiments, the network configuration module 1512 may provide configuration instructions 1702 to a network driver 1704 (FIG. 17). The configuration instructions 1702 may provide rules to the network driver 1704 for the network driver to classify a data packet, create a frame format for the data packet based on the classification, and then package the data packet into one or more data frames based on the created frame format.

In one or more embodiments, the network configuration module 1512 may transmit switch configuration data 1705 to the scheduler 111 to generate a schedule 1710 (FIG. 17) for the transmission of each data frame through the communication system per the schedule 1710. In one or more embodiments, the scheduler 1511 may also receive a network topology description and path or link requirements 1806 (e.g., an indication of time sensitive paths, maximum latencies, physical link bandwidths, size of frames ("payload"), and frame destination) from an application 1513 and/or toolchain, or any other suitable source. As used herein, "maximum tolerable latency" may refer to the latest time the data frame may arrive at the destination. The scheduler 1511 may also receive destination information 1721 (e.g., an Ethernet address). In one or more embodiments, link layer discovery protocol (LLDP) may be used to gather informational about the network prior to scheduling. about a destination 1720 for each data frame. In one or more embodiments, the destination information 1721 may be provided by an application being executed by the control system 1504.

In one or more embodiments, the control system 1504 may control one or more operations of the installed product 1502 based on the transmitted data frame(s) 1804.

In one or more embodiments, the data store 1510 may comprise any combination of one or more of a hard disk drive, RAM (random access memory), ROM (read only memory), flash memory, etc. The data store 1510 may store software that programs the processor 1508, the scheduler

1511 and the network configuration module 1512 to perform functionality as described herein.

In some embodiments, the communication system 1506 may supply output from at least one of the scheduler 1511 and the network communication module 1512 (and the elements included in therein) to at least one of user platforms 1524, back to the installed product 1502, or to other systems. In some embodiments, signals received by the user platform 1524, installed product 1502 and other systems may cause modification in the state or condition or another attribute of one or more physical elements of the installed product 1502.

The communication system 1506 may communicate data between several devices of the installed product 1502, such as sensors 1518, 1520 that monitor, measure, record, etc. information and communicate this information as sensor data 1522. Another device that may communicate via the communications system 1506 may include a human machine interface (HMI) or user interface (UI) 1524 that receives output or status data 1501 that is to be presented to a user or operator of the communication system 1506 or control system 1504 and that may communicate input data 1503 received from the user or operator to one or more other devices of the control system 1504. The HMI/UI 1524 may represent a display device, a touchscreen, laptop, tablet computer, mobile phone, speaker, haptic device, or other device that communicates or conveys information to a user or operator. In accordance with any of the embodiments described herein, a user may access the system 1500 via one of the HMI/UI 1524 to view information about and/or manage the installed product 1502.

In one embodiment, at least one of the sensors 1518, 1520 may be a camera that generates video or image data, an x-ray detector, an acoustic pick-up device, a tachometer, a global positioning system receiver, a wireless device that transmits a wireless signal and detects reflections of the wireless signal to generate image data representative of bodies or objects behind walls, sides of cars, or other opaque bodies, or another device.

Another device that may communicate using the communication system 1506 may include one or more actuators 1526, which may represent devices, equipment, or machinery that move to perform one or more operations of the installed product 1502 that is controlled by the control system 1504. Examples of actuators 1526 include brakes, throttles, robotic devices, medical imaging devices, lights, turbines, etc. The actuators 1526 may communicate status data 1505 of the actuators 1526 to one or more other devices of the installed product 1502 via the communication system 1506. The status data 1505 may represent a position, state, health, or the like, of the actuator 1526 sending the status data 1505. The actuators 1526 may receive command data 1507 from one or more other devices of the installed product or control system via the communication system 1506. The command data 1507 may represent instructions that direct the actuators 1526 how and/or when to move, operate, etc.

The control system 1504 may communicate (e.g., receive, transmit, and/or broadcast) a variety of data between or among the devices via the communication system 1506 at the behest of one or more software applications 1513. For example, the control system 1504 may communicate the command data 1507 to one or more of the devices and/or receive data 1509, such as status data 1505 and/or sensor data 1522, from one or more of the devices. While devices are shown in FIG. 15 as sending certain data or receiving certain data, optionally, the devices may send and/or receive other types of data. For example, the sensors 1518, 1520 may receive data and/or send other types of data.

The communication system 1506 communicates data between or among the devices and/or control system 1504 using a communication network 1528 that may communicate data using a data distribution service 1530. The data distribution service 1530 is a network middleware application that may make it easier to configure publishers and subscribers on a network. Other middleware applications may be used. In other embodiments, the data distribution service 1530 is not included, and the application(s) 1513 may manage the installed product 1502 (and its devices) on its own. The network 128 (from FIG. 1) is a time sensitive network, but alternatively may be another type of network. For example, devices, including those associated with the system 1500 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. The devices described herein may communicate via one or more such communication networks.

The data distribution service 1530 may represent an object management group (OMG) device-to-device middleware communication standard between the devices and the network. The data distribution service 1530 may allow for communication between publishers and subscribers. The term "publisher" may refer to devices 1504, 1518, 1520, 1524, and 1526 that send data to other devices 1504, 1518, 1520, 1524, 1526 and the term "subscriber" may refer to devices 1504, 1518, 1520, 1524, 1526 that receive data from other devices 1504, 1518, 1520, 1524, 1526. The data distribution service 1530 is network agnostic in that the data distribution service 1530 may operate on a variety of networks, such as Ethernet networks as one example. The data distribution service 1530 may operate between the network through which data is communicated and the applications communicating the data (e.g., the devices 1504, 1518, 1520, 1524, 1526). The devices 1504, 1518, 1520, 1524, 1526 may publish and subscribe to data over a distributed area to permit a wide variety of information to be shared among the devices 1504, 1518, 1520, 1524, 1526.

In one embodiment, the data distribution service 1530 may be used by the devices 1504, 1518, 1520, 1524, 1526 to communicate data 1501, 1503, 1505, 1507, 1509, 1522 through the network 1528, which may operate on an Ethernet network of the installed product 1502. The network 1528 may be at least partially defined by a set of standards developed by the Time-Sensitive Networking Task Group, and includes one or more of the IEEE 802.1 standards. While an Ethernet network may operate without TSN, such a network may be non-deterministic and may communicate data frames or packets in a random or pseudo-random manner that does not ensure that the data is communicated within designated time periods or at designated times. With a non-TSN Ethernet network there may be no way to know when the data will get to the destination or that it will not be dropped. This non-deterministic approach may be based on "best effort." In this non-deterministic or "best effort" approach, a network driver may receive data from an application and determine for itself how to package and send the data. As a result, some data may not reach devices connected via the non-TSN Ethernet network in sufficient time for the devices to operate using the data. With respect to some control systems, the late arrival of data may have significant consequences, as described above. A TSN-based Ethernet network, however, may dictate when certain data communications occur to ensure that certain data frames or packets are communicated within designated time periods or at designated times. Data transmissions within a TSN-based Ethernet network may be based on a global time or time scale of the network that may be the same for the devices in, or connected with, the network, with the times or time slots in which the devices communicate being scheduled for at least some of the devices.

The communication system 1506 may use the network 1528 to communicate data between or among the devices 1504, 1518, 1520, 1524, 1526 (in some embodiments using the data distribution service 1530) in order to maintain Quality of Service (QoS) parameters 132 of certain devices 1504, 1518, 1520, 1524, 1526. As used herein, "QoS" may refer to a time-sensitive networking quality of service. In one or more embodiments, the QoS parameters 1532 of the devices 1504, 1518, 1520, 1524, 1526 may represent requirements for data communication between or among the devices 1504, 1518, 1520, 1524, 1526, such as upper limits on the amount of time or delay for communicating data between or among the devices 1504, 1518, 1520, 1524, 1526.

In one or more embodiments, the QoS parameter 1532 may dictate a lower limit or minimum on data throughput in communication between or among two or more devices 1504, 1518, 1520, 1524, 1526. In one or more embodiments, the QoS parameter 1532 may be used to ensure that data communicated with one or more devices 1504, 1518, 1520, 1524, 1526, to one or more devices 1504, 1518, 1520, 1524, 1526, and/or between two or more devices 1504, 1518, 1520, 1524, 1526 is received in a timely manner (e.g., at designated times or within designated time periods). In one or more embodiments, the QoS parameter 1532 may be defined by one or more other parameters. Examples of these other parameters may include a deadline parameter, a latency parameter, and/or a transport priority parameter.

The deadline parameter may, in one or more embodiments, dictate an upper limit or maximum on the amount of time available to send and/or receive data associated with a particular topic. In one or more embodiments, the deadline parameter may relate to the total time the data spends in an application, operating system and network. Data may be associated with a particular topic when the data is published by one or more designated devices (e.g., sensors measuring a particular characteristic of the installed product, such as speed, power output, etc.). Then the data may represent the particular characteristic (even if the data comes from different devices at different times), and/or is directed to the same device (e.g., the same actuator 1526).

In one or more embodiments, the latency parameter may dictate an upper limit or maximum on a temporal delay in delivering data to a subscribing device 1504, 1518, 1520, 1524, 1526. For example, the sensors 1518, 1520 may publish data 1522 representative of operations of the installed product, and the HMI/UI 1524, actuator 1526, and/or control system 1504 may require receipt of the sensor data 1522 within a designated period of time after the data 1522 is published by the sensors 1518, 1520. For example, for a sensor 1518 that communicates a temperature of a motor or engine reaching or exceeding a designated threshold indicative of a dangerous condition, the control system 1504 and/or actuator 1526 may need to receive this temperature within a designated period of time to allow the control system 1504 and/or actuator 1526 to implement a responsive action, such as decreasing a speed of the engine or motor, shutting down the engine or motor, etc. In one or more embodiments, the latency parameter may refer to the time the data spends in the network only. In one or more embodiments, the TSN 1528 may only relate to a network portion of the delay (as opposed to delays in the application, and operating system portions).

In one or more embodiments, the transport priority parameter may indicate relative priorities between two or more of the devices 1504, 1518, 1520, 1524, 1526 to the network. Some devices 1504, 1518, 1520, 1524, 1526 may have higher priority than other devices 1504, 1518, 1520, 1524, 1526 to receive (or subscribe to) certain identified types or sources of data. Similarly, some devices 1504, 1518, 1520, 1524, 1526 may have higher priority than other devices 1504, 1518, 1520, 1524, 1526 to send (or publish) certain identified types or sources of data. Subscribing devices 1504, 1518, 1520, 1524, 1526 having higher priorities than other devices 1504, 1518, 1520, 1524, 1526 may receive the same data via the network from a source of the data prior to the lower-priority devices 1504, 1518, 1520, 1524, 1526. Publishing devices 1504, 1518, 1520, 1524, 1526 having higher priorities than other devices 1504, 1518, 1520, 1524, 1526 may send the data that is obtained or generated by the higher-priority devices 1504, 1518, 1520, 1524, 1526 into the network than lower-priority devices 1504, 1518, 1520, 1524, 1526.

In one or more embodiments, the QoS parameters 1532 of the devices 1504, 1518, 1520, 1524, 1526 may be defined by one or more, or a combination, of the deadline parameter, latency parameter, and/or transport priority parameter. In one or more embodiments, the QoS parameters 1532 may then be used by the scheduler 1511 to determine data transmission schedules 1710 within the TSN (in some embodiments, using the data distribution service 1530). Data transmission schedules 1710 may dictate times at which data is communicated within the network at nodes along the path. However, by providing time for the "nodes along the path," the schedule also suggests the path itself. The suggested path may not be clear if there are many TSN flows taking common paths.

Figure 16:
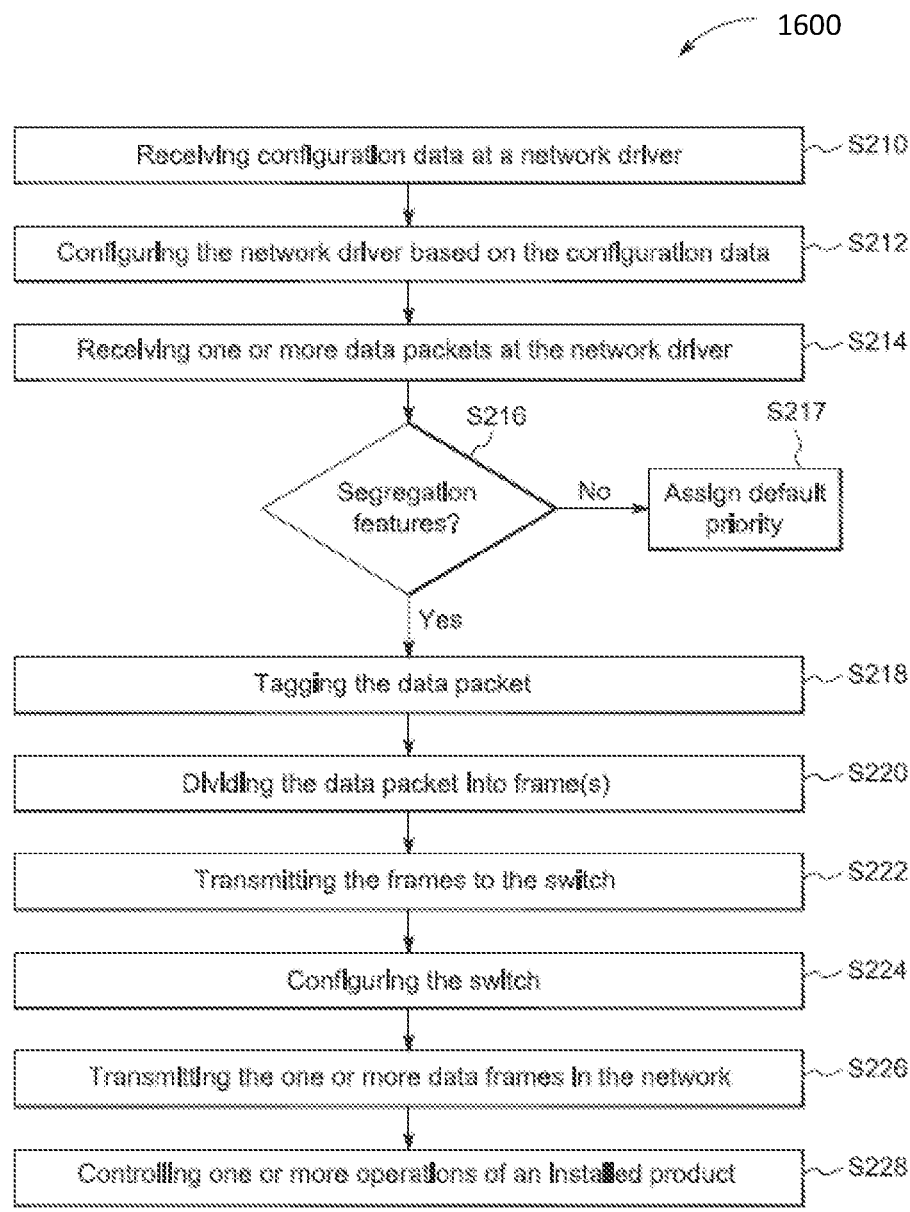
FIG. 16 illustrates a flow diagram according to some embodiments.

Turning to FIGS. 16 through 19, flow diagrams and a block diagrams, of an example of operation according to some embodiments is provided. In particular, FIG. 16 provides a flow diagram of a process 1600, according to some embodiments. Process 1600, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 1500 is conditioned to perform the process 1600 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the subject matter may be practiced in any order that is practicable.

In one or more embodiments, the network 1528 may include a plurality of destinations 1720 or nodes. The nodes may be connected to the communication system via one or more communication paths 1722 or links. The communication links 1722 may be connected to each other via ports and/or switches 1701. In one or more embodiments, two or more data frame transmission paths or flows may overlap. Data frames 1804 may collide where these transmission paths overlap, and collisions may result in the frames being dropped and not delivered to their respective destinations 1720. As such, the scheduler 1710 may fit unscheduled/best effort frames into the schedule 1710 with scheduled frames, so that the data frames 1804 do not collide, and instead reach an appropriate destination at an appropriate time.

In one or more embodiments, the TSN network 1528 may include a plurality of queues 1712 (e.g., Queue 0, 1, 2, 3, 4 . . . 7, etc.) for transmitting the data frames 404 to their respective destinations 1720. In one or more embodiments, the queues may exist in all interfaces—both on the end-system (e.g., device) and in each port (connection) of the switch 1701. In one or more embodiments, each queue 1712 may include a gate 1713 that may be in an open position 1714 or a closed position 1716, and may only allow transmission of the data frame 404 when in the open position 1714. In one or more embodiments, the operation of the queue gates 1713 may be synchronized to a same clock 1718. The synchronization can be important, especially for high priority traffic, to make sure the gates are closed at precisely the right time, to avoid collision and to get the data frame through the network per the schedule 1710. In one or more embodiments, the scheduler 1511 executes calculations, based on the received input, to determine the openings/closing gate times along the path of the flow to meet the destination 1720 and arrival times (e.g., within the maximum latency), as specified by the application 1513. In one or more embodiments, the content of the schedule 1710 specifies gate openings/closings along the path of a flow, as described in the TSN standard.

In one or more embodiments, prior to beginning process 1600, a configuration map 1900 (FIG. 19) may be created to identify at least one segregation feature or property 1902 that may occur in the data packet. As used herein, "segregation feature" and "property" maybe used interchangeably. In one or more embodiments, the configuration map 1900 may also provide rules 1904 for how to create a frame format for the data packet based on the identified segregation features 1902. In one or more embodiments, the configuration map 1900 may include a tag 1906 associated with each segregation feature 1902. In one or more embodiments, the segregation features 1902 and rules 1904 populating the configuration map 1900 may be provided by at least one of the system and a network administrator. In one or more embodiments, the segregation feature 1902 may be at least one of a QoS parameter 1532, a port number, a packet content and an IP destination node. Other suitable segregation features 1902 may be used. For example, the segregation feature 1902 may be a QoS parameter indicting the data packet is one of critical or non-critical. In one or more embodiments, the packet content may be associated with a particular topic. The pre-defined "topic" may be the segregation feature 1902.

As will be described further below, in one or more embodiments, after creating the frame format, the network driver may then package the data packet into one or more data frames 1804 based on the created frame format. By having the network driver create a frame format based on the segregation features, no changes need to be made to the application itself to change a data packet from a "best effort" communication to a "time-sensitive" (e.g., scheduled) communication, for example.

As described above, the TSN network 1528 may allow for the transmission of both classes of communication (e.g., scheduled and best effort/random) in the same network. Conventionally, the standard may be to send all communications as "best effort" (e.g., unscheduled), unless specifically marked by the application. Best-effort messages (frames) are simply that, a "best-effort" attempt at transporting the frame to its destination. For example, the network will try to deliver the frame, but it may fail or take a long time to deliver the frame. Such frame loss or delay in a control system may be problematic, for example, the system may become unstable causing a generator to explode, an aircraft engine to malfunction in flight, or a medical system to give a false reading, as a few examples. Determination if a data flow is time-sensitive or best effort is up to the system designer(s). Embodiments allow common re-usable application blocks to be re-used in different systems as best effort or time-sensitive depending on the system need. In the previously described analytic application, the data flow created (the health or performance analysis) does not have implied context. What the system uses the data for may create the context and therein also may determine if the data shall be treated as critical and time-sensitive or non-critical and best effort.

As shown in FIG. 17, for example, the TSN 1528 may include a network stack 1708 that may route data and information through the networked devices, such as routers, switches (e.g., Ethernet switches) or other devices that communicate data packets between different devices in the system 1500. The network stack 1708 may be composed of several operational or functional layers (e.g., a network Application Program Interface (API) 1711, an Operating System (OS) 1712, one or more network drivers 1704, and hardware 1714. During execution, the application 1513 at a source node 1719 may transmit one or more data packets 1703 to control operations of the installed product 1502. While FIG. 17 shows only two nodes, this is only an example, and the system 1500 may include any suitable number of nodes. In one or more embodiments, two nodes may have multiple links between them that may mirror/duplicate the transmission of data in parallel to ensure reliability (e.g., this way if the transmission of one data fails, the data will be transmitted on the other link).

Initially at S210, network configuration data 1702 is received at a network driver 1704. In one or more embodiments, the network configuration data 1702 may be stored in the configuration map 1900. In one or more embodiments, the network configuration data 1702 may be transmitted from the network configuration module 1512 to the network driver 1704 via a configuration channel 1706.

In one or more embodiments, prior to receipt of the network configuration data 1702, the network driver 1704 may package the data frames 404 that make up the data packet 1703 per a default frame format of "best effort," unless data associated with the packet indicates otherwise. Conventionally, to change how a data packet is sent (e.g., to change from "best effort" to scheduled/time-sensitive, changes would be made at the application to establish different paths. IN one or more embodiments, on the other hand, changes are made at the network driver instead of the application to change from "best effort" to time-sensitive. As described above, it may be beneficial to change the network driver instead of the application because (a) the application code is not available, (b) the application code may have been validated to some degree, and it may be undesirable to have to re-verify control loops executed per the application, and/or (c) it may expose networking scheduling issues to software developers and non-domain experts Then in S212, the network driver 1704 is configured based on the received configuration data 1702. In one or more embodiments, the network configuration module 1512 may, via the configuration data 1702, specify the criteria for the network drivers 1704 to use when tagging/segregating the data packet 1703, as well as to specify the QoS parameters 1532 for different paths. In one or more embodiments QoS parameters 1532 may be specified for both the end-systems and the switches. In one or more embodiments, the network configuration module 1512 may also set other parameters for operation of the TSN 1528. In one or more embodiments, the network driver 1704 may be configured to: analyze a received data packet 1703 to determine an appropriate frame format for further transmission of the data packet 1703; tag the data packet to indicate the appropriate frame format; and then divide the data packet 1703 into one or more data frames 1804 having the appropriate frame format.

Then at S214, one or more data packets 1703 are received at the network driver 1704. In one or more embodiments, the application 1513 transmits the data packet 1703 to the network stack 1708, and in particular to the network driver 1704 per instructions from the network API 1711. In one or more embodiments, the application 1513 may transmit the data packet 1703 as a "best-effort" data packet. As will be further described below, the network driver 1704 may then intercept this data packet and may segregate/tag the packet according to the rules in the configuration map 1900. As will also be further described below, the switch 1701 may also use the segregation/tagging to segregate the data frames into different paths.

In one or more embodiments, the network driver 1704 may analyze the received data packet 1703 with respect to the received configuration data 1702. In one or more embodiments, the analysis may determining whether the received data packet 1703 includes any segregation features in S216. During segregation, in one or more embodiments, the network driver 1704 may determine whether any of the features included in the configuration data 1702 are the same as, or substantially the same as, any segregation features 1902 in the data packet 1703.

In one or more embodiments, the feature in the data packet 1703 may exactly match the segregation feature 1902 in the configuration map 1900 for the feature to be identified as a segregation feature 1902. In one or more embodiments, the feature in the data packet 1703 may substantially, but not exactly, match the segregation feature 1902 in the configuration map 1900 for the network driver 1704 to determine the segregation feature is present. In one or more embodiments, a threshold may be applied to determine whether a feature that does not exactly match the segregation feature 1902 in the configuration map 1900 may still be considered a segregation feature. For example, the threshold may be 10%, such that if a feature in the data packet 1703 matches 90% or more of the segregation feature 1902 in the configuration map 1900, the feature may be considered a segregation feature. Other suitable thresholds may be used. In one or more embodiments, the threshold may be set by an administrator or any other suitable party. In one or more embodiments, entropy (e.g., the degree of randomness of the data) may be used to stochastically segregate traffic classes. In particular, entropy may relate to a degree of compression of the frame. For example, with executable data, the binary output of a processor may be complex and may then be hard to compress; it may have a lower degree of compression. A text document, on the other hand, may be comparatively simpler and then easy to compress; it may have a higher degree of compression. In one or more embodiments, a threshold may be used to determine whether the degree of compression correlates to a best-effort classification or a time-sensitive classification. In one or more embodiments, for life-critical operations, for example, an exact match may be used.

If it is determined in S216 that the data packet 1703 includes no segregation features 1902, the process proceeds to S217, and the data packet may be assigned a default priority (e.g., highest/"whitelist" priority or lowest/"blacklist") as set by an administrator or other suitable party. If it is determined in S216 that the data packet 1703 includes a segregation feature 1902, the data packet 1703 may be tagged with a tag 1906 to indicate the appropriate frame format in S218, based on the determined segregation feature. In one or more embodiments, the tag 1906 may indicate at least one of a priority of the frame (e.g., over other frames, and that a frame may be dropped if there is congestion and it has a lower priority), a scheduling time frame (in the form of maximum tolerable latency), a reliability indicator, and a traffic shaping element. For example, a data packet 1703 may include "port 1234" as the segregation feature 1902. Based on the configuration map 1900, data packets 1703 with a port 1234 segregation feature may use a distinct VLAN ID (Virtual Local Area Network Identification) from all other non-scheduled packets. In this example, "VLAN_ID 1" may be the tag 1906 for this data packet 1703, while all other packets may be tagged with "VLAN_ID 0" 1906. In one or more embodiments, tagging is accomplished in software via the driver. In one or more embodiments, the configuration map 1900 may include a hierarchy of rules whereby if multiple segregation features 1902 are detected, the rules having a higher priority may be applied to the data frame. Then the network driver 1704 may divide the data packet 1703 into one or more data frames 1804 having the frame format commensurate with the tag 1906 in S220.

Then in S222, the one or more data frames 1804 may be transmitted from the network driver 1704 to the switch 1701.

In S224, the switch 1701 is configured. In one or more embodiments, the scheduler 1511 may receive, as input, switch configuration data 1705 from the network configuration module 1512. The switch configuration data 1705 may be transmitted from the network configuration module 1512 to the scheduler 1511 via a configuration channel 1709. The scheduler 1511 may also receive, as input, data frames 1804 including tags 1704 from the network driver 1704. Based on the input, the scheduler 1511 may then generate a schedule 1710 to configure the switch 1701 and establish a flow to a destination node 1720. In one or more embodiments, the switch 1701 may monitor all data frames 1804 received from the network driver 1704 and may discriminate and forward the data frames 404 based on the schedule 1710. In one or more embodiments, "configuration of the switch" may describe the scheduled opening and closing of the gates 1713.

Figure 18:
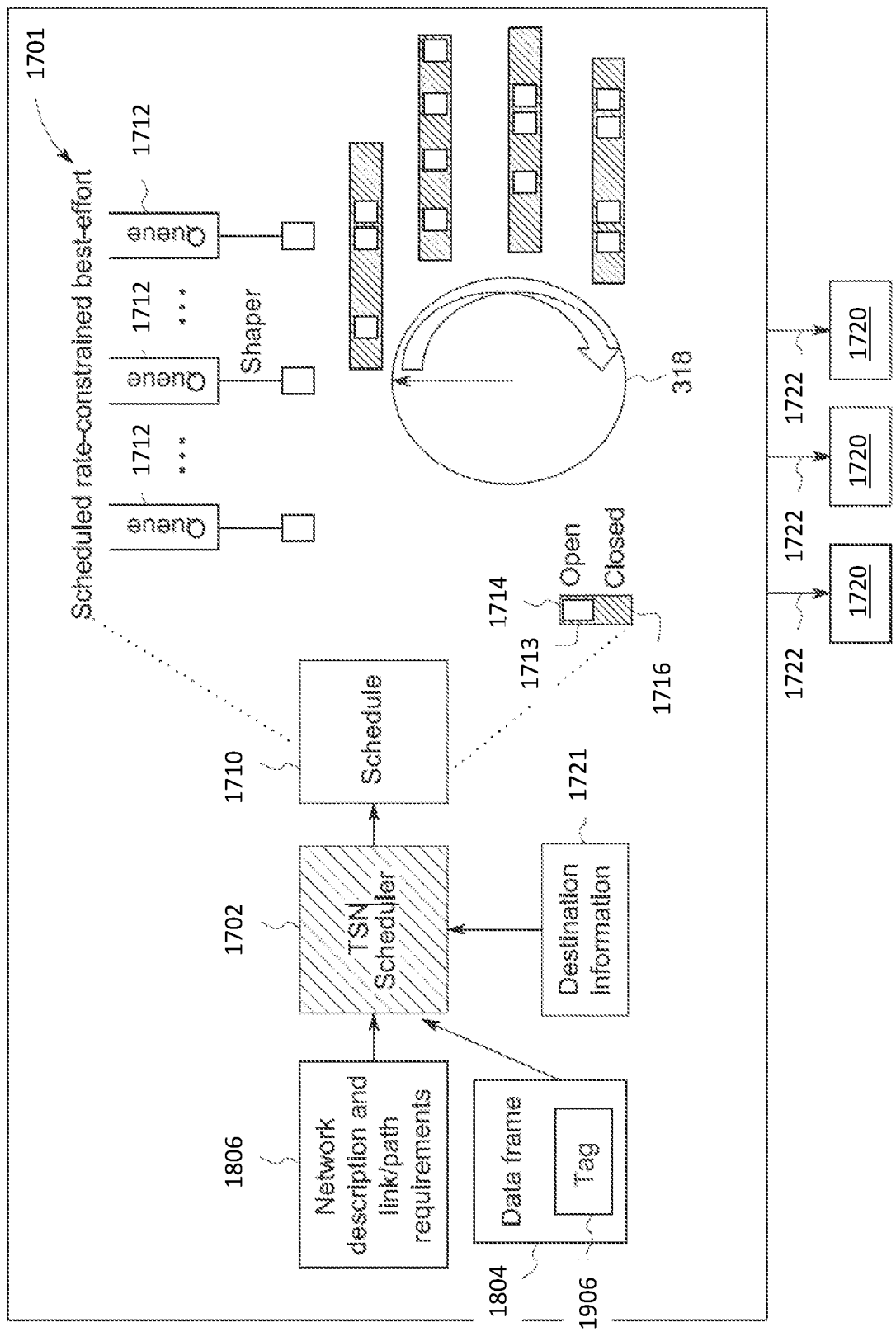
FIG. 18 illustrates a block diagram according to some embodiments.
Figure 19:
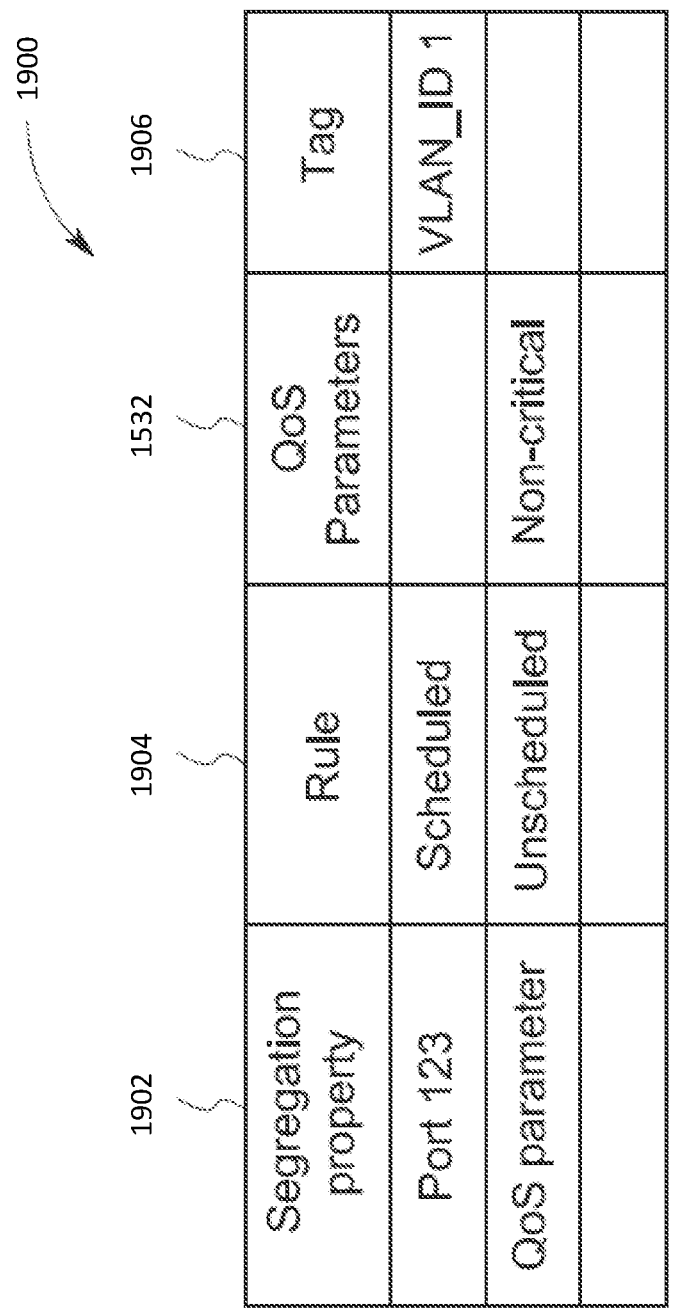
FIG. 19 illustrates a map according to some embodiments.

While FIG. 18 shows the scheduler 1511 located within the switch 1701, the scheduler 1511 may reside anywhere within the network 1528. In one or more embodiments, the scheduler 1511 may communicate with all switches and end systems to configure them. In one or more embodiments, the scheduler 1511 may also receive as input the destination 1720 of the data frames (in the form of destination information 1721), and a network topology description and path or link requirements 1806 (e.g., an indication of time sensitive paths, maximum latencies, physical link bandwidths, size of frames ("payload")) from an application and/or toolchain, or any other suitable source. The scheduler 1511 may receive other suitable input.

Then in S226, the schedule 1710 is executed and the one or more data frames 1804 are transmitted through the network 1528 based on the schedule 1710. And then in S228, one or more operations of the installed product 1502 may be controlled based on the transmitted data frames 1804. For example, as described above, the locomotive or rail vehicle system may not apply its brakes early enough to avoid a collision based on the transmitted data frames 1804.

In one or more embodiments, the schedule 1710 may dynamically change while the schedule 1710 is being executed. For example, with respect to a feedback control system, the system may be tasked with maintaining a stability of the system, and may make changes to the QoS parameter input, for example. These changes may be fed back to the network configuration module 1512 to dynamically change the segregation and tagging of a data packet, or at least one data frame in the data packet, which in turn may change the schedule 1710 as the schedule 1710 is being executed.

Figure 20:
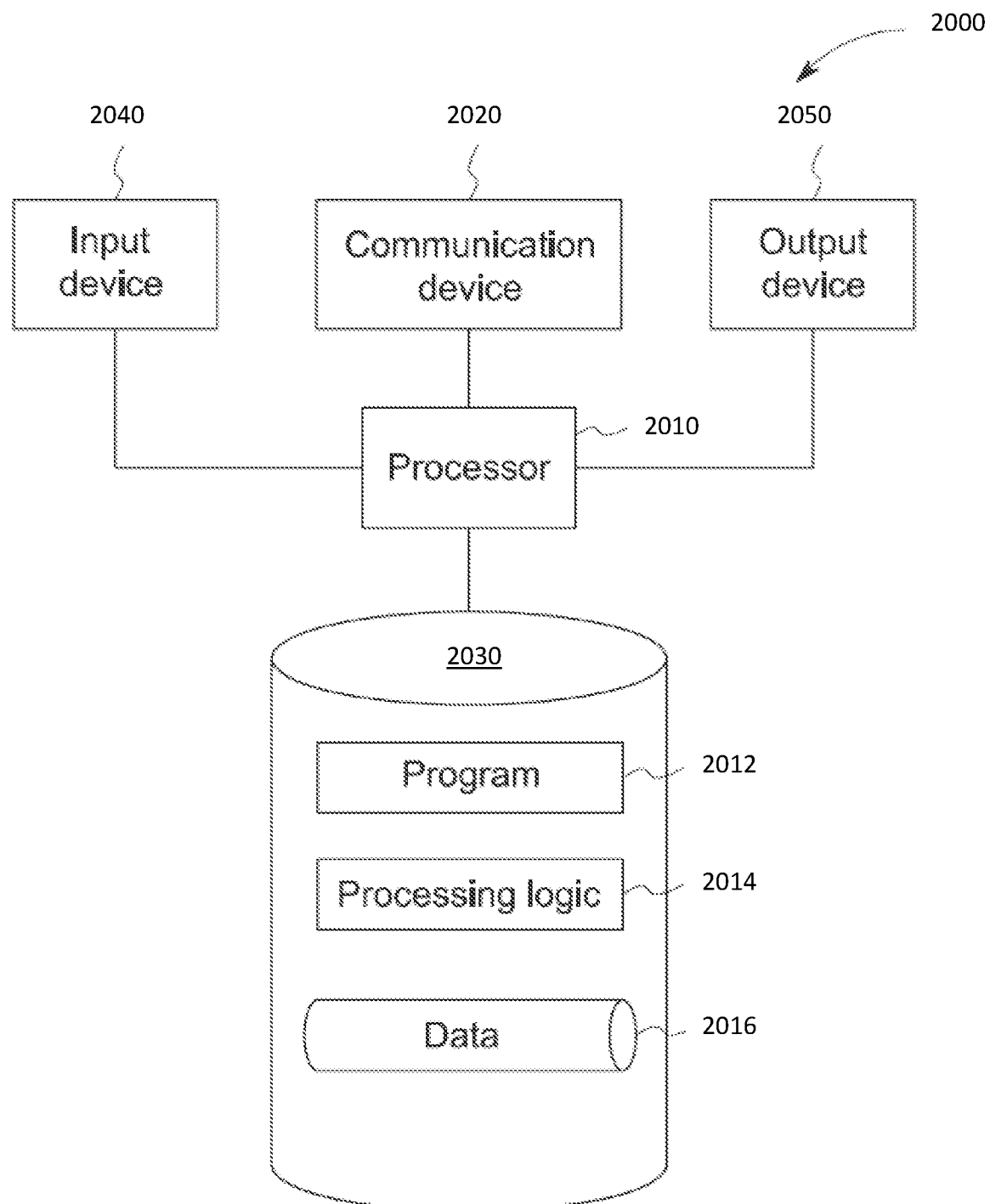
FIG. 20 illustrates a block diagram of a system according to some embodiments.

The embodiments described herein may be implemented using any number of different hardware configurations. For example, FIG. 20 illustrates a network configuration platform 2000 that may be, for example, associated with the system 1500 of FIG. 15. The network configuration platform 2000 comprises a network configuration processor 2010 ("processor"), such as one or more commercially available Central Processing Units (CPUs) in the form of one-chip microprocessors, coupled to a communication device 2020 configured to communicate via a communication network (not shown in FIG. 20). The communication device 2020 may be used to communicate, for example, with one or more users. The network configuration platform 2000 further includes an input device 2040 (e.g., a mouse and/or keyboard to enter information) and an output device 2050 (e.g., to output and display installed product information).

The processor 2010 also communicates with a memory/storage device 2030. The storage device 2030 may comprise any appropriate information storage device, including combinations of magnetic storage devices (e.g., a hard disk drive), optical storage devices, mobile telephones, and/or semiconductor memory devices. The storage device 2030 may store a program 2012 and/or network configuration processing logic 2014 for controlling the processor 2010. The processor 2010 performs instructions of the programs 2012, 2014, and thereby operates in accordance with any of the embodiments described herein. For example, the processor 2010 may receive data and then may apply the instructions of the programs 2012, 2014 to configure the network driver and switch.

The programs 2012, 2014 may be stored in a compressed, uncompiled and/or encrypted format. The programs 2012, 2014 may furthermore include other program elements, such as an operating system, a database management system, and/or device drivers used by the processor 2010 to interface with peripheral devices.

As used herein, information may be "received" by or "transmitted" to, for example: (i) the platform 2000 from another device; or (ii) a software application or module within the platform 2000 from another software application, module, or any other source.

One or more embodiments of the subject matter described herein relate to systems and methods that use symmetrically communicated secret information in time-sensitive networking to increase cybersecurity. The systems and methods can use a quantum and classical channel to securely generate and distribute a common shared secret for information-theoretic security, also known as perfect cybersecurity, for time-sensitive networking. This shared secret is information that is not publicly available outside of the parties or devices that exchange the information. The information can include an encryption key, an indication of non-repudiation, hashing information (e.g., a data hash), etc. While the description herein may focus on the sharing of encryption keys, not all embodiments of the subject matter are limited to the sharing of encryption keys.

Quantum key distribution can be used to protect time-sensitive networking while time-sensitive networking provides support for implementing quantum key distribution. Precise synchronization and timing are needed on the quantum channel and efficient utilization of the classical channel is required to generate quantum keys at higher and more deterministic rates for use in time-sensitive networking. Quantum key distribution uses components of quantum mechanics by allowing computing devices (e.g., computers, sensors, controllers, etc.) to produce a shared random secret key known only to the computing devices. This shared key is used to encrypt and decrypt messages communicated between the computing devices. Information can be encoded in quantum states (e.g., qubits) instead of bits, which allows the computing devices to detect when a third-party computing device is attempting to detect or listen in to the communications using the quantum key. This third-party attempt can slightly introduce errors during reception of the shared quantum key, which is detected by one or more of the computing devices.

In one embodiment, a control system and method for a time-sensitive network transmits symmetric secret information (e.g., information that is not publicly available outside of the parties or devices that exchange the information) through the time-sensitive network using deterministic scheduling of the network to enforce the life-time of the secret information. The life-time of the secret information can be for the exchange of a single message in the network. For example, a quantum key can be created and shared between computing devices that are communicating through or via the time-sensitive network, with the key only being valid and used for the sending of a single message from one computing device to another computing device, and not for any reply or other message between the computing devices. At least one technical effect of the subject matter described herein provides for increased security in the communication of time-sensitive packets in a time-sensitive network. This can help ensure the safe and secure communication of information that is communicated in a time critical manner.

The computing devices can use a schedule dictated by a scheduler device of the time-sensitive network to determine when to communicate time-sensitive messages, and the scheduler device can create the schedule to generate secret information for the computing devices so that each secret information is used for the communication of only a single message in the time-sensitive network. The valid life-time of the secret information is determined by scheduled time-sensitive network windows or via output from the scheduler device of the time-sensitive network. After the life-time of the key or the scheduled window has expired, the secret information is no longer valid for communications via the time-sensitive network. The time periods or windows over which the secret information is valid are very short, tightly-controlled timescales.

Figure 21:
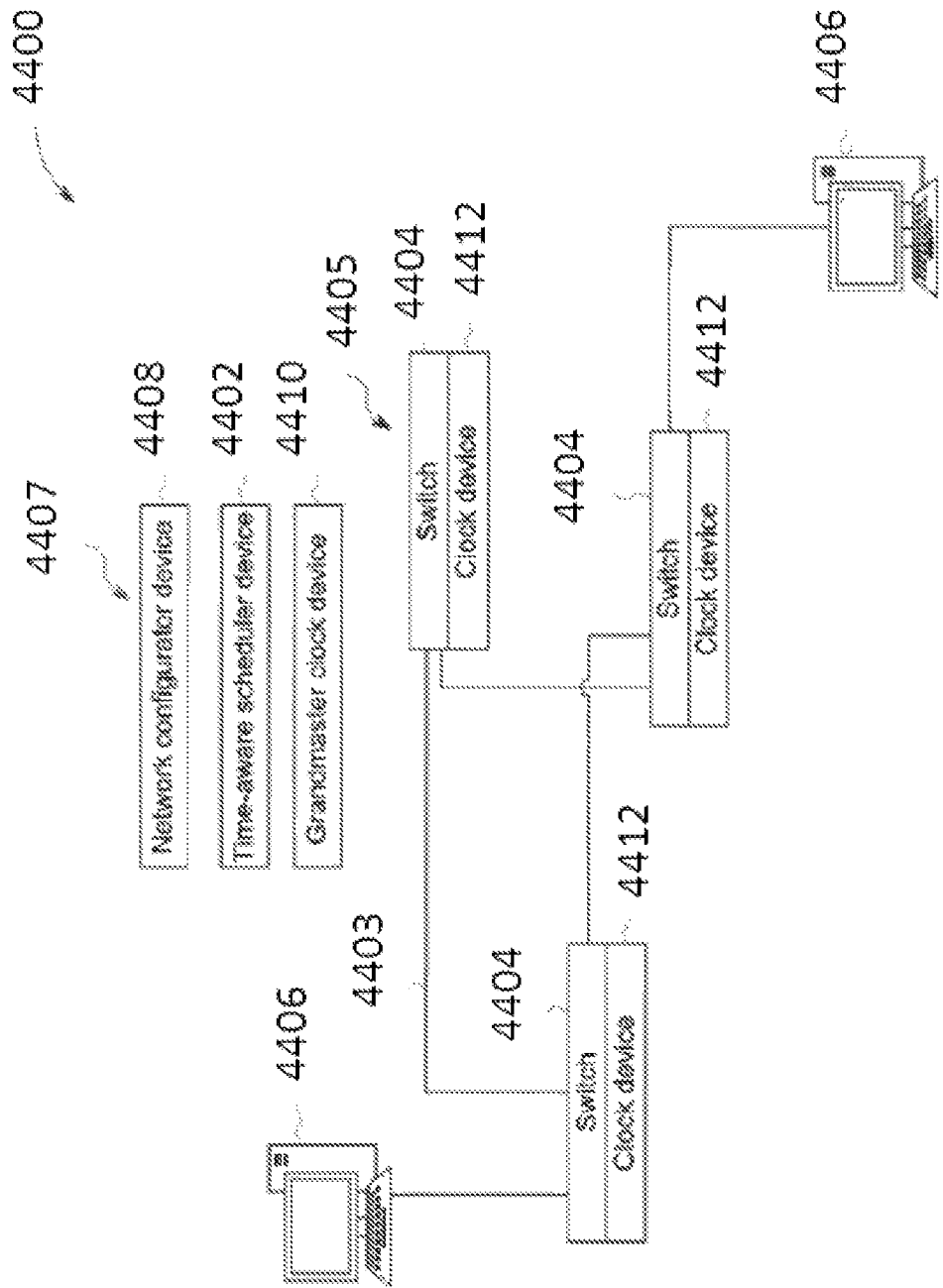
FIG. 21 schematically illustrates one embodiment of a network control system of a time-sensitive network system.

FIG. 21 schematically illustrates one embodiment of a network control system 4407 of a time-sensitive network system 4400. The components shown in FIG. 21 represent hardware circuitry that includes and/or is connected with one or more processors (e.g., one or more microprocessors, field programmable gate arrays, and/or integrated circuits) that operate to perform the functions described herein. The components of the network system 4400 can be communicatively coupled with each other by one or more wired and/or wireless connections. Not all connections between the components of the network system 4400 are shown herein. The network system 4400 can be a time-sensitive network in that the network system 4400 is configured to operate according to one or more of the time-sensitive network standards of IEEE, such as the IEEE 802.1AS™-2011 Standard, the IEEE 802.1Q™-2014 Standard, the IEEE 802.1Qbu™-2016 Standard, and/or the IEEE 802.3br™-2016 Standard.

The network system 4400 includes several nodes 4405 formed of network switches 4404 and associated clocks 4412 ("clock devices" in FIG. 21). While only a few nodes 4405 are shown in FIG. 21, the network system 4400 can be formed of many more nodes 4405 distributed over a large geographic area. The network system 4400 can be an Ethernet network that communicates data signals along, through, or via communication links 4403 between computing devices 4406 (e.g., computers, control systems, sensors, etc.) through or via the nodes 4405. The links 4403 can represent one or more of a variety of different communication paths, such as Ethernet links, optical links, copper links, and the like. The data signals are communicated as data packets sent between the nodes 4405 on a schedule of the network system 4400, with the schedule restricted what data signals can be communicated by each of the nodes 4405 at different times.

For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system. The best effort traffic includes data signals that are not required to ensure the safe operation of the powered system, but that are communicated for other purposes (e.g., monitoring operation of components of the powered system).

The control system 4407 includes a time-aware scheduler device 4402 that enables each interface of a node 4405 to transmit an Ethernet frame (e.g., between nodes 4405 from one computer device 4406 to another device 4406) at a prescheduled time, creating deterministic traffic flows while sharing the same media with legacy, best-effort Ethernet traffic. The time-sensitive network 4400 has been developed to support hard, real-time applications where delivery of frames of time-critical traffic must meet tight schedules without causing failure, particularly in life-critical industrial control systems. The scheduler device 4402 computes a schedule that is installed at each node 4405 in the network system 4400. This schedule dictates when different types or classification of signals are communicated by the switches 4404.

The scheduler device 4402 remains synchronized with a grandmaster clock device 4410 that includes is a clock to which clock devices 4412 of the nodes 4405 are synchronized. A centralized network configurator device 4408 of the control system 4407 is comprised of software and/or hardware that has knowledge of the physical topology of the network 4400 as well as desired time-sensitive network traffic flows. The configurator device 4408 can be formed from hardware circuitry that is connected with and/or includes one or more processors that determine or otherwise obtain the topology information from the nodes 4405 and/or user input. The hardware circuitry and/or processors of the configurator device 4408 can be at least partially shared with the hardware circuitry and/or processors of the scheduler device 4402.

The topology knowledge of the network system 4400 can include locations of nodes 4405 (e.g., absolute and/or relative locations), which nodes 4405 are directly coupled with other nodes 4405, etc. The configurator device 4408 can provide this information to the scheduler device 4402, which uses the topology information to determine the schedules for communication of secret information (e.g., encryption keys) and messages between the devices 4406 (that may be encrypted using the secret information). The configurator device 4408 and/or scheduler device 4402 can communicate the schedule to the different nodes 4405.

A link layer discovery protocol can be used to exchange the data between the configurator device 4408 and the scheduler device 4402. The scheduler device 4402 communicates with the time-aware systems (e.g., the switches 4404 with respective clocks 4412) through a network management protocol. The time-aware systems implement a control plane element that forwards the commands from the centralized scheduler device 4402 to their respective hardware.

In one embodiment, the configurator device 4408 creates and distributes secret information, such as quantum encryption keys, among the computing devices 4406 for time-sensitive network cybersecurity. Quantum states can be robustly created for the quantum keys using time-bin encoding, which can require extremely small-time scales to increase the quantum key rate (e.g., the rate at which the encryption keys are created).

Time-sensitive networks can be used in life-critical industrial control applications such as the power grid where cybersecurity is important. The configurator device 4408 can use quantum mechanics in the form of quantum photonics to create and share secret information, such as quantum keys. There are many variants of quantum keys that impact both the quantum and classical channels. A quantum state is exchanged between the devices 4406 over a quantum channel in the network and is protected by the physics of quantum mechanics. A third-party eavesdropper is detected by causing a change to the quantum state. Then a series of classical processing is performed to extract and refine the key material. This processing can involve sifting or extraction of the raw key, quantum bit error rate estimation, key reconciliation, and privacy amplification and authentication. This series of classical processing usually requires a public channel, typically by means of TCP connections in the network. For the classical channel, current implementations of quantum key distribution rely upon TCP. However, operating directly over Ethernet with time-sensitive networks can be more efficient. TCP guarantees that the information exchanged on the public channel is delivered. However, it is vulnerable to congestion and to Denial of Service (DoS) attacks that disrupt key generation. TCP congestion can have a significant impact on the quantum key generation rate.

On the contrary, time-sensitive networking via the scheduler device 4402 can guarantee the delivery of the information and be more efficient. The time-sensitive network can remove the need for handshaking processes, resending of TCP segments, and rate adjustment by the scheduler device 4402 scheduling or otherwise allocating dedicated time slots for secret information generation and distribution. Implementing the classical channel over a time-sensitive network eliminates variability and ensures more robust and deterministic generation of secret information, which can be required by a time-sensitive network.

Control of a quantum channel in the network 4400 requires precise timing that time-sensitive networks provide. The quantum channel can be a dedicated link 4403, such as a fiber optic connection, between the devices 4406, or can be available bandwidth space within the network 4400. The quantum state can be encoded in various ways, including polarization. Alternatively, time-bin encoding and entanglement can be used for encoding the quantum state in the secret information. Time-bin encoding implements the superposition of different relative phases onto the same photon. Quantum measurement is implemented by measuring the time of arrive of the photon. This requires precise and stable time synchronization, typically an accuracy of thirty nanoseconds is required.

An eavesdropper will cause the quantum bit error rate of the secret information to increase, thereby alerting the configurator device 4408 to the presence of the eavesdropper. Because the time-sensitive network 4400 is assumed to provide deterministic traffic flow for life-critical control systems, a reaction to an attack by the configurator device 4408 maintains determinism throughout the network 4400. For example, if the time-sensitive network flow shares the optical channel used by the quantum secret information, then the quantum and classical communication flows may be rerouted by the configurator device 4408 to avoid potential tampering. Stated differently, the time-sensitive communications sent between the switches 4404 (according to the schedules dictated by the scheduler device 4402) and the quantum secret information can be communicated over the same links 4403 in the network 4400. The configurator device 4408 can maintain the existing schedule solution for the links 4403 that are safe (where no third-party action occurred), and removing the link or links 4403 exhibiting greater or higher quantum bit error rates from use in the network 4400.

For example, the configurator device 4408 can monitor the quantum bit error rate on or in the links 4403 of the time sensitive network 4400. The configurator device 4408 can detect an increase in the quantum bit error rate in one link 4403 relative to the quantum bit error rate in one or more (or all) other links 4403 in the network 4400. The configurator device 4408 can then remove the link 4403 with the larger error rate from the configuration of the network 4400 and can inform the scheduler device 4402 of this removal. The scheduler device 4402 can then update or revise the schedule(s) for the time sensitive network 4400 with this link 4403 being removed and, therefore, not used for the communication of time-sensitive signals or messages, or for the communication of secret information.

Figure 22:
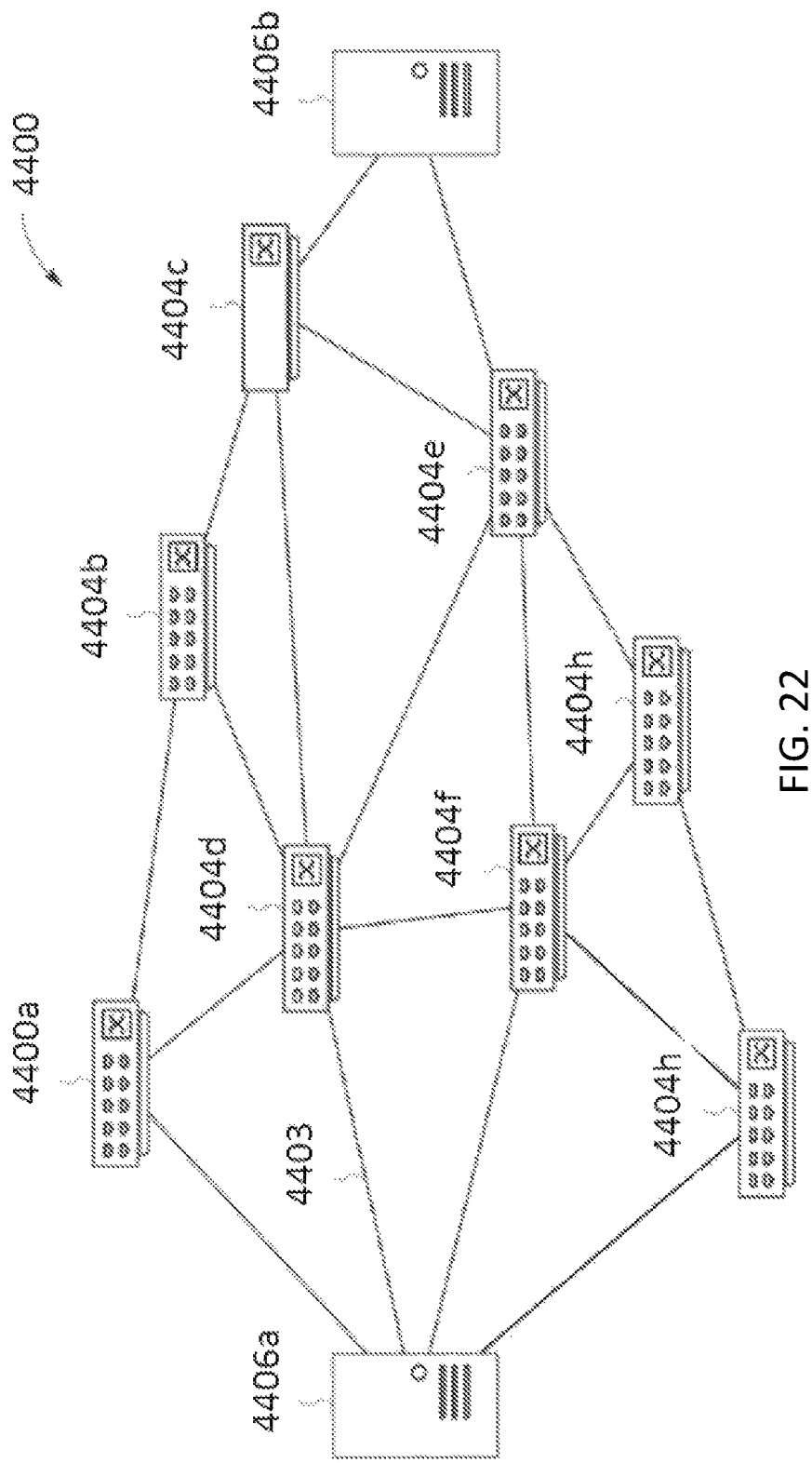
FIG. 22 is another illustration of the time-sensitive network system shown in FIG. 21.

As a result, the scheduler device 4402 finds or creates a schedule that maintains the existing safe flows of messages and adds a new flow that bypasses the suspected link. FIG. 22 is another illustration of the time-sensitive network 4400 shown in FIG. 21. As described above, plural computing devices 4406 (e.g., devices 4406A, 4406B in FIG. 22) communicate frames of messages with each other on a schedule dictated by the scheduler device 4402. The frames are sent from the device 4406A to the device 4406B along one or more paths defined by a combination of links 4403 and switches 4404 (e.g., switches 4404A-H in FIG. 22). The secret information can be exchanged along a first path (e.g., the path that is formed by the switches 4404C, 4404D and the links 4403 between the devices 4406A, 4406B and the switches 4404C, 4404D), and time-sensitive messages can be exchanged along another path that does not include any of the same links 4403 or switches 4404, or that includes at least one different link 4403 or switch 4404. For example, the messages can be sent along a path that extends through the switches 4404G, 4404F, 4404E and the links 4403 that connect the devices 4406A, 4406B and the switches 4404G, 4404F, 4404E. The path used to exchange the secret information can be referred to as the quantum channel.

In one embodiment, the schedule for the network 4400 is created by the configurator device 4408 to include the constraints of creating and transmitting the secret information (e.g., the quantum key) to protect an Ethernet frame. For example, the configurator device 4408 may solve a system of scheduling equations to create a time-sensitive schedule for the switches to send Ethernet frames in a time-sensitive manner in the network 4400. This schedule may be subject to various constraints, such as the topology of the network 4400, the speed of communication by and/or between switches in the network 4400, the amount of Ethernet frames to be communicated through different switches, etc. This schedule can be created to avoid two or more Ethernet frames colliding with each other at a switch (e.g., to prevent multiple frames from being communicated through the same switch at the same time). One additional constraint for generation of the time-sensitive schedule by the configurator device 4408 can be the generation and communication of the secret information through the time-sensitive network 4400. For example, the schedule may include or be required to include time(s) dedicated to communication of only the shared information along or via one or more links in the network 4400. Other frames may not be allowed by the schedule to be communicated during these dedicated times. The configurator device 4408 may be restricted to generating the time-sensitive schedule to include these times dedicated to communication of the secret information.

The configurator device 4408 can detect an increase in the quantum bit error rate in one or more of the links 4403, such as the link 4403 between the switches 4404C, 4404D. Detection of this increase can cause the configurator device 108 to stop sending the secret information between the devices 4406A, 4406B across, through, or via the link 4403 between the switches 4404C, 4404D. This increase can indicate that an unauthorized third party is attempting to obtain or change the secret information exchanged between the devices 4406A, 4406B. The configurator device 4408 can change to sending the secret information between the devices 4406A, 4406B (or directing the devices 4406A, 4406B to send the secret information) through, across, or via a path that extends through the switches 4404A, 4404B, 4404C (and the links 4403 between these switches 4404A, 4404B, 4404C). This causes the secret information to avoid or no longer be communicated through or over the link 4403 associated with the increase in the quantum bit error rate. This increases security in the network 4400, as the configurator device 4408 can repeatedly change which paths are used or dedicated for exchanging secret information to avoid those portions of network paths that are associated with increases in the quantum bit error rate.

Another approach to an increasing or a suspiciously high quantum bit error rate is to decrease lifetimes of the secret information and thereby generate new secret information at a faster rate. For example, the configurator device 4408 can create or instruct the devices 4406A, 4406B to create a new quantum of secret information for each message that is exchanged between the devices 4406A, 4406B. If the device 4406A is a sensor and the device 4406B is a controller that changes operation of a powered system in response to a sensed parameter, then a first quantum of secret information can be created and used to encrypt and send a first message from the sensor device 4406A to the controller device 4406B (that includes sensed information from the sensor device 4406A). The controller device 4406B can receive the encrypted message, decrypt the message, and perform an action based on the sensed parameter. The controller device 4406B can send a message back to the sensor device 4406A using a different quantum of secret information, such as an encrypted confirmation message indicating receipt of the sensed parameter. Subsequent sensed parameters can be communicated using messages each encrypted with a different quantum of secret information.

For example, the scheduler device 4402 can compute a secret information update rate that is a given or designated fraction of the time-sensitive network frame transmission rate. This fraction can be less than one such that a new quantum of secret information is created for each message or each frame of a message. Stated differently, a new encryption key can be generated and used for encrypting each time-sensitive network frames that is sent between the devices 4406. The secret information can be symmetric secret information that is transmitted through the time-sensitive network 4400 using deterministic scheduling to enforce the life-time of the secret information (e.g., which can be as short as the exchange of a single frame or a single message formed of two or more frames). Such a constraint is added to the scheduler device 4402 so that the scheduler device 4402 will find a schedule that is feasible for the given topology, requested flow latency, frame sizes, and update rate of the secret information for each link 4403. For example, the scheduler device 4402 can balance (e.g., adjust) the scheduled time periods of when new quantum keys are exchanged, when time-sensitive frames are communicated, when best effort frames are communicated, and the like, to ensure that the time-sensitive frames are successfully communicated between the devices 4406 within designated time limits while also providing a new encryption key for each message or each frame.

Figure 23:
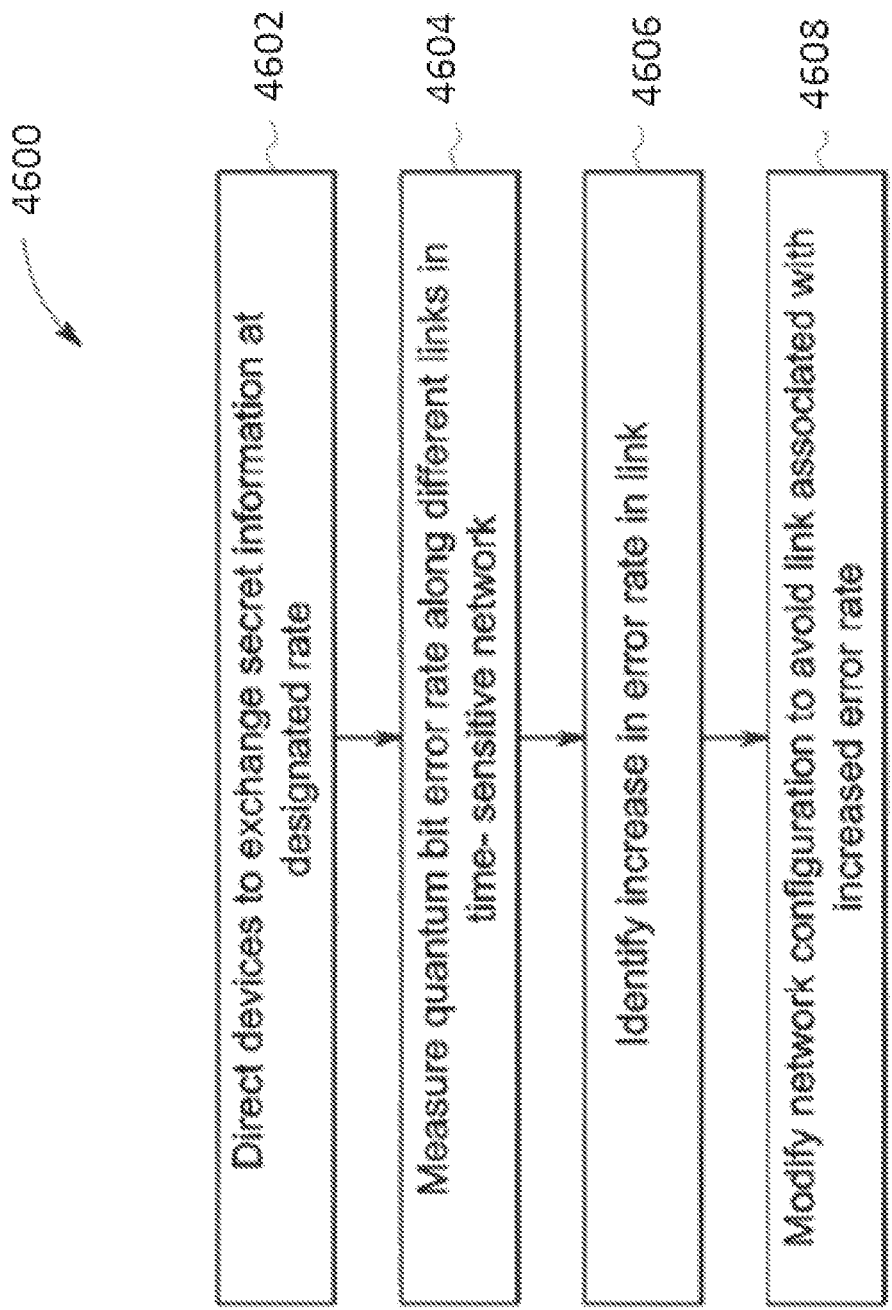
FIG. 23 illustrates a flowchart of one embodiment of a method for securing communications in a time-sensitive network.

FIG. 23 illustrates a flowchart of one embodiment of a method 4600 for securing communications in a time-sensitive network. The method 4600 can represent operations performed by the control system 4407 (e.g., by the configurator device 4408 and/or the scheduler device 4402). At 4602, computing devices are directed to exchange secret information at a designated rate. For example, the configurator device 4408 or scheduler device 4402 can instruct the devices 4406 to exchange encryption keys at a designated rate so that a new key is created on a repeating basis. In one embodiment, the configurator device 4408 or scheduler device 4402 instructs the devices 4406 to create a new portion of secret information for each message that is sent from one device 4406 to another device 4406. A message is formed from two or more data frames in an Ethernet network such as the network system 4400. Optionally, the configurator device 4408 or scheduler device 4402 can instruct the devices 4406 to create a new portion of secret information at a greater or faster rate, such as for each frame of a message formed from two or more frames.

At 4604, an error rate along one or more links in the time-sensitive network is measured. For example, the configurator device 4408 can measure the quantum bit error rate along each link 4403 in a quantum channel between the devices 4406. This channel may be dedicated to exchanging secret information between the devices 4406, and can be formed of a combination of links 4403 and switches 4404. The configurator device 4408 can measure or calculate the quantum bit error rate in each link 4403 along this channel.

At 4606, in increase in the error rate of one or more of the links that is monitored is identified. For example, the configurator device 4408 can determine that the quantum bit error rate in a link 4403 between two switches 4404 is increasing or is increasing by more than a designated threshold (e.g., more than 10%). This increase can indicate that an unauthorized third party is attempting to obtain the secret information along the quantum channel. As a result, the configurator device 4408 can identify which link 4403 is associated with the increased error rate and can instruct the scheduler device 4402 to modify the communication schedules of the time-sensitive network.

At 4608, the configuration of the network is modified to avoid exchanging the secret information over the link associated with the increased error rate. For example, the configurator device 4408 can instruct the scheduler device 4402 to no longer communicate quantum keys along, through, or over the link 4403 associated with the increased error rate. The scheduler device 4402 can modify the schedule of the time-sensitive network to allow for the secret information to be exchanged over a different path, while scheduling sufficient resources for successful and timely communication of time-sensitive messages.

In one embodiment, a method includes measuring quantum bit error rates in links between switches in a time-sensitive network, identifying an increase in the quantum bit error rate in a monitored link of the links between the switches, and modifying a configuration of the time-sensitive network so that secret information is not exchanged over the monitored link associated with the increase in the quantum bit error rate. This secret information can be used for secure communication through or via the network.

Optionally, the secret information can include one or more of a quantum encryption key, an indication of non-repudiation, or a data hash.

Optionally, the quantum bit error rates are measured in the links that form a quantum channel between computing devices that is dedicated to exchanging the secret information.

Optionally, modifying the configuration of the time-sensitive network includes changing a schedule for communication of the secret information, time-sensitive messages, and best-effort messages within the time-sensitive network.

Optionally, changing the schedule includes changing which of the links are used to form a dedicated quantum channel over which the secret information is exchanged between computing devices.

Optionally, the method also includes instructing computing devices that exchange the secret information to change the secret information at a rate that is a fraction of a rate at which one or more of messages or frames of the messages are exchanged between the computing devices.

Optionally, the computing devices are instructed to change the secret information at least once for each new message of the messages that are exchanged between the computing devices.

Optionally, the computing devices are instructed to change the secret information at least once for each frame of each new message of the messages that are exchanged between the computing devices.

In one embodiment, a system includes one or more processors configured to measure quantum bit error rates in links between switches in a time-sensitive network. The one or more processors also are configured to identify an increase in the quantum bit error rate in a monitored link of the links between the switches, and to modify a configuration of the time-sensitive network so that secret information is not exchanged over the monitored link associated with the increase in the quantum bit error rate. This secret information can be used for secure communication through or via the network.

Optionally, the secret information can include one or more of a quantum encryption key, an indication of non-repudiation, or a data hash.

Optionally, the one or more processors are configured to measure the quantum bit error rates in the links that form a quantum channel between computing devices that is dedicated to exchanging the secret information.

Optionally, the one or more processors are configured to modify the configuration of the time-sensitive network by changing a schedule for communication of the secret information, time-sensitive messages, and best-effort messages within the time-sensitive network.

Optionally, the one or more processors are configured to change the schedule by changing which of the links are used to form a dedicated quantum channel over which the secret information are exchanged between computing devices.

Optionally, the one or more processors are configured to instruct computing devices that exchange the secret information to change the secret information at a rate that is a fraction of a rate at which one or more of messages or frames of the messages are exchanged between the computing devices.

Optionally, the one or more processors are configured to instruct the computing devices to change the secret information at least once for each new message of the messages that are exchanged between the computing devices.

Optionally, the one or more processors are configured to instruct the computing devices to change the secret information at least once for each frame of each new message of the messages that are exchanged between the computing devices.

In one embodiment, a method includes instructing computing devices that communicate messages with each other via a time-sensitive network to encrypt the messages using a secret information, directing the computing device to exchange the secret information via a dedicated quantum channel in the time-sensitive network, and instructing the computing devices to change the secret information at a rate that is a fraction of a rate at which one or more of the messages or frames of the messages are exchanged between the computing devices.

Optionally, the secret information includes one or more of a quantum encryption key, an indication of non-repudiation, or a data hash.

Optionally, the computing devices are instructed to change the secret information at least once for each new message of the messages that are exchanged between the computing devices.

Optionally, the computing devices are instructed to change the secret information at least once for each frame of each new message of the messages that are exchanged between the computing devices.

Optionally, the method includes measuring quantum bit error rates in links between switches in the time-sensitive network, identifying an increase in the quantum bit error rate in a monitored link of the links between the switches, and modifying a configuration of the time-sensitive network so that the secret information is not exchanged between the computing devices over the monitored link associated with the increase in the quantum bit error rate.

Optionally, the quantum bit error rates are measured in the links that form the quantum channel.

Optionally, modifying the configuration of the time-sensitive network includes changing a schedule for communication of the secret information, time-sensitive messages, and best-effort messages within the time-sensitive network.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A vehicle control system comprising:
one or more processors configured to determine quality of service (QoS) parameters of vehicle devices communicating data with each other in an Ethernet network that is configured as a time sensitive network (TSN) and that is onboard a vehicle, the one or more processors also configured to determine available communication pathways in the TSN through which the vehicle devices are able to communicate the data and determine unavailable communication pathways in the TSN through which the vehicle devices cannot communicate the data, wherein the available communication pathways and the unavailable communication pathways are configured to change based on one or more of the QoS parameters of the vehicle devices, the data to be communicated between the vehicle devices, or a change in the vehicle devices communicating data with each other, the one or more processors also configured to select one or more of the available communication pathways and to designate communication times at which the data is communicated between the vehicle devices via the one or more of the available communication pathways in order to satisfy the QoS parameters of the vehicle devices.

2. The vehicle control system of claim 1, wherein the QoS parameters dictate one or more lower limits on data throughput in communication between the vehicle devices.

3. The vehicle control system of claim 1, wherein the QoS parameters include a deadline parameter that dictates an upper limit on an amount of time available to communicate the data between the vehicle devices.

4. The vehicle control system of claim 1, wherein the QoS parameters include a transport priority parameter that dictates relative communication priorities among the vehicle devices.

5. The vehicle control system of claim 1, wherein the network is formed from plural communication links and nodes that interconnect the vehicle devices, and wherein the one or more processors are configured to select the most efficient pathway through the network based on limitations of how many of the vehicle devices can communicate the data in one or more of the links or through one or more of the nodes at a time.

6. The vehicle control system of claim 1, wherein the one or more processors are configured to determine the QoS parameters of the vehicle devices communicating the data for controlling movement of the vehicle.

7. A method for controlling operation of a vehicle, the method comprising:
determining quality of service (QoS) parameters of vehicle devices communicating data with each other in an Ethernet network that is configured as a time sensitive network (TSN) and that is onboard a vehicle;
determining available communication pathways in the TSN through which the vehicle devices are able to communicate the data and determining unavailable communication pathways through which the vehicle devices cannot communicate the data, wherein the available communication pathways and the unavailable communication pathways are configured to change based on one or more of the QoS parameters of the vehicle devices, the data to be communicated between the vehicle devices, or a change in the vehicle devices communicating data with each other;
selecting one or more of the available communication pathways; and
designating communication times at which the data is communicated between the vehicle devices via the one or more of the available communication pathways in order to satisfy the QoS parameters of the vehicle devices.

8. The method of claim 7, wherein the QoS parameters dictate one or more lower limits on data throughput in communication between the vehicle devices.

9. The method of claim 7, wherein the QoS parameters include a deadline parameter that dictates an upper limit on an amount of time available to communicate the data between the vehicle devices.

10. The method of claim 7, wherein the QoS parameters include a transport priority parameter that dictates relative communication priorities among the vehicle devices.

11. The method of claim 7, wherein the network is formed from plural communication links and nodes that interconnect the vehicle devices, and further comprising:
selecting the most efficient pathway through the network based on limitations of how many of the vehicle devices can communicate the data in one or more of the links or through one or more of the nodes at a time.

12. A vehicle control system comprising:
one or more processors configured to determine a quality of service (QoS) parameter of one or more vehicle devices communicating data in a time sensitive network (TSN) of an Ethernet network, the one or more processors also configured to determine different pathways in the TSN through which the one or more vehicle devices are able to communicate the data along the different pathways and to designate times at which the data is communicated using the one or more vehicle devices to satisfy the QoS parameter of the one or more vehicle devices, the different pathways including available communication pathways in the TSN through which the one or more vehicle devices are able to communicate the data and unavailable communication pathways in the TSN through which the one or more vehicle devices cannot communicate the data, wherein the available communication pathways and the unavailable communication pathways are configured to change based on one or more of the QoS parameters of the vehicle devices, the data to be communicated between the vehicle devices, or a change in the vehicle devices communicating data with each other,
wherein the one or more processors are configured to restrict communication of the data using the one or more vehicle devices based on the different pathways that are determined and the times that are designated.

13. The vehicle control system of claim 12, wherein the one or more processors are configured to control communication of non-time sensitive communications in the TSN without preventing communication of time sensitive communications in the TSN based on the available bandwidth.

14. The vehicle control system of claim 13, wherein the one or more processors are configured to change one or more of bandwidth allocated for the communication of the time sensitive communications or bandwidth allocated for the communication of the non-time sensitive communications in the TSN without restarting the TSN.

15. The vehicle control system of claim 13, wherein the time sensitive communications include communications required to be completed before designated times or within designated time periods.

16. The vehicle control system of claim 12, wherein the one or more processors are configured to change the QoS parameter.

17. The vehicle control system of claim 12, wherein the one or more processors are configured to change one or more non-time sensitive communications to one of time sensitive communications.

18. The vehicle control system of claim 12, wherein the one or more processors are configured to add a network device to the TSN without restarting the TSN.

19. The vehicle control system of claim 12, wherein the one or more processors are configured to remove a network device from the TSN without restarting the TSN.

* * * * *